(12) United States Patent
Amstutz et al.

(10) Patent No.: US 11,396,578 B2
(45) Date of Patent: *Jul. 26, 2022

(54) CURATIVE

(71) Applicant: Natural Fiber Welding, Inc., Peoria, IL (US)

(72) Inventors: Aaron Kenneth Amstutz, Peoria, IL (US); Luke Michael Haverhals, Peoria, IL (US); Isaiah Amstutz, Canton, IL (US); Skylar Clement, East Peoria, IL (US); Shang-Min Li, Peoria, IL (US)

(73) Assignee: Natural Fiber Wielding, Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,185

(22) Filed: Feb. 4, 2022

(65) Prior Publication Data

US 2022/0185954 A1 Jun. 16, 2022

Related U.S. Application Data

(63) Continuation-in-part of application No. 17/155,000, filed on Jan. 21, 2021, and a continuation-in-part of
(Continued)

(51) Int. Cl.
*C08G 63/42* (2006.01)
*C08G 63/81* (2006.01)
(Continued)

(52) U.S. Cl.
CPC ............. *C08G 63/42* (2013.01); *B32B 5/022* (2013.01); *B32B 5/024* (2013.01); *B32B 9/06* (2013.01);
(Continued)

(58) Field of Classification Search
None
See application file for complete search history.

(56) References Cited

U.S. PATENT DOCUMENTS

| 3,873,602 A | 3/1975 | Katzakian et al. |
| 4,769,416 A * | 9/1988 | Gelling ................. C08L 19/003 525/194 |

(Continued)

FOREIGN PATENT DOCUMENTS

| CN | 101476166 A | 7/2009 |
| EP | 0788524 A1 | 8/1997 |

(Continued)

OTHER PUBLICATIONS

Altuna—self-healed polymer networks cross-linked epoxidized soybean oil—Green Chem.—2013 (Year: 2013).*
(Continued)

*Primary Examiner* — Callie E Shosho
*Assistant Examiner* — John Vincent Lawler
(74) *Attorney, Agent, or Firm* — Hamilton IP Law, PC; Jay R. Hamilton; Charles A. Damschen

(57) ABSTRACT

A curative for epoxidized plant-based oils and epoxidized natural rubber is created from the reaction between a naturally occurring polyfunctional acid and an epoxidized plant-based oil is disclosed. The curative may be used to produce at least one of six different materials, wherein each type of material may be configured as a thermosetting elastomer that is crosslinked with β-hydroxyester linkages. The materials may be configured as a leather-like material, a foam material, a molded elastomer, a coating, an adhesive, and/or a rigid or semi-rigid material. Illustrative articles made from any combination of the six materials may be recycled using a mechano-chemical process to de-crosslink the thermosetting elastomer.

20 Claims, 32 Drawing Sheets

Related U.S. Application Data application No. 17/149,000, filed on Jan. 5, 2021, said application No. 17/155,000 is a continuation-in-part of application No. 17/129,183, filed on Dec. 21, 2020, said application No. 17/141,900 is a continuation of application No. 16/918,646, filed on Jul. 1, 2020, now Pat. No. 10,882,951, said application No. 17/129,183 is a continuation of application No. 16/457,352, filed on Jun. 28, 2019, now Pat. No. 10,882,950, said application No. 16/186,646 is a continuation-in-part of application No. 16/457,352, filed on Jun. 28, 2019, now Pat. No. 10,882,950, which is a continuation of application No. 16/388,693, filed on Apr. 18, 2019, now Pat. No. 10,400,061.

(60) Provisional application No. 63/297,569, filed on Jan. 7, 2022, provisional application No. 63/274,443, filed on Nov. 1, 2021, provisional application No. 63/145,939, filed on Feb. 4, 2021, provisional application No. 63/084,508, filed on Sep. 28, 2020, provisional application No. 62/989,275, filed on Mar. 13, 2020, provisional application No. 62/963,325, filed on Jan. 20, 2020, provisional application No. 62/869,393, filed on Jul. 1, 2019, provisional application No. 62/806,480, filed on Feb. 15, 2019, provisional application No. 62/772,744, filed on Nov. 29, 2018, provisional application No. 62/772,715, filed on Nov. 29, 2018, provisional application No. 62/756,062, filed on Nov. 5, 2018, provisional application No. 62/669,483, filed on May 10, 2018, provisional application No. 62/669,502, filed on May 10, 2018, provisional application No. 62/660,943, filed on Apr. 21, 2018.

(51) Int. Cl.
*C08C 19/06* (2006.01)
*C08J 3/24* (2006.01)
*B32B 5/02* (2006.01)
*B32B 25/10* (2006.01)
*B32B 25/12* (2006.01)
*B32B 9/06* (2006.01)

(52) U.S. Cl.
CPC ............ *B32B 25/10* (2013.01); *B32B 25/12* (2013.01); *C08C 19/06* (2013.01); *C08G 63/81* (2013.01); *C08J 3/24* (2013.01); *B32B 2305/72* (2013.01); *B32B 2307/50* (2013.01); *B32B 2319/00* (2013.01); *C08J 2315/00* (2013.01)

(56) References Cited

U.S. PATENT DOCUMENTS

| | | | |
|---|---|---|---|
| 4,930,232 A * | 6/1990 | Engle | A43B 17/14 36/71 |
| 5,536,776 A | 7/1996 | Carpenter et al. | |
| 6,526,859 B1 | 3/2003 | Ozawa et al. | |
| 7,196,124 B2 | 3/2007 | Parker et al. | |
| 7,671,178 B1 | 3/2010 | Phillips et al. | |
| 8,784,503 B2 | 7/2014 | Costard | |
| 9,096,773 B2 | 8/2015 | Webster et al. | |
| 9,169,386 B2 | 10/2015 | Katzakian et al. | |
| 9,179,660 B2 | 11/2015 | Peterson et al. | |
| 9,556,368 B2 | 1/2017 | Li et al. | |
| 9,567,311 B2 | 2/2017 | Pajerski | |
| 9,765,182 B2 | 9/2017 | Liu | |
| 9,926,426 B2 | 3/2018 | Rust | |
| 10,400,061 B1 | 9/2019 | Amstutz et al. | |
| 2002/0092809 A1 | 7/2002 | Ries et al. | |
| 2004/0192859 A1 * | 9/2004 | Parker | C08L 63/00 525/438 |
| 2008/0155857 A1 * | 7/2008 | Rosen | A43B 7/144 36/114 |
| 2010/0029523 A1 | 2/2010 | Benecke et al. | |
| 2011/0120635 A1 * | 5/2011 | Jokisch | B32B 27/32 156/500 |
| 2013/0299747 A1 | 11/2013 | Dershem | |
| 2014/0228480 A1 | 8/2014 | Shiraishi et al. | |
| 2015/0087732 A1 * | 3/2015 | Liu | C08G 63/42 521/64 |
| 2019/0322799 A1 | 10/2019 | Amstutz et al. | |

FOREIGN PATENT DOCUMENTS

| | | | |
|---|---|---|---|
| EP | 3157975 A1 | 4/2017 | |
| EP | 2576193 B1 | 6/2017 | |
| EP | 3194466 A1 | 7/2017 | |
| WO | 2018217996 A1 | 11/2018 | |

OTHER PUBLICATIONS

Altuna et al, Self-healable polymer networks based on the cross-linking of epoxidised soybean oil by an aqueous citric acid solution, Green Chemistry, 2013, 15, 3360-3366.

Cao, et al, A Ball-Milling-Enabled Reformatsky Reaction, ChemSusChem Communications, 2019, 12, 2554-2557.

Capelot et al, Catalytic Control of the Vitrimer Glass Transition, ACS Macro Letters, 2012, 1, 789-792.

Capelot et al, Metal-Catalyzed Transesterification for Healing and Assembling of Thermosets, Journal of the American Chemical Society, 2012, 134, 7664-7667.

Ciezak-Jenkins et al, Mechanochemical Induced Structural Changes in Sucrose Using the Rotational Diamond Anvil Cell, Journal of Applied Physics, 2018, 123, 085901-1-085901-7.

Cindro et al, Investigations of Thermally-Controlled Mechanochemical Miling Reactions, ChemRxiv, 2019.

Duan et al, An Investigation of the Selective Chain Scission at Center Diels-Alder Mechanophore under Ultrasonication, Macromolecules, 2016.

European Patent Office, Supplemental European Search Report, NFW-P1014-EP, dated Jan. 10, 2022.

Gordon et al, Force-Induced Cleavage of Labile Bond for Enhanced Mechanochemical Crosslinking, Polymer Chemistry, 2013, 00, 1-3.

International Search Report and Written Opinion, Patent Cooperation Treaty, NFW-P1014-I-PCT, dated Aug. 14, 2017.

Liu et al, Glycerol Induced Catalyst-Free Curing of Epoxy and Vitrimer Preparation, Macromolecular Rapid Communication, 2019, 1800889, 1-6.

Lu et al, Dual Cross-Linked Self-Healing and Recyclable Epoxidized Natural Rubber Based on Multiple Reversible Effects, Sustainable Chemistry & Engineering, 2019, 7, 4443-4455.

Min Qi et al. Epoxidized soybean oil cured with tannic acid for fully bio-based epoxy resin. RSC Advances, vol. 8, 2018, pp. 26948-2958, doi.org/10.1039/C8RA03874K.

Montarnal et al, Silica-Like Malleable Materials from Permanent Organic Networks, Science, Nov. 18, 2011, vol. 334, 965-968.

Officer E. Klochkova, ISR & Opinion for PCT/US2019/028184, dated Aug. 8, 2019, International Searching Authority/RU, Moscow, Russia.

Qiuyu Tang et al. Bio-based epoxy resin from epoxidized soybean oil. Soybean Oil—Biomass, Yield and Productivity, 2018, pp. 1-22, doi: 10.5772/intechopen.81544.

Ramirez et al, Microstructure of Copolymers Formed by the Reagent-less, Mechanochemical Remodeling of Homopolymers via Pulsed Ultrasound, MacroLetters, 2012, 1, 23-27.

Tang et al, Malleable, Mechanically Strong, and Adaptive Elastomers Enabled by Interfacial Exchangeable Bonds, Macromolecules, 2017.

(56) References Cited

OTHER PUBLICATIONS

Tanjung Faisal Amri et al. Use of epoxidized natural rubber as a toughening agent in plastics. Journal of applied polymer science, vol. 132, 2015, pp. 1-9, doi.org/10.1002/app.42270.

* cited by examiner

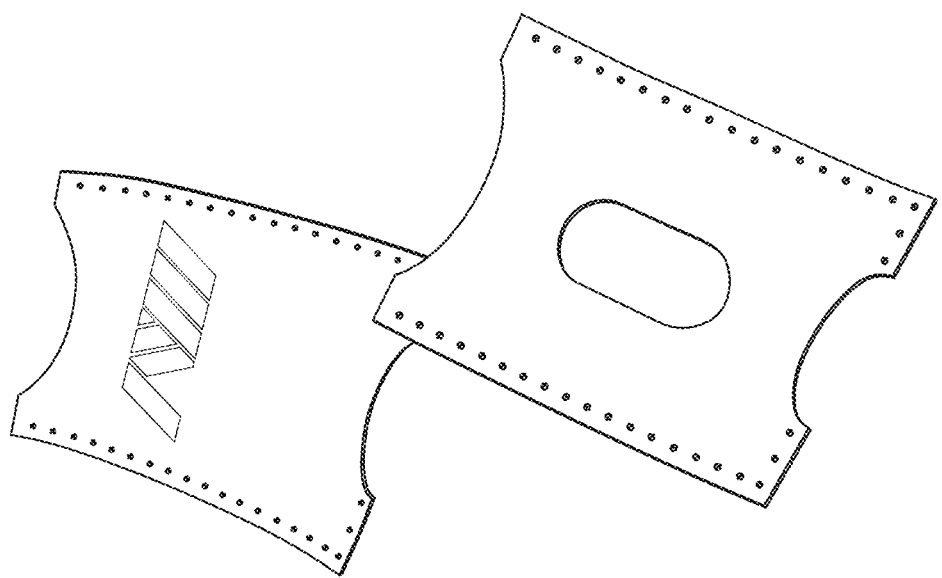
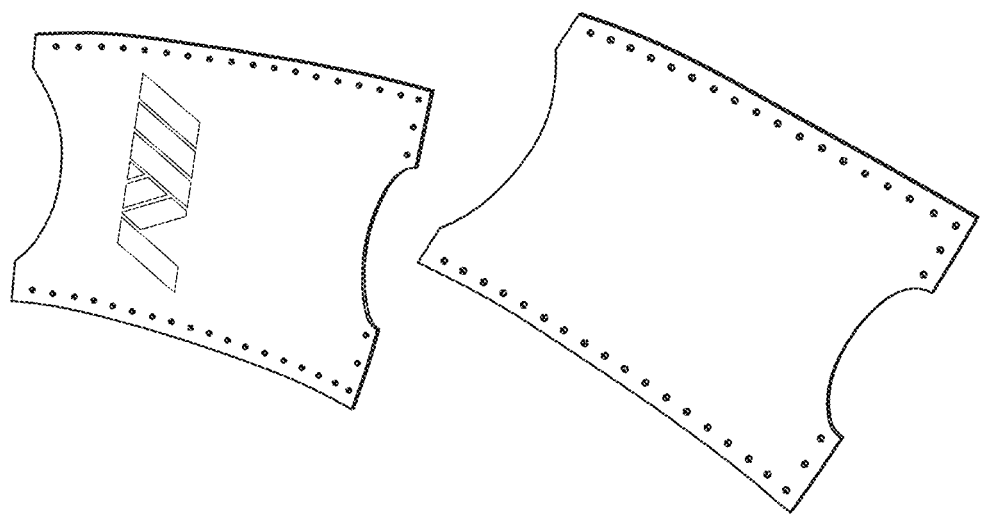
FIG. 5

FIG 13 - chemical schematic of the formation of a thermoset resin

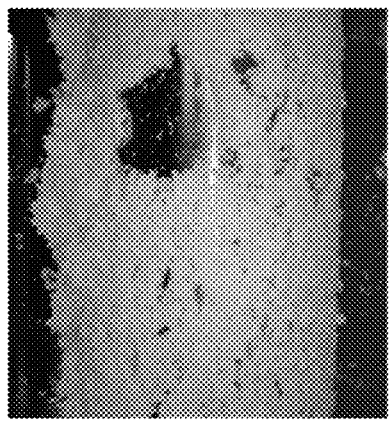
15c – material under additional mixing
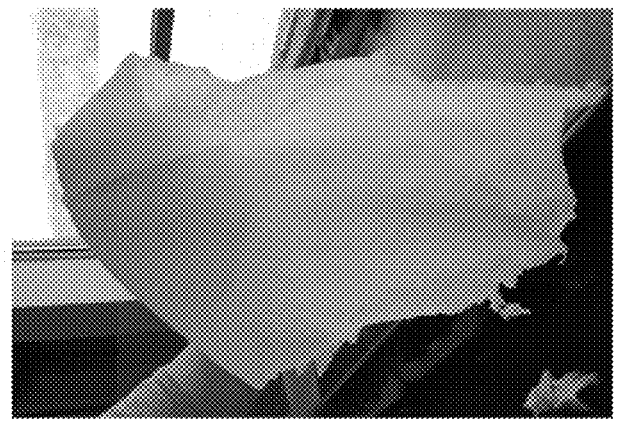
15f – material fully masticized
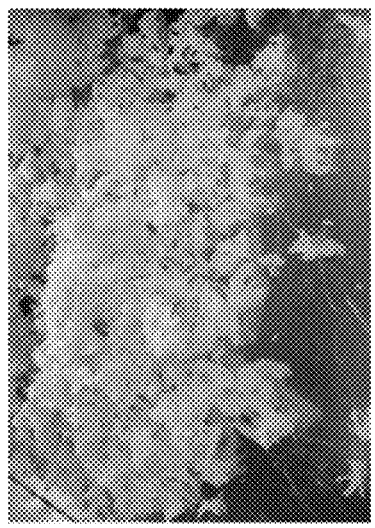
15b – initially milled material
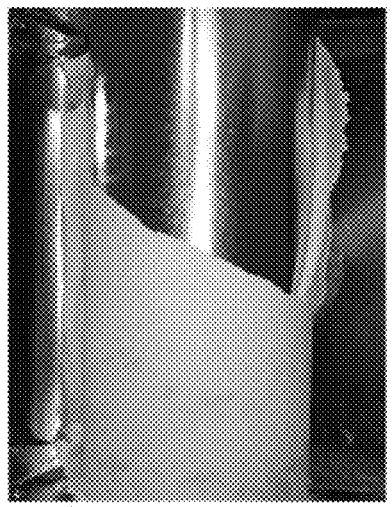
15e – material nearing end of mastication
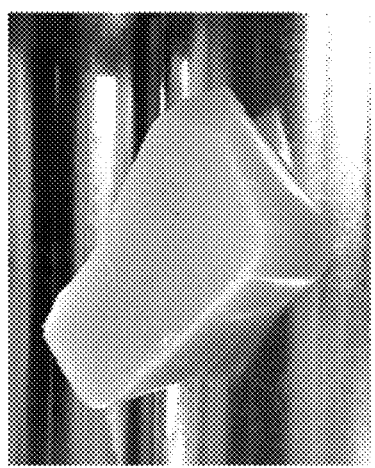
15a – starting block of thermoset resin
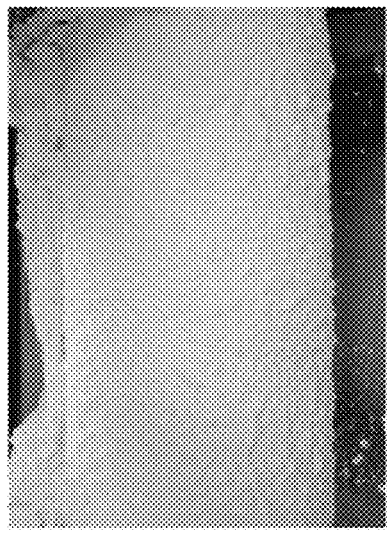
15d – material under additional mixing
images showing mechano-chemical reversal of crosslinking

CURATIVE

CROSS REFERENCE TO RELATED APPLICATIONS

The present non-provisional utility patent application is a continuation-in-part of and claims priority from U.S. patent application Ser. No. 17/141,900 filed on Jan. 5, 2021, which application was a continuation of and claimed priority from U.S. patent application Ser. No. 16/918,646 filed on Jul. 1, 2020 (now U.S. Pat. No. 10,882,951), which application was a continuation-in-part of and claimed priority from U.S. patent application Ser. No. 16/457,352 filed on Jun. 28, 2019 (now U.S. Pat. No. 10,882,950), which application is a continuation of and claims priority to U.S. patent application Ser. No. 16/388,693 filed on Apr. 18, 2019 (now U.S. Pat. No. 10,400,061), which application claimed priority from provisional U.S. App. Nos. 62/660,943 filed on Apr. 21, 2018; 62/669,483 filed on May 10, 2018; 62/669,502 filed on May 10, 2018; 62/756,062 filed on Nov. 5, 2018; 62/772,744 filed on Nov. 29, 2018; 62/772,715 filed on Nov. 29, 2018; and 62/806,480 filed on Feb. 15, 2019. The U.S. patent application Ser. No. 16/918,646 filed on Jul. 1, 2020 (now U.S. Pat. No. 10,882,951) also claimed priority from provisional U.S. App. Nos. 62/989,275 filed on Mar. 13, 2020 and 62/869,393 filed on Jul. 1, 2019. The present application is also a continuation-in-part of and claims priority from U.S. patent application Ser. No. 17/155,000 filed on Jan. 21, 2021, which application was a continuation-in-part of and claimed priority from U.S. patent application Ser. No. 17/129,183 filed on Dec. 21, 2020, which application is a continuation of and claims priority from U.S. application Ser. No. 16/457,352 filed on Jun. 28, 2019 (now U.S. Pat. No. 10,882,950), which application claimed priority from and is a continuation of U.S. application Ser. No. 16/388,693 filed on Apr. 18, 2019 now U.S. Pat. No. 10,400,061, which application claimed priority from provisional U.S. App. Nos. 62/660,943 filed on Apr. 21, 2018; 62/669,483 filed on May 10, 2018; 62/669,502 filed on May 10, 2018; 62/756,062 filed on Nov. 5, 2018; 62/772,744 filed on Nov. 29, 2018; 62/772,715 filed on Nov. 29, 2018; and 62/806,480 filed on Feb. 15, 2019. The U.S. patent application Ser. No. 17/155,000 filed on Jan. 21, 2021 also claimed priority from provisional U.S. App. Nos. 63/084,508 filed on Sep. 28, 2020 and 62/963,325 filed on Jan. 20, 2020. The present application also claims priority from provisional Pat. App. Nos. 63/145,939 filed on Feb. 4, 2021; 63/274,443 filed on Nov. 1, 2021; and 63/297,569 filed on Jan. 7, 2022, all of which previous applications are incorporated by reference herein in their entireties.

FIELD OF THE INVENTION

The present disclosure related to methods for producing natural products that may be made utilizing the curative disclosed herein. The natural products have physical properties similar to synthetic coated fabrics, leather-based products, and foam products.

STATEMENT REGARDING FEDERALLY SPONSORED RESEARCH OR DEVELOPMENT

No federal funds were used to develop or create the invention disclosed and described in the patent application.

BACKGROUND

Various manufacturing methods are utilized for footwear construction depending on the complexity of the final design. The simplest designs may utilize only one or two discrete types of materials as seen in flip-flops, slides, sandals, and Crocs™. In these types of footwear one material can serve for the entire footbed and either the same or a different material may be used for the top straps. At the other extreme, some performance running shoes or hiking boots may use 10-20 different types of materials for their specialized attributes.

It is desirable to be able to create footwear that is entirely recyclable without requiring deconstruction of the shoe. This may be relatively easy to achieve in simple designs that may be molded of one particular thermoplastic (whether foamed, solid, or both). In more complex footwear that contain an upper of one type of material and a midsole foam of another type of material and an outsole rubber of another type of material the recycling of such a shoe requires deconstruction. U.S. Ser. No. 11/026,477 discloses a shoe that is comprised of bio-based and/or recycled materials and seeks to minimize the number of discrete material types; but such shoe still ultimately requires deconstruction at the end-of-life in order to be fully recycled.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 5 is a view of a plurality of pieces of a epoxidized natural rubber-based material produced in accordance with the present disclosure that may be used for construction of wallet.

FIGS. 15a-f provide a series of images during the mechano-chemical processing of thermoset material.

DETAILED DESCRIPTION

Figure 1:
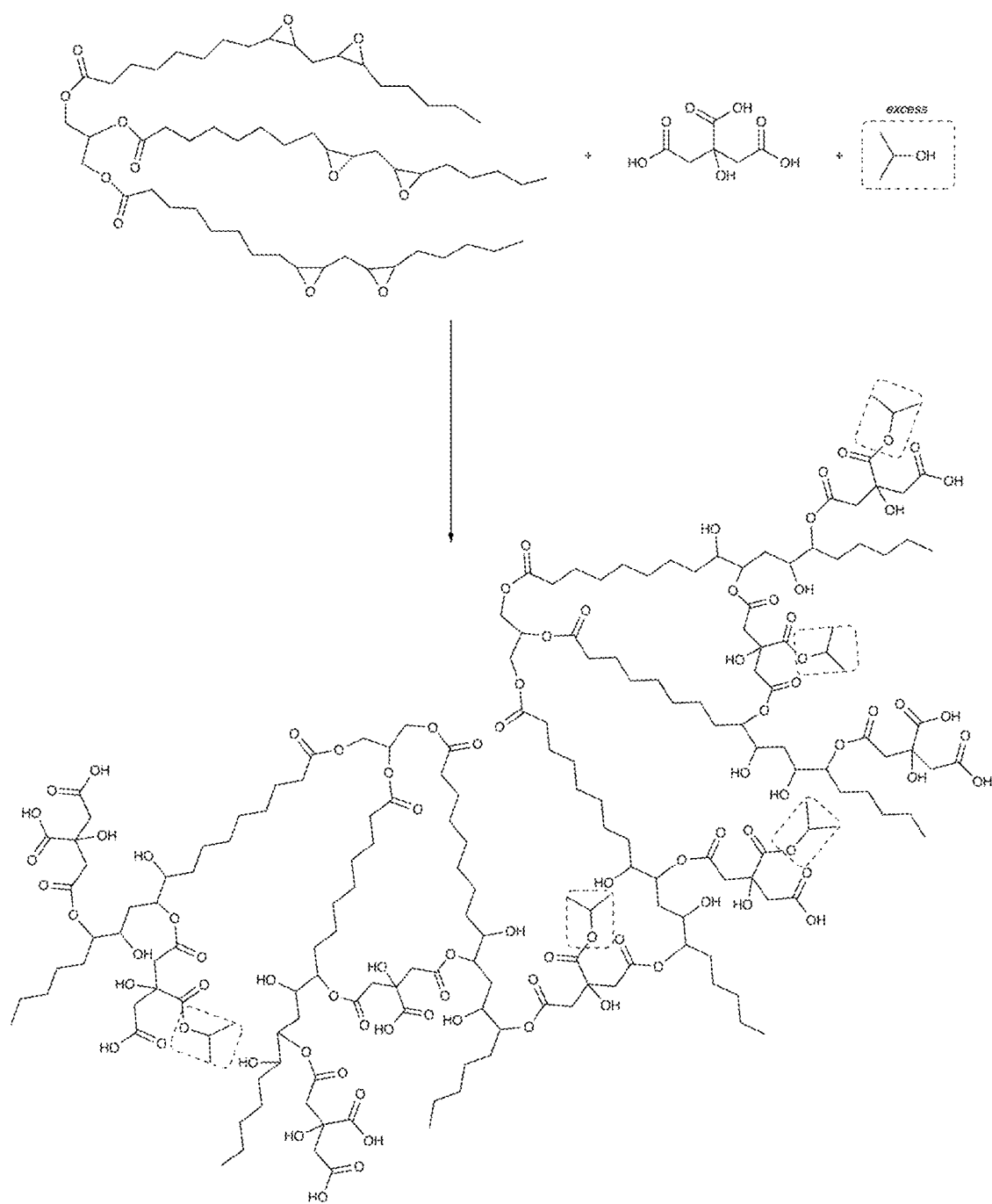
FIG. 1 is a chemical reaction formula and schematic for at least one illustrative embodiment of the curative disclosed herein.

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses.

These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

| Element Description | Element Number |
|---|---|
| Natural leather-like material (suede finish) | 100 |
| Natural leather-like material (glossy finish) | 100' |
| Fabric | 102 |
| Fabric extension | 103 |
| Polymer | 104 |
| Expanding foam | 200 |
| Floating platen | 210 |
| Lifting platen | 220 |

-continued

| Element Description | Element Number |
| --- | --- |
| Mold | 400 |
| Sole preform | 401a |
| Sole | 401b |
| Foam injection aperture | 401c |
| Strap | 402 |
| Adhesive material | 403 |
| Foam footbed preform | 404a |
| Foaming/foamed footbed | 404b |
| Metal plate | 405 |
| Foaming compound mold | 406 |
| Injection port | 406a |
| Injection barrel | 407 |
| Last | 408 |
| Preformed upper | 409 |

1. Curative (Pre-Polymer)

Disclosed is a curative comprised of an epoxidized triglyceride (which may be a plant-based oil such as vegetable and/or nut oil(s) and/or a microbial oil such as that produced by algae or yeast), naturally occurring polyfunctional carboxylic acids, and at least some grafted hydroxyl-containing solvent. Examples of such epoxidized triglycerides comprised of plant-based oils include epoxidized soybean oil (ESO), epoxidized linseed oil (ELO), epoxidized corn oil, epoxidized cottonseed oil, epoxidized canola oil, epoxidized rapeseed oil, epoxidized grape seed oil, epoxidized poppy seed oil, epoxidized tongue oil, epoxidized sunflower oil, epoxidized safflower oil, epoxidized wheat germ oil, epoxidized walnut oil, and other epoxidized vegetable oils (EVOs). Generally, any polyunsaturated triglyceride with an iodine number of 100 or greater may be epoxidized and used with the curative as disclosed herein without limitation unless otherwise indicated in the following claims. Such epoxidized triglycerides are generally known to be biodegradable. Examples of naturally occurring polyfunctional acids include citric acid, tartaric acid, succinic acid, malic acid, maleic acid, and fumaric acid. Although specific illustrative embodiments may denote one type of oil and/or acid, such embodiments are not meant to be limiting in any way unless otherwise indicated in the following claims.

The curative as disclosed herein is a reaction product between an epoxidized vegetable oil(s) and a naturally occurring polyfunctional carboxylic acid conducted in a solvent that is capable of solubilizing both the epoxidized vegetable oil(s) and a naturally occurring polyfunctional carboxylic acid, wherein the solvent contains at least some portion of a hydroxyl-containing solvent (i.e., an alcohol) that reacts with at least some portion of the carboxylic acid functional groups that are contained on the polyfunctional carboxylic acid. The curative is an oligomeric structure of carboxylic-acid-capped epoxidized vegetable oil, heretofore called a pre-polymer curative. The curative is a viscous liquid that is soluble in unmodified epoxidized vegetable oil and other epoxidized plant-sourced polymers (e.g., epoxidized natural rubber).

Generally the terms "curative," "pre-polymer," and "pre-polymer curative" are used to denote the same and/or similar chemical structure as disclosed in this Section 1. However, the function of the curative, pre-polymer, and pre-polymer curative may be different in different applications thereof to produce different end products. For example, when the curative is used with epoxy-containing monomeric resins (e.g., EVOs) it functions to build molecular weight that is integral to the backbone of the resultant polymer and therefore may be referred to as a pre-polymer in such applications. In another example, when the curative is used in applications having pre-existing high molecular weight epoxy-containing polymer (e.g., as disclosed below herein) the curative is functioning primarily to link those pre-existing high molecular weight polymers and therefore may be referred to simply as a curative in such applications. Finally, when the curative is used in applications having both substantial amounts of epoxy-containing monomer and some portion of pre-existing high molecular weight epoxy-containing polymer it functions both to build molecular weight and to link pre-existing high molecular weight polymers and therefore may be referred to as a pre-polymer curative.

It has been found that the creation of a curative can eliminate the risk of porosity due to solvent evaporation during the curing process. Furthermore, the oligomeric curative may incorporate substantially all of the polyfunctional carboxylic acid so that no additional curative is required during the curing process. For example, citric acid is not miscible in epoxidized soybean oil (ESO) but they may be made to react with each other in a suitable solvent. The amount of citric acid may be selected so that the curative is created so that substantially all of the epoxide groups of the ESO in the curative are reacted with carboxylic acid groups of the citric acid. With sufficiently excess citric acid, the pre-polymerization extent may be limited so that no gel fraction is formed. That is, the target species of the curative is a low molecular weight (oligomeric) citric-acid capped ester-product formed by the reaction between carboxylic acid groups on the citric acid with epoxide groups on the ESO. The solvent used for the reaction medium contains at least some portion of a hydroxyl-containing solvent (i.e., an alcohol) that is grafted unto at least some of the polyfunctional carboxylic acid during the creation of the curative. Although specific illustrative embodiments may denote one type of alcohol (e.g., IPA, ethanol, etc.), such embodiments are not meant to be limiting in any way unless otherwise indicated in the following claims.

Illustrative oligomeric curatives may be created with weight ratios of ESO to citric acid in the range of 1.5:1-0.5:1, which corresponds to a molar ratio of epoxide groups: carboxylic acid groups of approximately 0.43:1 (for a weight ratio of 1.5:1) to 0.14:1 (for the weight ratio of 0.5:1). In on illustrative embodiment a weight ratio of ESO:citric acid is 1:1, which gives a molar ratio of epoxide groups: carboxylic acid groups of 0.29:1. If too much ESO is added during curative creation, the solution may gel and further incorporation of ESO to create the target resin becomes impossible. Note that on a weight basis, stoichiometric equivalent amounts of epoxide groups on the ESO (molecular weight of ~1000 g/mol, functionality of 4.5 epoxide groups per molecule) and carboxylic acid groups on the citric acid (molecular weight 192 g/mol, functionality of 3 carboxylic groups per molecule) occur at a weight ratio of 100 parts of ESO to about 30 parts of citric acid. A weight ratio of ESO:citric acid above 1.5:1 may build a curative with excessive molecular weight (and hence viscosity) which limits its ability to be incorporated into unmodified epoxidized vegetable oil or epoxidized natural rubber. If the weight ratio of ESO:citric acid is below 0.5:1 it has been found that there is so much excess citric acid that after solvent evaporation, ungrafted citric acid may precipitate out of solution.

In addition to controlling the ratio of ESO to citric acid, through experimentation it has been found that selective control of the amount of alcohol used as a solvent may also be used to tailor the physical properties of the resulting elastomer made with the curative. The alcohol solvent itself is incorporated into the elastomer by forming ester linkages with the polyfunctional carboxylic acid. A mixture of two or more solvents may be used to tailor the amount of grafting of a hydroxyl-containing solvent onto the citric acid-capped oligomeric curative. A schematic depiction of the chemical reaction for making an illustrative embodiment of the curative disclosed herein is shown in FIG. 1.

For example, and without restriction or limitation, isopropyl alcohol (IPA), ethanol, or other suitable alcohol without limitation unless otherwise indicated in the following claims may be used as a component of a solvent system used to miscibilize citric acid with ESO. IPA, ethanol, or other suitable alcohol are capable of forming an ester linkage via a condensation reaction with citric acid. Since citric acid has three carboxylic acids, such grafting reduces the average functionality of the citric acid molecules that are reacting with the ESO. This is beneficial in creating an oligomeric structure that is more linear and therefore less highly branched. Acetone may be used as one component of a solvent system used to miscibilize citric acid with ESO, but unlike IPA or ethanol, acetone itself is not capable of being grafted onto the citric acid-capped oligomeric curative. Indeed, during creation of the oligomeric curative it has been found that the reactivity of the pre-polymer is determined, in part, by the ratio of the alcohol to acetone that may be used to solubilize citric acid with ESO. That is, in reaction mixtures with the similar amounts of citric acid and ESO, a curative created from a solution with a relatively high ratio of alcohol to acetone creates a curative with longer, less-highly-branched structures than curative created from a solution with a relatively low ratio of alcohol to acetone under similar reaction conditions.

Generally, a curative may be adapted for use with additional unmodified epoxidized vegetable oil to yield a castable resin. The improved methodology disclosed by Applicant herein results in substantially porosity-free elastomeric products.

2. Coated Materials

A. Summary

Figure 2A:
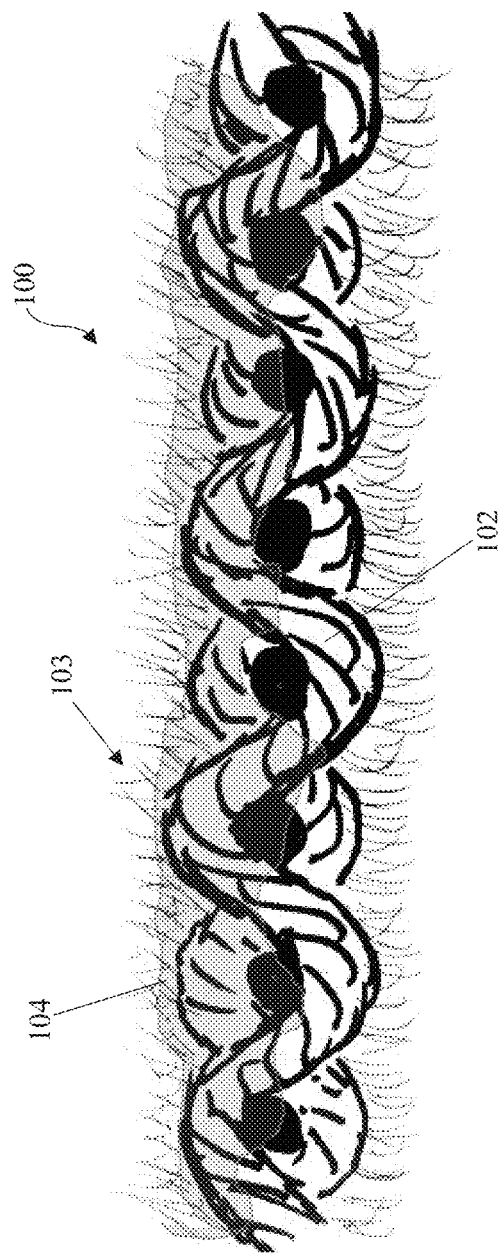
FIG. 2A is an illustration of an epoxidized natural rubber-based material produced using a relatively lower viscosity resin that was allowed to penetrate throughout the flannel substrate resulting in a suede or brushed-looking surface.
Figure 2B:
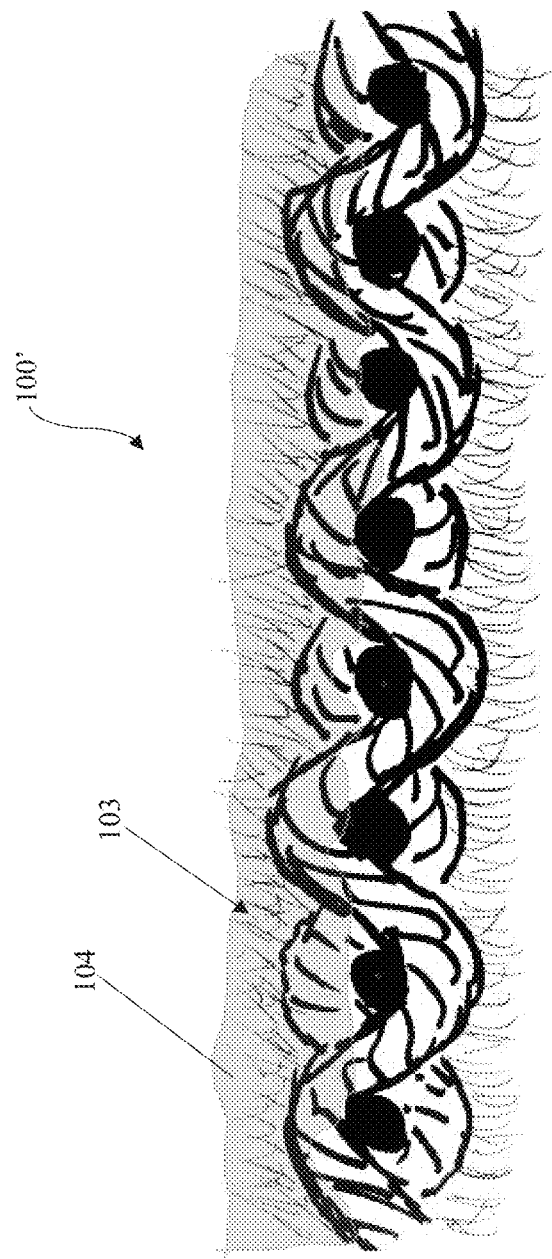
FIG. 2B is an illustration of an epoxidized natural rubber-based material produced using a relatively higher viscosity resin that was allowed to only penetrate partly through the flannel substrate resulting in a glossy polished-looking surface.
Figure 3:
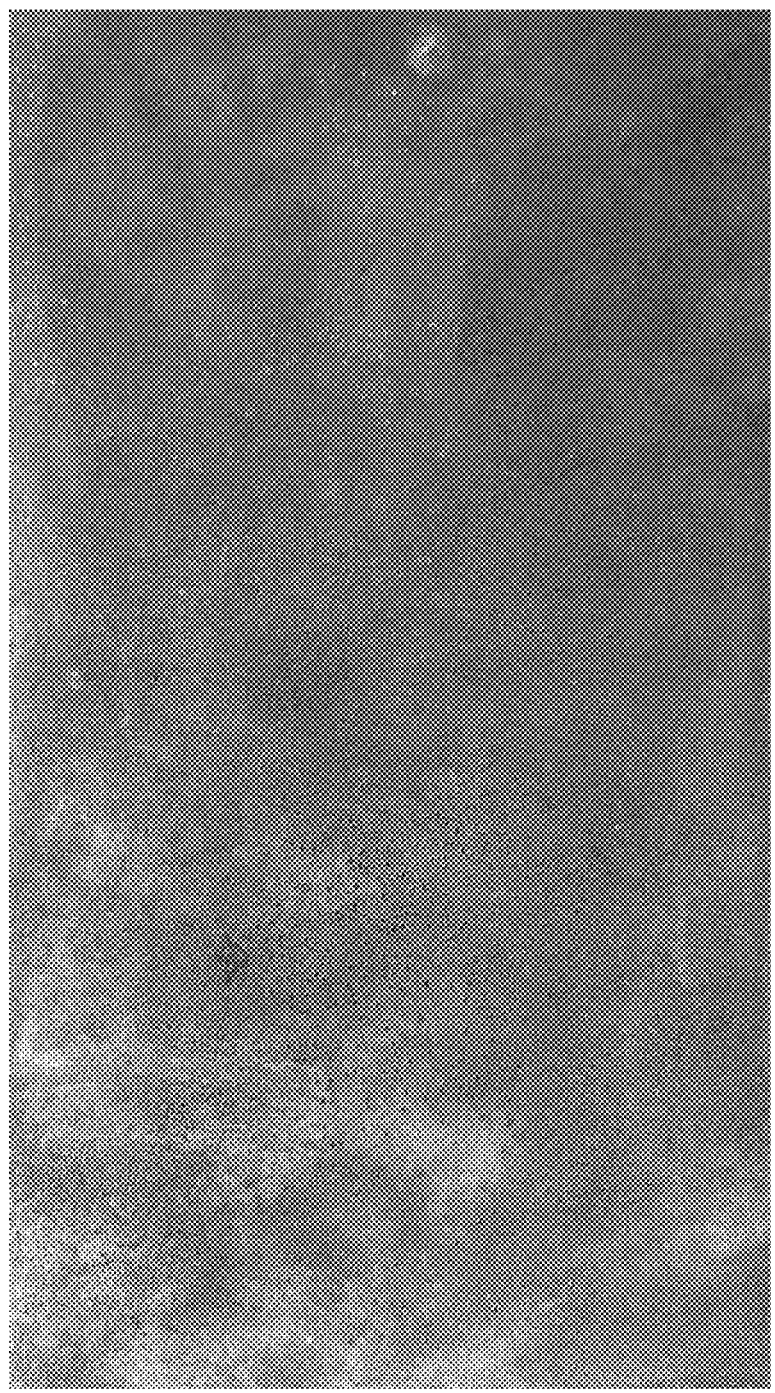
FIG. 3 is an image of an epoxidized natural rubber-based material produced in accordance with the present disclosure.
Figure 4A:
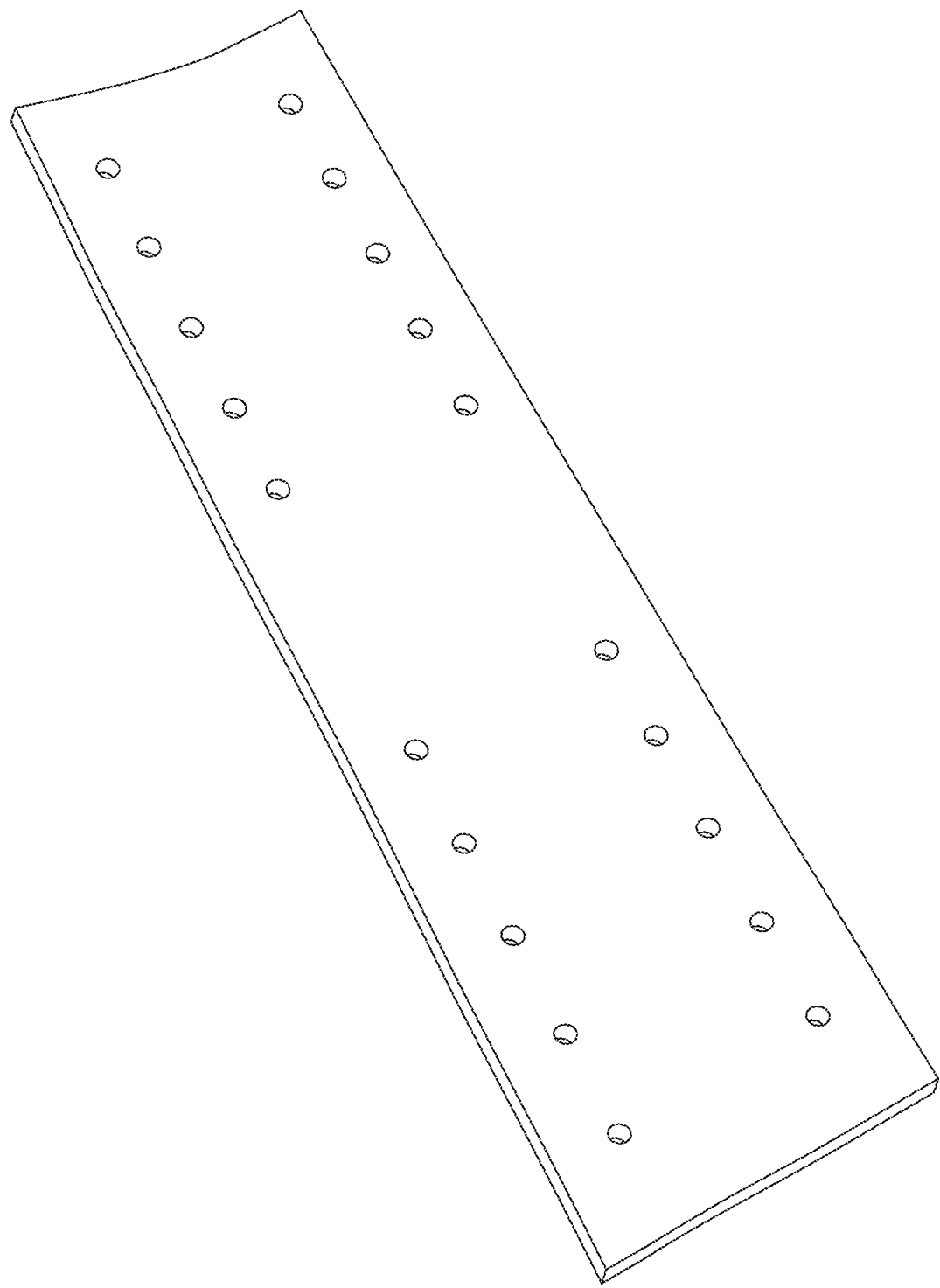
FIGS. 4A, 4B, and 4C are views of portion of an epoxidized natural rubber-based material produced in accordance with the present disclosure that may be used for construction of wallet wherein each version of the epoxidized natural rubber-based material is made with a different texture.
Figure 4B:
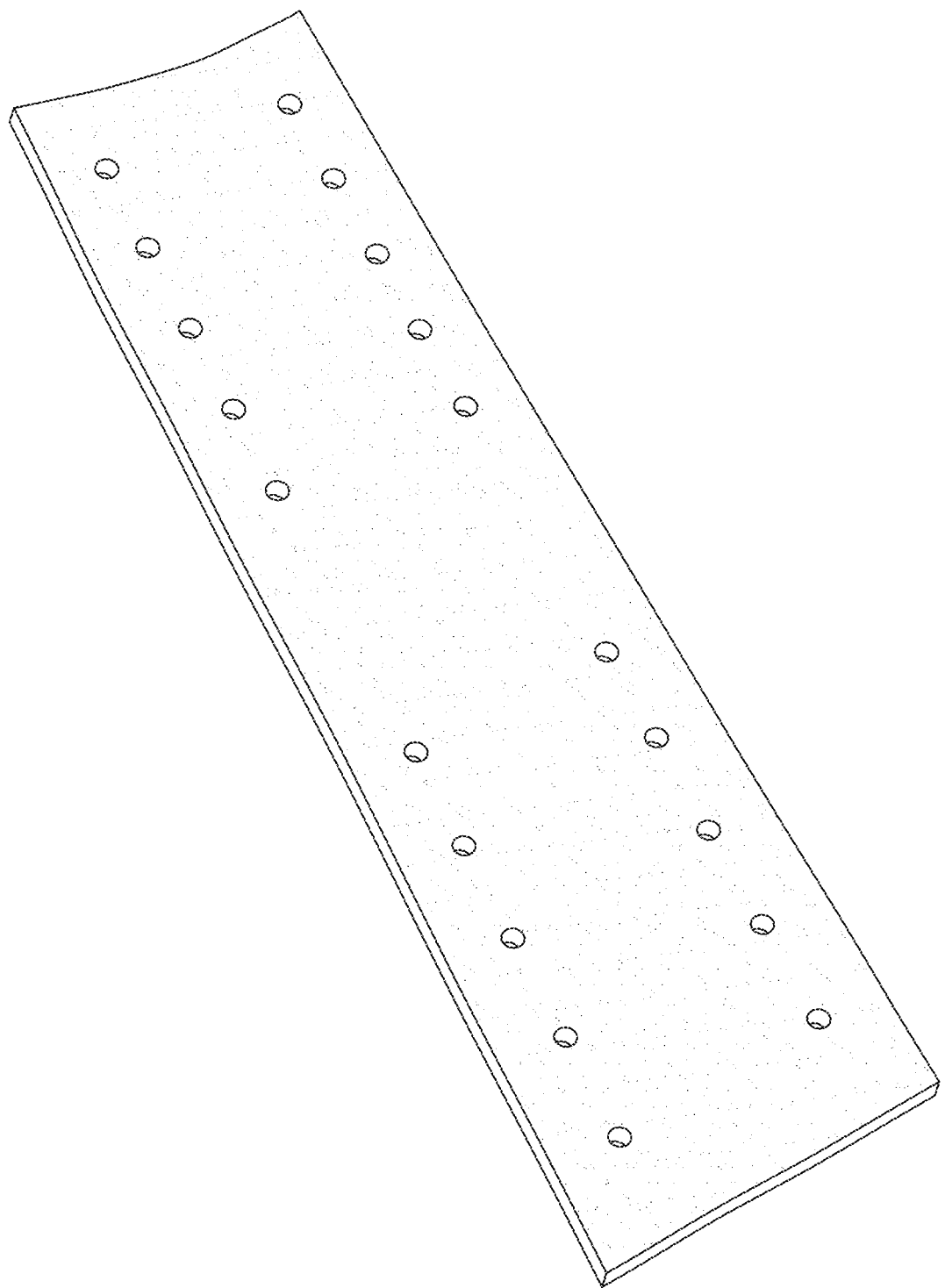
Figure 4C:
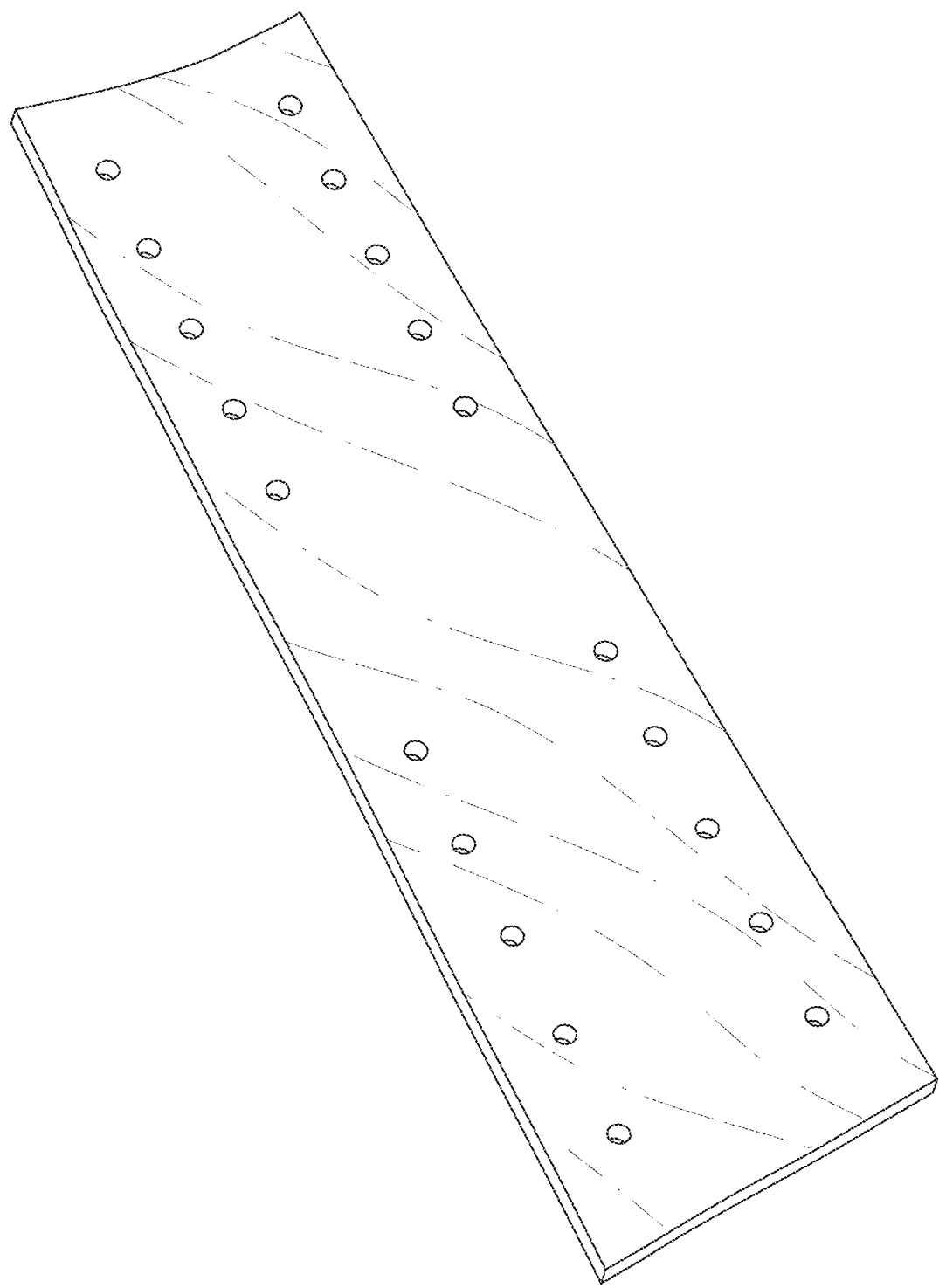

The curative as disclosed immediately above may function as a pre-polymer and may be mixed with additional epoxidized vegetable oil to be used as a resin which may be applied to various backing materials/backing layers to yield a leather-like material with excellent tear strength, flexibility, dimensional stability, and fabrication integrity. Throughout this disclosure, the terms "backing material" and "backing layer" may be used interchangeably depending the specific context. However, for certain articles disclosed herein a backing material may be comprised of a resin-impregnated backing layer. According to one illustrative embodiment of a coated material utilizing the pre-polymer, one illustrative fabric backing material/backing layer may be a woven cotton flannel (as depicted in FIGS. 2A & 2B and described in more detail below). If the resin is formulated to be relatively low in viscosity, exposed flannel may persist above the resin-coated fabric core. This imparts a warm texture to the surface of the article. Other fabric backing material/backing layer may include woven substrates of various kinds (e.g., plain weave, twill, sateen weave, denim), knitted substrates, and non-woven substrates without limitation unless indicted in the following claims.

In other embodiments, the resin may be coated onto a non-stick surface (e.g., silicone or PTFE) or texture paper at a consistent layer thickness. After the film has been coated to an even layer, a layer of backing material may be laid on top of the liquid resin. The liquid resin may wick into the fabric layer (i.e., backing material) creating a permanent bond with the fabric during curing. The article may then be placed in an oven to complete the cure of the resin. Temperatures for curing may be preferably 60° C.-100° C., or even more preferably 70° C.-90° C. for a duration of 4 hr-24 hr. Longer cure times are also permissible. Alternatively, the liquid resin may be applied onto a non-stick surface (e.g., silicone or PTFE) or texture paper at a consistent layer thickness after which fabric may be laid on top of the liquid resin and then another non-stick surface may be laid on top of the resin and fabric. This assembly may be placed in a heated molding press to complete the cure. Cure temperatures within a press may optionally be higher than in an oven because the molding pressure minimizes the creation of bubbles (voids) in the final article. Cure temperatures within a press may be between 80° C.-170° C., or even more preferably, 100° C.-150° C. for a duration of 5 minutes-60 minutes, or more preferably between 15 minutes-45 minutes.

The resin may be optically clear with a slight yellow hue. Resin that has no pigment added may be used to create oil-cloth like materials that allow for fabrics to be made water resistant and wind resistant while still allowing the fabric patterns to be visible within the resin. Coated fabrics made according to this embodiment may be cured either in an oven (without press molding) or may be cured within a heated press. Such coated fabrics may be used for garments, particularly for outerwear, or for waterproof accessories; including, but not limited to, purses, handbags, backpacks, duffle bags, luggage, briefcases, hats, and the like.

Novel embossed items have been created using the resin described in this disclosure in combination with non-woven mats comprised of virgin or recycled textile fibers. Specifically, non-woven webs from about 7 mm thick to about 20 mm thick may be impregnated by resins prepared according to this disclosure. After impregnation, the non-woven webs may be pressed in a heated hydraulic press to a nominal pressure of between 10 psi-250 psi, or even more preferably between 25 psi-100 psi. The non-woven web with resin may be pressed between silicone release liners, one of which may have an embossing pattern therein. The embossing pattern may have relief characteristics of a depth between 1 mm-6 mm, or more preferably between 2 mm and 4 mm in depth. When resin prepared according to this disclosure is further pigmented with a structural color pigment, e.g., mica pigments of various shades—many of which have pearlescent qualities—and such resin is molded into a non-woven web with an embossing pattern, it has been found to create aesthetically pleasing patterned articles. The structural color has been found to preferentially align at embossing features to create sharp contrasts and visual depth corresponding to the embossed pattern. Alternatively, and without restriction unless so indicated in the following claims, mineral pigments from other source rocks and processes may be included in the casting resin to impart color to articles made according to the present disclosure.

Resin coated fabrics made also be created according to one embodiment of the present disclosure using roll-to-roll processing. In a roll-to-roll process of textured, coated fabrics, including leather-like materials, the texture paper is often used as a carrier film to move both the resin and the fabric through an oven for a specific duration of time. The resin according to the present disclosure may require cure times that are longer than PVC or polyurethane resins that are currently used in the art, thus the line speeds may be correspondingly slower or the cure ovens may be made longer to effect a longer cure time. Vacuum degassing of the resin prior to casting may allow for higher temperatures to be used for curing (due to less residual solvent, moisture, and trapped air) that would speed up the cure time and thus the line pull rate.

Alternatively, certain catalysts are known in the art to speed up the carboxylic acid addition to epoxide groups. Base catalysts may be added to the resin; some example catalysts include pyridine, isoquinoline, quinoline, N,N-dimethylcyclohexylamine, tributylamine, N-ethylmorpholine, dimethylaniline, tetrabutyl ammonium hydroxide, and similar molecules. Other quaternary ammonium and phosphonium molecules are known catalysts for the carboxylic acid addition to epoxide groups. Various imidazoles are likewise known as catalysts for this reaction. Zinc salts of organic acids are known to improve the cure rate as well as impart beneficial properties, including improved moisture resistance, to the cured films. (See Werner J. Blank, Z. A. He and Marie Picci, "Catalysis of the Epoxy-Carboxyl Reaction", Presented at the International Waterborne, High-Solids and Powder Coatings Symposium, Feb. 21-23, 2001.) Accordingly, any suitable catalyst may be used without limitation unless otherwise indicated in the following claims.

B. Illustrative Embodiments

Although the illustrative embodiments and methods that follow include specific reaction parameters (e.g., temperatures, pressures, reagent ratios, etc.), those embodiments and methods are for illustrative purposes only and in no way limit the scope of the present disclosure unless otherwise indicated in the following claims.

First Illustrative Embodiment and Method

To make a first illustrative embodiment of a coated material using the pre-polymer (that is, the curative as disclosed previously above), 18 parts of citric acid were dissolved into 54 parts of warm IPA. To this solution, only 12 parts of ESO is added. The IPA was evaporated with continuous heating and stirring (above ~85° C.). This was found to make a viscous liquid that could be heated to above 120° C. without gelation (even for long periods of time). This viscous liquid pre-polymer was allowed to cool below 80° C. To this viscous liquid, 88 parts of ESO is added. The final liquid resin will polymerize to a solid elastomeric product in 1-5 minutes at ~150° C. The coated material (which may serve as a substitute for natural animal-hide leather) may be formed as a reaction product using an epoxidized triglyceride and the pre-polymer without limitation unless otherwise indicated in the following claims.

Second Illustrative Embodiment and Method

For this illustrative embodiment, 30 parts of citric acid were dissolved into 60 parts of warm IPA. To this solution, 20 parts of ESO were slowly added while stirring. The IPA was evaporated with continuous heating and stirring (above 85° C., and preferably above 100° C.). This viscous pre-polymer was allowed to cool below 80° C. (preferably below 70° C.) and 80 parts of ESO were added along with various structural color pigments and 0.5 parts of zinc stearate (as an internal mold release agent). The resulting resin was poured over cellulosic fabric and allowed to cure at ~120° C. for 10-30 minutes. After initial cure, the material was placed in an 80° C. oven for overnight post-curing (~16 hours). The surface of the material was then sanded smooth (and optionally polished). The resulting material was found to have leather-like attributes.

Third Illustrative Embodiment and Method

Pre-polymer creation has been conducted by dissolving 50 parts of citric acid in 100 parts of warm IPA, accelerated by mixing. After dissolution of the citric acid, 50 parts of ESO is added to the stirring solution. The mixture is kept on a hot plate while the IPA evaporated under continuous heat and stirring. Such solutions have been created multiple times with various hot plate temperatures and air flow conditions. Even after extended times of heating and stirring, it has repeatedly been found that the amount of reaction product is greater than the mass of the ESO and citric acid alone. Depending on the rate of IPA evaporation (determined at least by air flow, mixing rate, and hot plate temperature) between 2.5 and 20 parts of the IPA has been found to be grafted onto the citric-acid capped oligomeric pre-polymer. Furthermore, solvent blends of acetone and IPA may be used as the reaction medium wherein the ratio between acetone and IPA determines the amount of residual carboxylic acid functional groups on the pre-polymer as well as the amount of branching in the pre-polymer. Higher amounts of IPA create more linear structures by lowering the effective functionality of the citric acid by capping some of the carboxylic acid functional groups by grafting IPA unto the citric acid via an ester linkage as referenced in FIG. 1. Lower amounts of IPA create more highly branched structures with more residual carboxylic acid functional groups.

Fourth Illustrative Embodiment and Method

Pre-polymer creation has been conducted by dissolving 50 parts of citric acid in 100 parts of warm IPA, accelerated by mixing. After dissolution of the citric acid, 50 parts of ESO and 15 parts of dewaxed blonde shellac is added to the stirring solution. The mixture is kept on a hot plate the while IPA evaporated under continuous heat and stirring. The shellac was found to increase the viscosity of the resulting pre-polymer.

Fifth Illustrative Embodiment and Method

Pre-polymer creation has been conducted by dissolving 45 parts of citric acid in 90 parts of warm IPA, accelerated by mixing. After dissolution of the citric acid, 45 parts of ESO is added to the stirring solution. The mixture is kept on a hot plate while the IPA evaporated under continuous heat and stirring.

Sixth Illustrative Embodiment and Method

Pre-polymer creation has been conducted by dissolving 45 parts of citric acid in 30 parts of warm IPA and 60 parts of acetone, accelerated by mixing. After dissolution of the citric acid, 45 parts of ESO is added to the stirring solution. The mixture is kept on a hot plate while the acetone and IPA evaporated under continuous heat and stirring. Such solutions have been created multiple times with various hot plate temperatures and air flow conditions. Even after extended times of heating and stirring, it has repeatedly been found that the amount of reaction product is greater than the mass of the ESO and citric acid alone, but the amount of grafted IPA is less than in pre-polymer created according to the fifth illustrative embodiment (even though the ratio of ESO:citric acid is 1:1 in both cases). Furthermore, pre-polymer created according to the fifth illustrative embodiment is lower in viscosity compared to pre-polymer created according to the sixth illustrative embodiment.

Generally, it is contemplated that the greater content of IPA during the pre-polymer creation allowed more IPA to be grafted onto carboxylic-acid sites on the citric acid, thus lowering the average functionality of the citric acid and thus creating a less highly branched oligomeric pre-polymer. In no circumstance have reaction conditions been found that capping of the citric acid with IPA to such an extent that final curing of the resin is prohibited.

Seventh Illustrative Embodiment and Method

The pre-polymer created in the fourth illustrative embodiment was mixed with additional ESO to bring the total calculated amount of ESO to 100 parts. This mixture was found to cure into a transparent, elastomeric resin. Tensile testing according to ASTM D412 found that the tensile strength was 1.0 MPa with an elongation at break of 116%.

Eight Illustrative Embodiment and Method

Pre-polymer was created by dissolving 45 parts of citric acid in 20 parts of IPA and 80 parts of acetone under heating and stirring. After dissolution of the citric acid, 35 parts of ESO was added to the solution along with 10 parts of shellac. The pre-polymer created after evaporation of the solvents was then cooled. The pre-polymer was mixed with an additional 65 parts of ESO to bring the total amount of ESO to 100 parts. The mixed resin was then cast on a silicone mat to make a transparent sheet. The mechanical properties of the material were found by tensile testing according to ASTM D412. The tensile strength was found to be 1.0 MPa and the elongation was 104%, which gives a calculated modulus of 0.96 MPa.

Ninth Illustrative Embodiment and Method

Pre-polymer was created by dissolving 45 parts of citric acid in 5 parts of IPA and 80 parts of acetone under heating and stirring. After dissolution of the citric acid, 35 parts of ESO was added to the solution along with 10 parts of shellac. The pre-polymer created after evaporation of the solvents was then cooled. The pre-polymer was mixed with an additional 65 parts of ESO to bring the total amount of ESO to 100 parts. The mixed resin was then cast on a silicone mat to make a transparent sheet. The mechanical properties of the material were found by tensile testing according to ASTM D412. The tensile strength was found to be 1.8 MPa and the elongation was 62%, which gives a calculated modulus of 2.9 MPa. As can be seen from the eighth and ninth illustrative embodiments, the lower amount of IPA present during pre-polymer creation yields a pre-polymer that creates a more highly crosslinked resin with higher modulus and lower elongation. These reaction products are more plastic-like and less rubber-like in their material attributes.

Tenth Illustrative Embodiment and Method

Pre-polymer was created by dissolving 25 parts of citric acid in 10 parts of IPA and 80 parts of acetone under heating and stirring. After dissolution of the citric acid, 20 parts of ESO was added to the solution along with 5 parts of shellac. The pre-polymer created after evaporation of the solvents was then cooled. The pre-polymer was mixed with an additional 80 parts of ESO to bring the total amount of ESO to 100 parts. The mixed resin was then cast on a silicone mat to make a transparent sheet. The mechanical properties of the material were found by tensile testing according to ASTM D412. The tensile strength was found to be 11.3 MPa and the elongation was 33%, which gives a calculated modulus of 34 MPa. As can be seen from the tenth illustrative embodiment, by appropriate design of the pre-polymer and the final resin mixture, a plastic material with the attributes of high strength and high modulus may be created by the methods of the present disclosure.

Eleventh Illustrative Embodiment and Method

The pre-polymer of the sixth illustrative embodiment was mixed with additional ESO to bring the total calculated amount of ESO to 100 parts. The mixed resin was then cast on a silicone mat to make a transparent sheet. The mechanical properties of the material were found by tensile testing according to ASTM D412. The tensile strength was found to be 0.4 MPa and the elongation was 145%, which gives a calculated modulus of 0.28 MPa.

As can be seen from the eleventh illustrative embodiment, by appropriate design of the pre-polymer and the final resin mixture, a high elongation elastomeric material by be created by the methods of the present disclosure. Therefore, by appropriate design of the pre-polymer, the inventive methods may be used to produce materials ranging from stiff, plastic-like materials to high-elongation elastomeric materials. Generally, higher amounts of IPA grafted during pre-polymer formation lowers the stiffness of the resulting material. Higher amounts of dissolved shellac yield stronger materials with somewhat higher stiffness. Citric acid amount (relative to the final mixed recipe) may be used either above stoichiometric balance or below to lower the modulus. Citric acid amounts near stoichiometric balance (~30 parts by weight to 100 parts by weight ESO) generally yield the stiffest materials; unless offset by high levels IPA grafting of the carboxylic acid groups during pre-polymer formation.

One of the beneficial attributes of animal-based leather is its flexibility over a wide range of temperatures. Synthetic-polymer based leather substitutes based on PVC or polyurethane may become particularly stiff at temperatures below −10° C. or below −20° C. (based on testing according to CFFA-6a—Cold Crack Resistance—Roller method). Materials prepared according to some of the embodiments of the present disclosure may have poor cold crack resistance. In the following examples, formulations are given that improve cold crack resistance. Cold crack resistance may be improved by adding a flexible plasticizer. Some natural vegetable oils may exhibit good low temperature flow, especially preferred may be polyunsaturated oils. Such oils may be any non-epoxidized triglycerides (such as those disclosed in Section 1 above) having relatively high iodine numbers (e.g., greater than 100) without limitation unless otherwise indicated in the following claims. Alternatively, monounsaturated oils may be added as plasticizers; one illustrative oil may be castor oil which is found to be thermally stable and less prone to becoming rancid. Additionally, the fatty acids and fatty acid salts of these oils may be used as a plasticizer. Accordingly, the scope of the present disclosure is in no way limited by the presence of or particular chemistry of a plasticizer unless otherwise indicated in the following claims.

Another approach is to use a polymeric additive that may impart improved low temperature flexibility. A preferred polymeric additive may be Epoxidized Natural Rubber (ENR). ENR is available commercially in different grades with various levels of epoxidation, for example 25% epoxidation of the double bonds yields grade ENR-25, 50% epoxidation of the double bonds yields grade ENR-50. Higher levels of epoxidation increase the glass transition temperature, $T_g$. It is advantageous for the $T_g$ to remain as low as possible for the most improvement in cold crack resistance in the final resin, so ENR-25 may be the preferred grade for use as a polymeric plasticizer. Even lower levels of epoxidation may be advantageous for further lowering of the cold crack temperature in the final resin. However, the scope of the present disclosure is not so limited unless otherwise indicated in the following claims.

Twelfth Illustrative Embodiment and Method

ENR-25 was mixed with ESO on a two-roll rubber compounding mill. It was found that ESO could slowly be added until a total of 50 parts of ESO could be added to 100 parts of ENR-25 before the viscosity dropped so far that further mill mixing was impossible. This gooey material was then transferred to containers for further mixing in a Flacktek® Speedmixer. A flowable mixture was achieved when a total of 300 parts of ESO was finally incorporated into 100 parts of ENR-25. The mixture created did not phase segregate.

The material of the twelfth illustrative embodiment may be mixed in a single step by a number of means known in the art, without restriction or limitation unless indicated in the following claims. Specifically, so-called Sigma Blade mixers may be used to create a homogenous mixture of ENR and ESO in a single step. Likewise, a kneader, such as a Buss Kneader, by used to create such mixtures in a continuous mixer-type arrangement which is well known to one of ordinary skill in the art. The homogeneous mixture may be mixed with pre-polymers as described in prior examples to create a spreadable resin that may be used as a leather-like material with improved cold crack resistance. Additionally, materials created with ENR-modified ESO as disclosed by the twelfth illustrative embodiment may exhibit improved tear strength, elongation, and abrasion resistance when compared to resins that do not contain ENR.

C. Additional Treatments

Articles produced according to this disclosure may be finished by any means known in the art. Such means include, but are not limited to, embossing, branding, sanding, abrading, polishing, calendering, varnishing, waxing, dyeing, pigmenting, and the like unless otherwise indicated in the following claims. Exemplary results may be obtained by impregnating the resin of the present disclosure onto fabric or a non-woven mat and curing such article. After curing the article, the surfaces may be sanded to remove imperfections and expose some portion of the substrate. Such surfaces exhibit characteristics very analogous to animal-hide leather, as exemplified by FIGS. 3-7. The surfaces then may be treated with natural oil or wax protectants, subject to a particular application.

D. Applications/Illustrative Products

Coated fabrics, ENR-based materials, and/or oil cloth-like materials produced according to the present disclosure may be used in applications where animal-hide leather and/or synthetic resin-coated fabrics are used today. Such applications may include belts, purses, backpacks, shoes, table tops, seating, and the like without limitation unless otherwise indicated in the following claims. Many of these articles are consumable items that if made from synthetic material alternatives are non-biodegradable and are non-recyclable. If such items are instead made according to the present disclosure, they would be biodegradable and thus not create a disposal problem as the biodegradability of similarly prepared polymers made from ESO and natural acids has been studied and shown. Shogren et al., *Journal of Polymers and the Environment*, Vol. 12, No. 3, July 2004. Furthermore, unlike animal-hide leather, which requires significant processing to be made durable and stable (some of which uses toxic chemicals), the materials disclosed herein may require less processing and will use environmentally friendly chemicals. Additionally, animal-hide leather is limited in size and may contain defects that render large pieces inefficient to produce. The material disclosed herein does not have the same kind of size limitations.

A cross-sectional depiction of the resulting material when a liquid resin precursor such as those described for various illustrative embodiments and methods above was applied to cotton flannel fabric that was placed over a heated surface (a hot plate) is shown in FIGS. 2A & 2B. The resin was found to react in 1-5 minutes when the surface temperature of the hot plate was ~130° C.-150° C. The viscosity of the resin may be controlled by the time allowed for polymerization prior to pouring over the surface. By controlling the viscosity, the degree of penetration into the surface may be controlled to achieve various effects in the resultant product. For example, a lower viscosity resin may penetrate throughout the fabric 102 and leave a suede or brushed-looking surface as shown in FIG. 2A to create a natural leather-like material 100 having a suede finish. A higher viscosity resin may penetrate only partly through the fabric 102 and result in a glossy, polished-looking surface as shown in FIG. 2B to create a natural leather-like material 100' having a glossy finish. In this way, variations may be created that mimic natural animal-hide leather products. As shown in contrasting FIGS. 2A & 2B, the natural leather-like material 100 having a suede finish 100 may exhibit a larger number of fabric extensions 103 extending from the fabric 102 through the polymer 104 than does the natural leather-like material 100' having a glossy finish. In the natural leather-like material 100' having a glossy finish, the majority of fabric extensions 103 may terminate within the polymer 104.

Alternatively, an article with a suede-like (i.e., relatively soft) surface without resin may be created by embedding flannel in a non-miscible paste (e.g., silicone vacuum grease) that is coated on a hot plate. The resin can then be poured over the surface of the flannel but will not penetrate through the non-miscible paste. After curing, the non-miscible paste may be removed from the article leaving that surface with a suede-like feeling. One of ordinary skill will therefore appreciate that a natural leather-like material as disclosed herein may be produced as the reaction product between an epoxidized vegetable oil and a naturally occurring polyfunctional acid impregnated upon a cotton flannel substrate, without limitation or restriction, wherein the article thus formed has the reaction product impregnated only partly through the substrate with substantially unimpregnated flannel on one side of the article. Although cotton flannel was used in these examples, any suitable flannel and/or fabric may be used including but not limited to those made from linen, hemp, ramie, and other cellulosic fibers without limitation unless otherwise indicated in the following claims. Additionally, non-woven substrates may be used as well recycled substrates (upcycled). Brushed knits may be used to impart additional stretch to the resultant article. Random mats (e.g., Pellon, also known as batting) may be advantageously used as a substrate for certain articles. In another illustrative embodiment, a textile backing layer and/or backing material may be configured from a protein-based fiber, which fibers include but are not limited to of wool, silk, alpaca fiber, qiviut, vicuna fiber, llama wool, cashmere, and angora unless otherwise indicated in the following claims.

Additional illustrative products that may be made according to the present disclosure are shown in FIGS. 3-8B. A depiction of a sheet of material that may serve as a natural leather-like material is shown in FIG. 3, and FIGS. 4-6 show various natural leather-like materials that may be used to construct a wallet. The material in FIGS. 4A, 4B, & 4C is shown with a plurality of apertures made therein, which apertures may be made with a conventional drill without limitation unless otherwise indicated in the following claims. Contrasting FIGS. 4A, 4B, & 4C shows that the method for making the material may be configured to impart a wide variety of textures thereon, which textures include but are not limited to smooth, grainy, soft, etc. (e.g., similar to that of various animal-hide leathers) unless otherwise indicated in the following claims.

Figure 6:
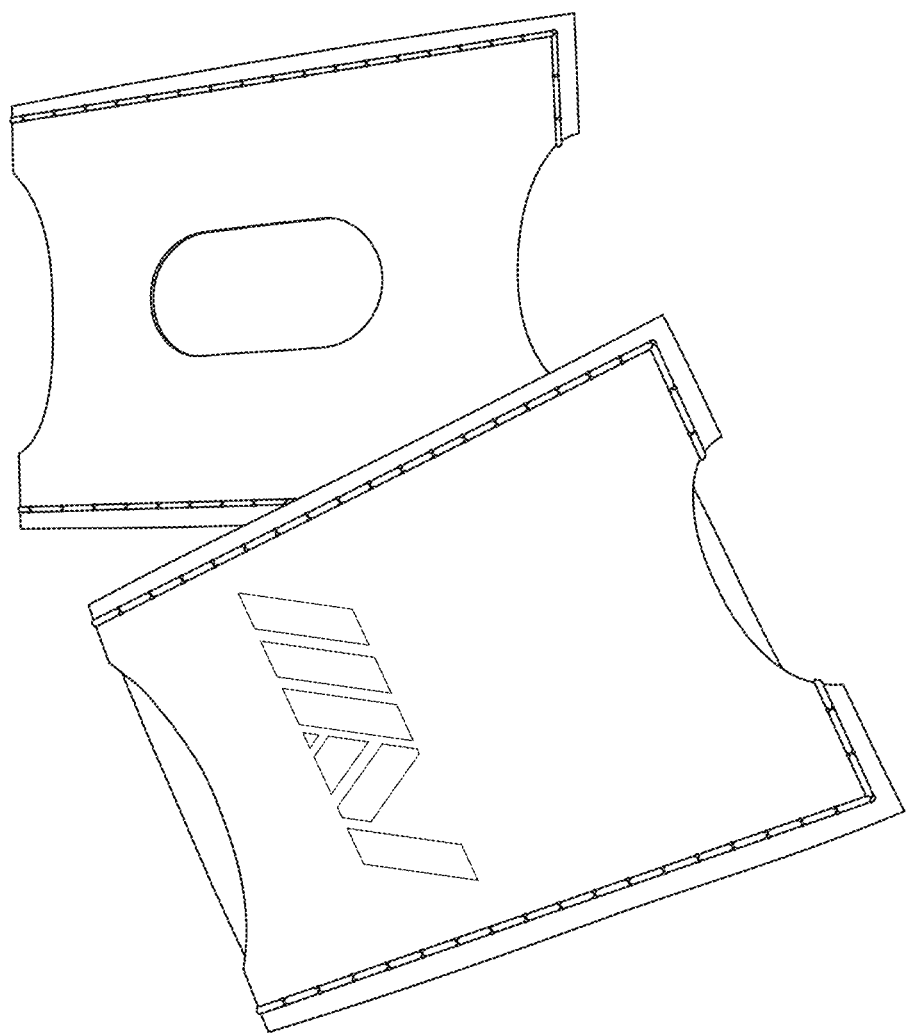
FIG. 6 is a view of the plurality of pieces of the epoxidized natural rubber-based material produced in accordance with the present disclosure assembled as a simple credit card wallet or carrier having the appearance, rigidity and strength as one of ordinary skill would expect with natural animal-hide leather.
Figure 7:
FIG. 7 is a resin impregnated fabric that may be utilized in accordance with the present disclosure.

The material pieces shown in FIGS. 5 & 6 may be cut using a laser cutter. Unlike animal-hide leather, the laser cutting did not char or degrade the edges of the natural leather-like material along the cutline. A finished wallet constructed of a natural leather-like material made according to the present disclosure is shown in FIG. 6. The separate pieces shown in FIG. 5 may be conventionally assembled (e.g., sewn) to construct a simple credit card wallet or carrier (as shown in FIG. 6) having the appearance, rigidity, and strength as one would expect in a similar article made from animal-hide leather. The natural leather-like material may be sewn and/or otherwise processed into a finished product using conventional techniques without limitation unless otherwise indicated in the following claims. As shown in FIG. 7 and as described in detail above, a fabric may be impregnated with a resin to provide various characteristics to an article made according to the present disclosure.

Additionally, the resin produced according to the present disclosure may be pigmented to match the coloration of natural animal-hide leather. Of particular utility are structural color pigments and/or mineral pigments that do not contain any harmful substances. One such example of illustrative structural color pigments is Jaquard PearlEx® pigments. It has been found that the blending of structural color pigments at relatively low loadings creates a natural leather-like material that has excellent visual aesthetics. Another such illustrative example of a suitable pigment may be procured from Kreidezeit Naturfarben, GmbH. Furthermore, it has been found that lightly sanding the resultant surface results in a material that strongly resembles tanned & dyed animal-hide leather.

Although certain examples disclosed herein may be configured to utilize only one layer of fabric, other illustrative samples have been created with multiple fabric layers to create thicker leather-like products. Since the reaction between epoxide groups and carboxylic groups does not create any condensation by-products, there is no inherent limit to the cross-sectional thickness that may be created. Generally, resin-coated fabrics and non-wovens are used in applications such as office furniture, including seating, writing surfaces, and room dividers; in garments, including jackets, shoes, and belts; in accessory items, including handbags, purses, luggage, hats, and wallets; and may be useful in residential decorations, including wallcoverings, floor coverings, furniture surfaces, and window treatments. Materials made according to the present disclosure may be used in any of those applications or other applications disclosed herein or later occurring depending on the suitability of the material without limitation unless otherwise indicated in the following claims. Additionally, current applications that are served by animal-based leather may be considered potential applications for materials made according to the present disclosure.

Figure 8A:
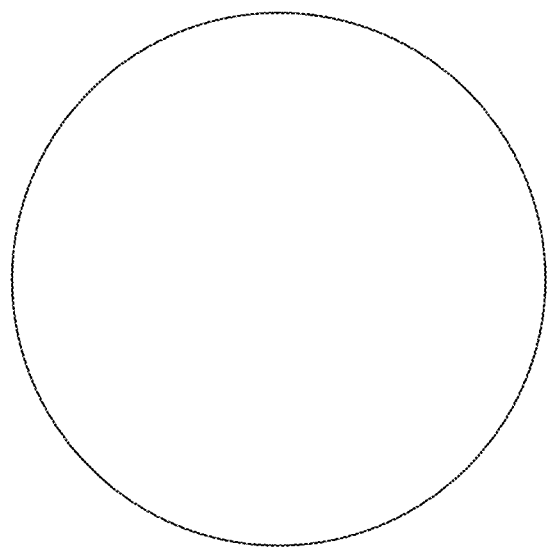
FIG. 8A is a top view of a ball made according to the present disclosure.
Figure 8B:
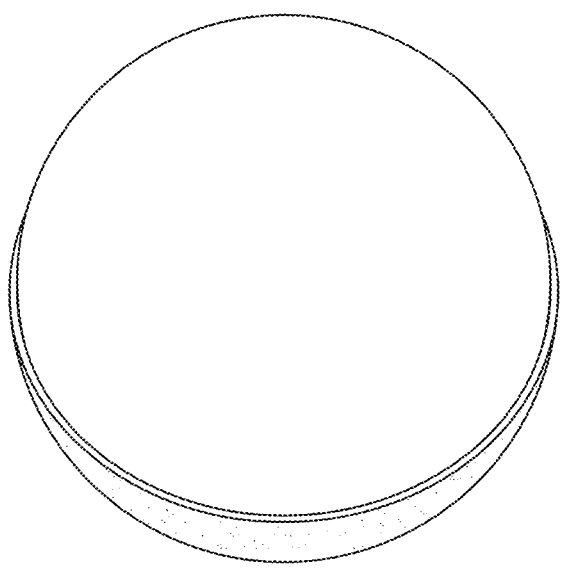
FIG. 8B is a side view of a ball made according to the present disclosure.

Furthermore, current applications that are served by petrochemical-based flexible films; notably those served by PVC and polyurethane-coated fabrics, may be considered potential applications for materials made according to the present disclosure. In addition, the resin as disclosed herein is substantially free of any off-gassing vapors when cured according to the times and temperatures as disclosed herein. Therefore, applications that are thicker than traditional films may also be served by the resins prepared according to the present disclosure. For example, the resin may be used to cast three-dimensional items in suitable molds. A top view of such a three-dimensional item configured as a ball made according to the present disclosure is provided in FIG. 8A, and a side view thereof is shown in FIG. 8B. The ball may be resin-based and may be produced from epoxidized soy oil and citric acid-based recipes along with structural color pigments. Simple tests indicate it has very low rebound and is expected to have excellent vibration absorption qualities.

Prior art three-dimensional cast resin items are typically made of styrene-extended polyester (orthophthallic or isophthalic systems). Such items may currently consist of two-part epoxies or two-part polyurethane resins. Such items may currently consist of silicone casting resins. One example of an application currently served by two-part epoxies is the thick-film coating of tables and decorative inlays, wherein the epoxy may be selectively pigmented to create a pleasing aesthetic design. Such applications have been successfully duplicated with casting resins created according to the present disclosure. Furthermore, small chess pieces have been successfully cast from resins created according to the present disclosure without detrimental off-gassing or trapped air. Accordingly, a wide array of applications exist for various materials made according to the present disclosure and the specific intended use of the final article produced by any method disclosed herein is not limited to a particular application unless otherwise indicated in the following claims.

E. Resinous Coatings, Products, and Methods

In various illustrative embodiments disclosed herein, natural products may have physical properties similar to synthetic coated fabrics, animal-based leather products, and foam products. As disclosed the physical properties of the natural products may be further enhanced to improve flexibility.

Background

Coatings are present on many consumer goods where such coatings are applied to provide surface protection and/or coloration. In addition, in some consumer goods, the coating may serve primarily to improve the haptics (that is, the tactile feel) of a surface. In one class of materials, namely animal-based leather and leather-like materials, surface coatings may be provided to provide surface protection, coloration, and improved haptics. For animal-based leather, such coatings may be substantially absorbed into the substrate and complement the natural haptics of the leather. Such coatings may be based on oils, waxes, and/or polymers (both natural and synthetic). In the creation of petrochemical-based leather alternatives (e.g., those based on PVC or PU), coatings may or may not be required, but when used, they are generally also petrochemical-based. In the development of a non-petrochemical and non-animal-based leather alternative, that is a material based entirely on plant-derived ingredients, it may also be desired to provide a coating that provides additional surface protection, coloration, and/or improved haptics to the non-petrochemical and non-animal-based leather alternative.

Summary

Generally, an illustrative embodiment of a coating may be created entirely from plant-derived ingredients. This coating may be particularly well suited for use on leather-like materials created from epoxidized natural rubber-based formulations but is not so limited unless otherwise indicated in the following claims. The coating created according to the present disclosure may be configured as substantially the reaction product between epoxidized vegetable oil and a polyfunctional naturally occurring acid (such as citric acid) as further disclosed in U.S. Pat. No. 10,400,061. The coating has been found to greatly improve the haptics of the products thus coated.

Illustrative Embodiments and Detailed Description

Animal-based leather materials exhibit a haptic quality that is particularly smooth to the touch, even for textured articles. It has been found that the relationship between the dynamic coefficient of friction and static (or "breakaway") coefficient of friction is key to quantifying this attribute. In generally, rubbery materials tend to have high grip, which may be reflected in both the actual values of the coefficients of friction (static and dynamic), while the static coefficient of friction is generally significantly higher than the dynamic coefficient of friction.

Certain leather-like materials (which are substitutes for animal-based leather) have been found to exhibit characteristic rubber-like coefficient-of-friction values; especially when such materials are formulated with epoxidized natural rubber (ENR). Formulations based on ENR with a 25% epoxidation level tend to have higher friction than formulations based on ENR with a 50% epoxidation level. This is consistent with polymer theory that correlates the glass transition temperature ($T_g$) with the coefficient of friction. That is, higher $T_g$ results in lower coefficient of friction while lower $T_g$ results in higher coefficient of friction. It has been documented that roughly each increased percentage change in epoxidation degree increases the $T_g$ by one degree Celsius. The coefficient of friction effect of changes in $T_g$ is due to the rate at which polymer chains can rearrange to engage the contacting surface. Unfortunately, many consumer goods require a material with a low $T_g$ to prevent articles from becoming stiff or brittle at reduced ambient temperatures (as may be encountered in the winter). Thus, the $T_g$ of the material formulated for low temperature flexibility (based on ENR with lower epoxidation levels) tends to make the material more grippy, which negatively impacts the haptics of an article.

Therefore, it is desired to have an article construction that has a base material with a low $T_g$ and a coating with a relatively higher $T_g$ while the coating ought to retain enough flexibility to avoid cracking at low temperatures. Additionally, testing the coefficient of friction in such a way that captures data consistent with what is observed with human hands is challenging. Generally, tests between animal-based leather and stainless-steel sheets and between animal-based leather and silicone sheets give data that does not correlate with the order of magnitude in coefficient of friction (COF) that a human hand would detect. In contrast, testing animal-based leather against a PTFE-coated-fiberglass baking sheet shows similar static and dynamic coefficients of friction while also giving a relatively low absolute value that reflects the feeling of the human hand. Taking that same test method and applying it to materials produced according to various methods disclosed in U.S. Pat. No. 10,400,061 gives the data shown in Table 1.

TABLE 1

Test results for an animal-based leather and two leather-like materials.

| Test material | Counter-surface | Dynamic COF | Static COF |
|---|---|---|---|
| Resin-coated plant-based leather | PTFE Coated Fiberglass | 0.15 | 0.59 |
| Uncoated plant-based leather based on ENR | PTFE Coated Fiberglass | 0.44 | 0.46 |
| Red Leather - Smooth Front | PTFE Coated Fiberglass | 0.17 | 0.17 |

From Table 1 we see that animal-based leather has a low static and dynamic COF while an uncoated plant-based leather material based on ENR has a relatively higher COF. In the first row we see data that coating such material with resin that is a reaction product between epoxidized soybean oil (ESO) and citric acid (various illustrative embodiments of which may be produced by methods disclosed in U.S. Pat. No. 10,400,061) lowers the dynamic COF to a value closer to animal-based leather. This results in a haptic quality that is considerably improved when compared to the uncoated ENR-based leather-like material.

Specifically, the coating used for resin-coated plant-based leather in Table 1 may be formulated by making a curative as disclosed in U.S. Pat. No. 10,400,061 and then mixing that curative with additional ESO to make a temperature-curable resin. In the first stage of curative manufacture, citric acid is dissolved in isopropyl alcohol, ethanol, or a combination of acetone and alcohol-containing solvent. In the second stage of curative manufacture ESO or similar epoxy-containing plant-based triglyceride oil is added to the dissolved citric acid solution and allowed to react while simultaneously removing the miscibilizing solvent. An illustrative curative formulation may use 50 parts of citric acid to 50 parts of ESO to 400 parts of miscibilizing solvent. After the curative has been formed and the miscibilizing solvent evaporated, then roughly 100 parts of curative is mixed with another 100 parts of ESO to make the coating resin. Such coating resin may be further diluted with solvent to make it easier to spray or spread. An example dilution for easy spreading may entail mixing the resin with an equal mass of isopropyl alcohol, ethanol, or acetone. Subsequently, the dilution solvent is allowed to evaporate, and the resin-coated substrate may be placed into an oven or a heated press to complete the curing reaction between the curative and the epoxidized plant-based triglyceride oil. In one illustrative embodiment, the coating resin may require 10 minutes to cure at 150° C. The texture of the coating resin may be determined by textured release paper or textured silicone sheets to give the desired appearance and haptics without limitation unless otherwise indicated in the following claims.

Another illustrative embodiment of a coating configured according to the methods disclosed herein is comprised of a resin coating formulation that may be produced based on the ratio of 100 parts of curative with 100 parts of ESO, which may be further modified for easy application. Specifically, such mixture may be diluted with acetone, isopropyl alcohol, or ethanol at a ratio of 1:1 (mixed resin:solvent) up to 1:20 (mixed resin:solvent). Generally, any chemically suitable solvent having a boil point from approximately 55 degrees Celsius to approximately 85 degrees Celsius may be used with various illustrative embodiments of a coating without limitation unless otherwise indicated in the following claims. Thinner dilutions may enable easy spraying of thin coatings while thicker dilutions may be more appropriate for roll-coating. In another illustrative embodiment, it has been found that the inclusion of a thickening polymer may aid in both the haptics of the cured film and in preventing the resin from squeezing out during the molding step. Such thickening polymers may include, but are not limited to unless otherwise indicated in the following claims, shellac, cellulose acetate, cellulose acetate phthalate, hydroxypropyl cellulose, and other naturally occurring or naturally derived polymers (without limitation unless otherwise indicated in the following claims) that are soluble in acetone, isopropyl alcohol, ethanol, or other suitable solvent without limitation unless otherwise indicated in the following claims. Generally, any thickener having the desired effect on the coating during use for its intended application may be used to create an illustrative embodiment of the coating disclosed herein without limitation unless otherwise indicated in the following claims.

Release additives such as waxes may be included in the resin coating to improve haptics and help release from texture paper. In one illustrative embodiment olive wax has been found to be particularly advantageous for such purposes. In other illustrative embodiments as disclosed herein, ultra-violet (UV) light stabilizing additives such as micro-$TiO_2$ or nano-$TiO_2$ may be added to improve the light stability of the coating and protect the underlying material, without departure from spirit of this disclosure and without limitation unless otherwise indicated in the following claims.

It has been found that curing said coating resin by molding it between an ENR-based rubber substrate as disclosed in U.S. Pat. No. 10,400,061 and textured silicone or texture paper yields and appearance and haptic quality that are particularly well suited for consumer goods that require low dynamic COF, low gloss, and a "dry" hand.

It is generally understood that the $T_g$ of materials correlates to the COF and the resin coating as disclosed herein has a $T_g$ higher than epoxidized natural rubber, even at the 50% epoxidation level. Furthermore, the resin coating may have a relatively higher crosslink density and thus may exhibit less conformability to the human hand. These attributes may contribute to the preferred "hand" of the material.

Industrial Applicability

Various illustrative embodiments of resin coatings as disclosed herein may be particularly suited to coating ENR-based rubber substrates as may be used in wallets, handbags, purses, shoes, belts, and similar consumer items that may be normally made of leather or PU/PVC faux leather without limitation unless otherwise indicated in the following claims. Illustrative embodiments of a coating disclosed herein may be particularly advantageous in being used to coat ENR-based rubber because of the inherent material compatibility between coating and substrate. For example, and without limitation unless otherwise indicated in the following claims, it has been found that thin coatings (e.g., less than 200 microns) as applied using textured silicone or texture paper are flexible enough to withstand bending at −15° C. without delamination or cracking; whereas such coating materials when subject to bending at low temperatures as a bulk material (thickness greater than 500 microns) are prone to cracking.

Untextured oven-curing such coatings may result in a glossy surface that has less desirable haptics when compared to press-cured and textured coatings. In some illustrative embodiments, the press-curing of the coating may occur concurrently with the curing of the substrate ENR-based rubber material. In other illustrative embodiments, the substrate may be cured in a first step, the coating applied in a second step, and the coating cured against textured silicone or texture paper in a third step.

In other illustrative embodiments, the resin coating may be applied directly to fabrics to provide water resistance. In such illustrative embodiments, a higher dilution level of the coating solution (e.g., ~3-6% solids) may yield a fabric with water resistance while retaining the flexible hand of the fabric. Higher solids contents may yield more barrier resistance with a stiffening of the substrate.

Materials made and/or coated according to any teaching of this disclosure may be used as flooring, exercise mats, bedding, shoe insoles, shoe outsoles, or sound absorption panels without limitation unless otherwise indicated in the following claims.

Materials made and/or coated according to any teaching of this disclosure may be molded into complex three-dimensional articles and multi-laminated articles. Three-dimensional articles may also consist of multiple material formulations arranged at various locations within an article to provide functionality required for each location.

The resilient memory foam based on vegetable oil may be used in applications where polyurethane is used today. Such applications may include shoes, seating, flooring, exercise mats, bedding, sound absorption panels, and the like without limitation unless otherwise indicated in the following claims. Many of these articles are consumable items that if made from synthetic polyurethane foams are non-biodegradable and are non-recyclable. If such items are made from the material disclosed herein, they would be biodegradable and thus not create a disposal problem.

Although the methods described and disclosed herein may be configured to utilize a coating comprised of a natural materials, the scope of the present disclosure, any discrete process step and/or parameters therefor, and/or any apparatus for use therewith is not so limited and extends to any beneficial and/or advantageous use thereof without limitation unless so indicated in the following claims.

3. Epoxidized Rubber

A. Summary

Coated fabrics prepared as disclosed in Section 2 above use a liquidous viscosity resin that allows such materials to flow into fabric and non-woven substrates. The resulting cured materials have mechanical properties that reflect highly-branched structures with limited polymer flexibility between crosslinks (modest strength and modest elongation). One means of increasing the mechanical properties is to begin with polymeric materials that have more linear structures and can be cured with lower cross-link density. The incorporation of shellac resin (which is a high molecular weight natural resin) in coated fabric recipes was found to improve strength and elongation but was also found to make the materials more plastic. Material formulations as disclosed in Section 3—Epoxidized Rubber are able to exhibit excellent mechanical properties (very high strength and higher elongation) without compromising material flexibility at room temperature (e.g., ~15 C-30 C).

A natural material based on epoxidized natural rubber (ENR) is disclosed that contains no animal-based substances and is substantially free of petrochemical-containing materials. In certain embodiments this natural material may serve as a leather-like material (which may be a substitute for animal-hide leather and/or petrochemical-based leather-like products (e.g., PVC, polyurethane, etc.) without limitation unless otherwise indicated in the following claims. Furthermore, the natural material based on ENR as disclosed herein may be configured to be substantially free of allergens that may cause sensitivity in certain people. The material disclosed herein is more cost effective and scalable than other proposed materials for petrochemical-free vegan leather. With certain treatments the natural material may also be made water resistant, heat resistant, and retain flexibility at low temperatures. This set of beneficial attributes may apply to any natural material based on ENR that is produced according to the present disclosure and to which additional treatments are applied, as suitable to a particular application, as disclosed and discussed herein.

In at least one embodiment, an elastomeric material may be formed to include at least a primary polymeric material further comprised of epoxidized natural rubber and a curative comprised of a reaction product between a polyfunctional carboxylic acid and an epoxidized vegetable oil as disclosed in Section 1—Curative. The elastomeric material may also be formed wherein the primary polymeric material is greater in volumetric proportion in comparison to the curative. The elastomeric material may also be formed to wherein the epoxidized natural rubber has a degree of epoxidation between 3% and 50% without limitation unless otherwise indicated in the following claims. Another embodiment of the elastomeric material may be comprised of a primary polymeric material comprised of epoxidized natural rubber and a cure system that is not sulfur-based nor peroxide-based, and wherein the cure system contains over 90% reactants from biological sources.

In another embodiment, an article may be formed from the reaction product of epoxidized natural rubber and a curative wherein the curative is the reaction product between a naturally occurring polyfunctional carboxylic acid and an epoxidized vegetable oil. In another embodiment, an article comprised of epoxidized natural rubber with fillers including cork powder and precipitated silica may be formed and the article may be molded as a sheet with leather-like texture. In another embodiment, an article may be formed wherein the reaction product further contains fillers of cork powder and silica. In another embodiment, the article may be formed or configured such that two or more layers of the reaction product have substantially different mechanical properties and the mechanical property differences are due to differences in filler composition.

B. Illustrative Methods and Products

Epoxidized natural rubber (ENR) is a commercially available product under the tradename Epoxyprene® (Sanyo Corp.). It is available in two grades with 25% epoxidation and 50% epoxidation, ENR-25 and ENR-50 respectively. However, in certain embodiments it is contemplated that an ENR with a level of epoxidation between 3% and 50% may be used without limitation unless otherwise indicated in the following claims. One of ordinary skill will appreciate that ENR may also be produced from protein denatured or removed latex starting products. During the epoxidation of natural rubber, it has been found that the allergen activity is significantly reduced—the literature for Epoxyprene discloses that the Latex Allergen Activity is only 2-4% of that of untreated natural rubber latex products. This is a substantial improvement for those that may experience latex allergies. ENR is used in materials of the present disclosure to impart elongation, strength, and low temperature flexibility to the products disclosed and claimed.

ENR is traditionally cured with chemistries that are common in the rubber compound literature, e.g., sulfur cure systems, peroxide cure systems, and amine cure systems. According to the present disclosure, a specially prepared curative with carboxylic acid functionality is prepared to be used as the curative as fully disclosed in Section 1 above. There are a number of naturally-occurring polyfunctional carboxylic acid containing molecules, including but not limited to citric acid, tartartic acid, succinic acid, malic acid, maleic acid, and fumaric acid. None of these molecules are miscible in ENR and thus have limited effectivity and utility. It has also been found that a curative of, for example, citric acid, and an epoxidized vegetable oil may be prepared that is soluble in ENR. Specifically, curatives of epoxidized soybean oil (ESO) and citric acid have been prepared with an excess of citric acid to prevent gelation of the ESO. Citric acid itself is not miscible in ESO, but it has been advantageously been discovered that solvents such as isopropyl alcohol, ethanol, and acetone (for example but without limitation unless otherwise indicated in the following claims) may make a homogeneous solution of citric acid and ESO. In this solution, the excess citric acid is made to react with the ESO and create a carboxylic-acid-capped oligomeric material (that is still liquid) as shown in FIG. 1. The miscibilizing solvent contains at least some hydroxyl-containing (i.e., alcohol) solvent that at least partially reacts with some of the carboxylic acid functional groups on the citric acid. The majority of the solvent is removed with elevated temperature and/or vacuum—leaving behind a curative that may be used as a miscible curative for the ENR. By thus constructing the curative, the resultant material is substantially free of petrochemical-sourced inputs.

First Illustrative Embodiment and Process for the Creation of Curative that is Used in the Preparation of ENR-based Material Curative was prepared by dissolving 50 parts of citric acid in a warm blend of 50 parts of isopropyl alcohol and 30 parts of acetone. After the citric acid was dissolved, 15 parts of shellac flakes (blonde dewaxed) were added to the mixture along with 50 parts of ESO. The mixture was heated and stirred continually until all the volatile solvents had evaporated. It is noteworthy that the total residual volume is greater than that of the citric acid, ESO, and shellac—meaning that some of the isopropyl alcohol (IPA) is grafted onto the citric acid capped curative (via an ester linkage). Varying the ratio of IPA to acetone can vary the degree of IPA grafting onto the curative.

Second Illustrative Embodiment and Process for ENR-Based Material

Epoxidized Natural Rubber with 25% epoxidation (ENR-25) was mixed at 100 parts of rubber to 30 parts of the curative as prepared in the first embodiment. In addition, 70 parts of ground cork powder (MF1 from Amorim) was added as a filler. This mixture was made on a two-roll rubber mill according to normal compounding practices. The mixture was sheeted out and molded at 110° C. for 30 minutes. It was found to be properly cured, with similar elongation and strain recovery as sulfur and peroxide cure systems.

Third Illustrative Embodiment and Process for ENR-Based Material

Epoxidized Natural Rubber with 25% epoxidation (ENR-25) was mixed at 100 parts of rubber to 45 parts of the curative as prepared in the first embodiment. In addition, 70 parts of ground cork powder (MF1 from Amorim) was added as a filler. This mixture was made on a two-roll rubber mill according to normal compounding practices. The mixture was sheeted out and molded at 110° C. for 30 minutes. It was found to be fully cured, but with some attributes of over-crosslinked systems; including lower tear resistance and very high resilience.

Fourth Illustrative Embodiment and Process for ENR-Based Material

Epoxidized Natural Rubber with 25% epoxidation (ENR-25) was mixed at 100 parts of rubber to 15 parts of the curative as prepared in the first embodiment. In addition, 70 parts of ground cork powder (MF1 from Amorim) was added as a filler. This mixture was made on a two-roll rubber mill according to normal compounding practices. The mixture was sheeted out and molded at 110° C. for 30 minutes. It was found to be cured, but with a relatively low state-of-cure; with attributes such as low resilience and poor strain recovery.

Fifth Illustrative Embodiment and Process for ENR-Based Material

Epoxidized Natural Rubber with 25% epoxidation (ENR-25) was mixed at 100 parts of rubber to 30 parts of the curative as prepared in the first embodiment. In addition, 70 parts of ground cork powder (MF1 from Amorim) was added as a filler. Additionally, 20 parts of garneted fiber (from recovered textiles) was added. This mixture was made on a two-roll rubber mill according to normal compounding practices. The mixture was sheeted out and molded at 110° C. for 30 minutes. It was found to be fully cured and additionally had a relatively high extensional modulus in accordance with the fiber content.

Sixth Illustrative Embodiment and Process for ENR-Based Material

Epoxidized Natural Rubber with 25% epoxidation (ENR-25) was mixed at 100 parts of rubber to 30 parts of the curative as prepared in embodiment 1. In addition, 60 parts of ground cork powder (MF1 from Amorim) was added as a filler. Additionally, 80 parts of garneted fiber (from recovered textiles) was added. This mixture was made on a two-roll rubber mill according to normal compounding practices. The mixture was sheeted out and molded at 110° C. for 30 minutes. It was found to be fully cured and additionally had a very high extensional modulus in accordance with the fiber content.

Seventh Illustrative Embodiment and Process for ENR-Based Material

Epoxidized Natural Rubber with 25% epoxidation (ENR-25) was mixed at 100 parts of rubber to 60 parts of the curative as prepared in embodiment 1. In addition, 35 parts of ESO was added as a reactive plasticizer. In addition, 350 parts of ground cork powder (MF1 from Amorim) was added as a filler. Additionally, 30 parts of garneted fiber (from recovered textiles) was added. This mixture was made on a two-roll rubber mill according to normal compounding practices. The mixture was sheeted out and molded at 110° C. for 30 minutes. It was found to be fully cured, rigid, and additionally had a relatively high extensional modulus in accordance with the fiber content.

Eighth Illustrative Embodiment and Process for the Creation of Curative that is Used in the Preparation of ENR-Based Material Curative was prepared by dissolving 50 parts of citric acid in a warm blend of 110 parts of isopropyl alcohol. After the citric acid was dissolved, 50 parts of ESO was added to the mixture along with 10 parts of Beeswax. The mixture was heated and stirred continually until all the volatile solvents had evaporated. The total residual volume is greater than that of the citric acid, ESO, and beeswax—meaning that some of the isopropyl alcohol (IPA) is grafted onto the citric acid capped curative (via an ester linkage). The reduced liquid mixture was added to fine precipitated silica (Ultrasil 7000 from Evonik) to make a 50 wt % dry liquid concentrate (DLC) for easy addition in subsequent processing.

Ninth Illustrative Embodiment and Process for ENR-Based Material

Epoxidized Natural Rubber with 25% epoxidation (ENR-25) was mixed at 100 parts of rubber to 50 parts of the curative DLC as prepared in the eighth illustrative embodiment along with 30 additional parts of fine precipitated silica. It was found that mixing of the curative DLC prepared in eighth illustrative embodiment eliminated some stickiness in processing that was experienced when mixing in curative that was not pre-dispersed as a DLC. The resulting mixture was cured in a press at ~50 psi at 110° C. for 30 minutes to make a translucent slab.

The material of this embodiment was found to have attributes that are analogous to those found in animal-hide leather; including slow recovery after folding, vibration damping attributes, and high tear strength. It is believed that the total silica loading (55 parts) and this particular curative contribute to the "lossy" characteristics of this material. Without wishing to be bound by theory, it is possible that the level of total silica loading is approaching the percolation threshold and creating particle-particle interactions that are creating the lossy attributes without limitation unless otherwise indicated in the following claims. This is a preferred mechanism to reliance on polymer formulations that experience a $T_g$ near room temperature (e.g., ~15 C-30 C) as a means to create a lossy material, as such an approach would lead to poor cold crack resistance.

Tenth Illustrative Embodiment and Process for ENR-Based Material

Epoxidized Natural Rubber with 25% epoxidation (ENR-25) was mixed at 100 parts of rubber to 30 parts of so-called "cottonized" hemp fiber, this mixture was mixed on a two-roll mill using a tight nip to get an even dispersion of fiber. To this masterbatch 50 parts of the curative DLC as prepared in the eighth illustrative embodiment along with 30 additional parts of fine precipitated silica. The resulting mixture was cured in a press at ~50 psi at 110° C. for 30 minutes to make a translucent slab. The material of the tenth illustrative embodiment was found to have similar attributes as the material of the ninth illustrative embodiment with the change of having much lower elongation at break and much higher modulus in accordance with the fiber loading.

Eleventh Illustrative Embodiment and Process for ENR-Based Material

A black batch of ENR-based material was prepared by mixing ENR-25 with coconut charcoal to achieve the desired black color. In addition to the black colorant, other ingredients were added to yield a processable batch of rubber. Other ingredients may include clay, precipitated silica, additional epoxidized soybean oil, castor oil, essential oil odorants, tocopheryl (Vitamin E—as a natural antioxidant), and curative. This material was then cured in a tensile-plaque mold at 150° C. for 25 minutes to complete the curing.

Twelfth Illustrative Embodiment and Process for ENR-Based Material

A brown batch of ENR-based material was prepared by mixing ENR-25 with cork powder to achieve the desired brown color and texture. In addition to the cork, other ingredients were added to yield a processable batch of rubber. Other ingredients may include clay, precipitated silica, additional epoxidized soybean oil, essential oil odorants, tocopheryl (Vitamin E—as a natural antioxidant), and pre-polymer curative. This material was then cured in a tensile-plaque mold at 150° C. for 25 minutes to complete the curing.

Figure 9:
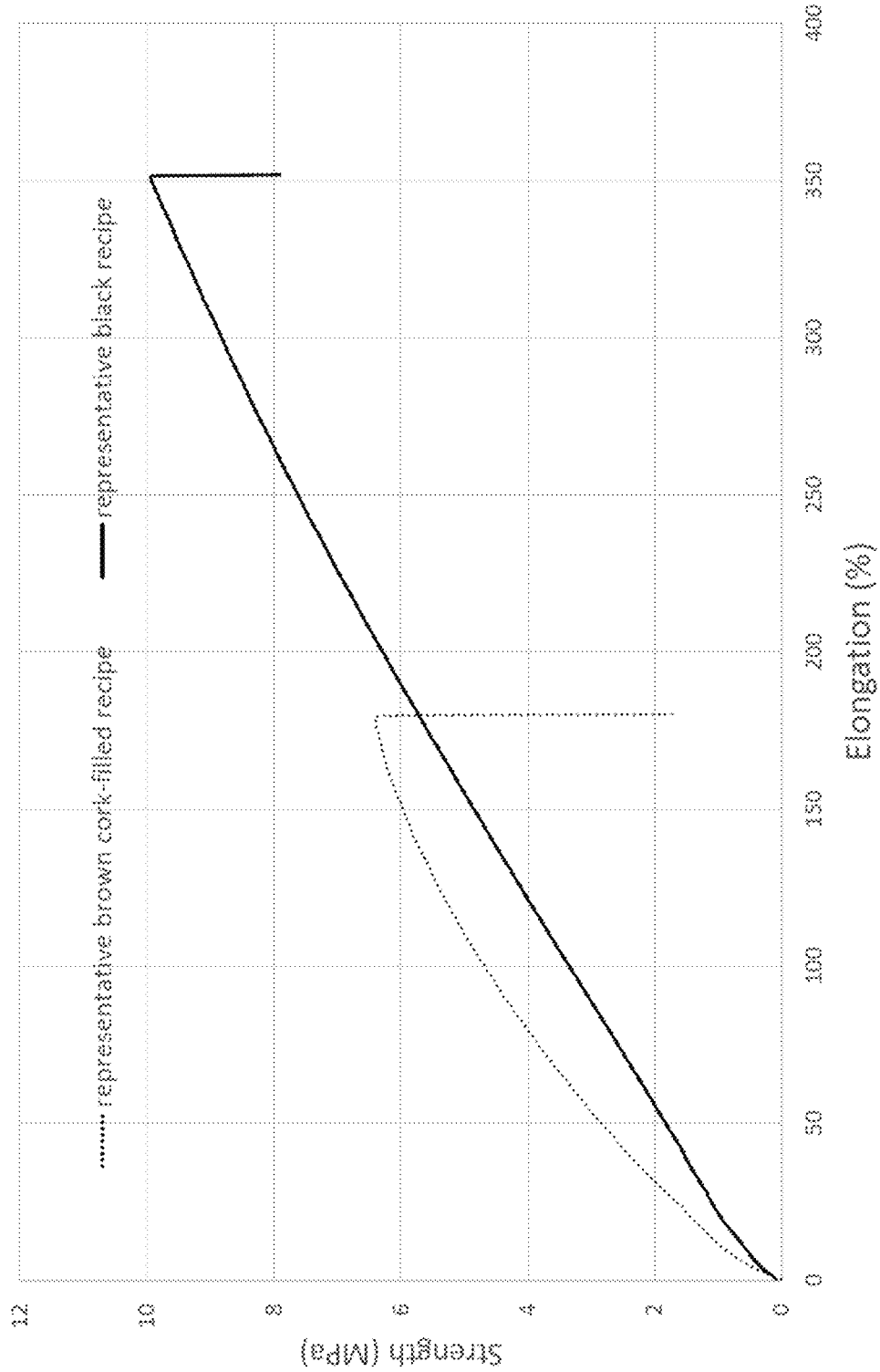
FIG. 9 provides a graphical representation for two stress-strain curves of two different ENR-based materials.

Tensile stress-strain curves are shown in FIG. 9 for materials prepared according to the eleventh and twelfth embodiments. It can be seen that the cork-filled brown batch (twelfth embodiment) is higher in modulus than the black batch (eleventh embodiment) for this particular example. In these two illustrative embodiments, the brown batch (twelfth embodiment) had a Shore A hardness of 86 while the black batch (eleventh embodiment) had a Shore A hardness of 79. The optimal amount of the additional materials may vary according to the specific application of the ENR-based material, and various ranges for same are shown in Table 2.

TABLE 2

Acceptable and Preferred Ranges of Other Ingredients.

| Ingredient | Preferred Range (Percent of Total Product Weight) | Acceptable Range (Percent of Total Product Weight) |
|---|---|---|
| ENR-25 | 40-60 | 20-90 |
| Curative | 2-10 | 1-50 |
| Cork | 3-10 | 0-70 |
| Colorant | 0-15 | 0-50 |
| Precipitated Silica | 15-35 | 0-50 |
| EVO | 0-10 | 0-30 |
| Non-reactive vegetable oil | 0-10 | 0-30 |
| Odorant | 0.5-3 | 0-10 |
| Vitamin E/antioxidant | 0.2-2 | 0-4 |
| Mineral filler (e.g., clay) | 0-15 | 0-50 |

Variations in the other ingredients: clay, precipitated silica, additional epoxidized soybean oil, castor oil, and/or amount of curative may be used to vary the modulus of a batch/recipe within a range that is characteristic of traditional rubber recipes. By those well versed in rubber compounding it is recognized that formulations of rubber may be selectively compounded with hardnesses ranging from approximately 50 Shore A up to about 90 Shore A. The illustrative formulations show that these compounds fall within the range of expected performance for epoxidized natural rubber. Furthermore, it is known that traditionally compounded natural rubber may achieve strength values from 10-25 MPa. The eleventh illustrative embodiment displays physical properties in line with traditionally compounded natural rubber.

Materials made according to this disclosure may further be reinforced with continuous fiber to make stronger products. Methods for reinforcement may include but are not limited to use of both woven textiles, non-woven textiles, unidirectional strands, and plied unidirectional layers unless otherwise indicated in the following claims. Reinforcement may preferably come from natural fibers and yarns. Illustrative yarns may include, but are not limited to, cotton, jute, hemp, ramie, sisal, coconut fiber, kapok fiber, silk, or wool and combinations thereof unless otherwise indicated in the following claims. Regenerated cellulose fibers such as viscose rayon, Modal® (a specific type of viscose, by Lenzing), Lyocell (also known as Tencel®, by Lenzing), or Cuprammonium Rayon may also be used without limitation or restriction, as suitable for a particular application, unless otherwise indicated in the following claims. Alternatively, reinforcement may require the strength of synthetic fiber yarns based on para-aramids, meta-aramids, polybenzimidazole, polybenzoxazole, and similar high strength fibers. In another illustrative embodiment, a reinforcement layer and/or material may be configured from a protein-based fiber, which fibers include but are not limited to of wool, silk, alpaca fiber, qiviut, vicuna fiber, llama wool, cashmere, and angora unless otherwise indicated in the following claims. Illustrative natural yarns may beneficially be treated by the natural fiber welding process to improve their strength, reduce their cross-sectional diameter, and improve fiber-to-elastomer bonding characteristics. Such yarns may be plied into threads that provide interpenetration features between reinforcement and elastomer as well as improve the strength of the reinforcement. For certain applications it may be preferred to provide reinforcement by unidirectional reinforcement in plied layers as compared to woven and knit reinforcement. It has been found that such woven and knit reinforcement may improve product stiffness but may negatively impact tear strength by creating stress-concentration features around yarns and fibers. In contrast, unidirectional reinforcement at various ply angles may avoid such stress concentrating features. In a related way, non-woven mats may be used as reinforcement as they do not contain regularly oriented stress-concentrating features but do enable long reinforcement fiber lengths at high fiber volume fractions. In a related way, integrally mixed fiber content has been found to improve stiffness but decrease tear strength at certain volume and weight fractions. Tear strength improvement is observed when total fiber content exceeds 50 phr (in traditional rubber compounding nomenclature), especially with even dispersion and good retention of fiber length during processing.

Molding and curing of materials according to the present disclosure has been found to require only modest pressure to achieve porosity-free articles. While traditional rubber cure systems evolve gasses and thus require molding pressures generally greater than 500 psi and often closer to 2000 psi, the compounds disclosed herein only require molding pressure of 20 psi-100 psi, or more specifically 40 psi-80 psi to achieve consolidation and porosity-free articles. The actual required pressure may be dependent more on the amount of material flow and detail required in the final article. Such low molding pressures allow the usage of much lower tonnage presses that are correspondingly less expensive. Such pressures also allow much less expensive tooling; even embossed texture papers have been found to create suitable patterns in elastomeric materials made according to this disclosure and such texture papers are found to be reusable for multiple cycles without loss of pattern detail. The material edge strength has been found to be adequate even when using open-sided tooling—this allows for faster tool cleaning and significantly reduced tooling costs.

The low molding pressures further allow for such elastomeric materials to be molded directly onto the surface of resilient and porous core substrates. For example, the material may be overmolded onto non-woven insulative mats as a resilient flooring product or automotive interior product that exhibits soft-touch and sound absorption characteristics. Similarly, the product may be overmolded onto softwoods or similar low compressive strength substrates without damage to the substrate.

As previously described, certain catalysts are known in the art to speed up the carboxylic acid addition to epoxide groups and such may be used in formulating recipes according to the present disclosure without limitation unless otherwise indicated in the following claims.

Animal-hide leather has distinctive characteristics in terms of elongation, resiliency, loss modulus, and stiffness that are different than a regularly compounded elastomer. In particular, animal-hide leather may be folded back on itself without cracking—largely independent of temperature. That is, it does not have a material phase that becomes brittle at low temperatures. Animal-hide leather also has vibration damping characteristics that are less common with regularly compounded elastomeric compounds. Animal-hide leather has slow recovery after creasing or folding, but does generally recover completely with minimal plastic deformation. These attributes may be mimicked in materials compounded according to the present disclosure in the illustrative embodiments and methods for same disclosed herein.

C. Additional Treatments

Articles produced according to this disclosure may be finished by any means known in the art. Such means include but are not limited to embossing, branding, sanding, abrading, polishing, calendering, varnishing, waxing, dyeing, pigmenting, and the like unless otherwise indicated in the following claims. Such articles may be configured to exhibit characteristics very analogous to animal-hide leather. The surfaces then may be treated with natural oil or wax protectants, subject to a particular application.

D. Applications/Additional Illustrative Products

Articles molded with materials according to this disclosure may be used as plant-based alternatives to petrochemical-based leather-like products and/or animal-hide leather products. In one illustrative embodiment the articles may be molded substantially as sheets with various textures according to the desired application. The sheets may be used in durable goods such as upholstery, seating, belts, shoes, handbags, purses, backpacks, straps, equestrian gear, wallets, cellular phone cases, and similar articles without limitation unless otherwise indicated in the following claims. Alternatively, such materials may be molded directly to the shape of the final article in applications such as shoe soles, shoe toes, shoe heal cups, shoe uppers, purses, horse saddles and saddle components, helmet coverings, chair armrests, and similar articles.

Materials according to this disclosure may be overmolded onto resilient materials and thus be used as flooring, exercise mats, or sound absorption panels. Similarly, those materials could be overmolded onto garments as, for example, a knee patch or elbow patch for improved abrasion resistance for a region of a garment. Likewise, motorcycle garments (e.g., chaps) and equestrian gear may be overmolded of materials according to this disclosure to provide improved local abrasion resistance and protection.

Materials according to this disclosure may be molded into complex three-dimensional articles and multi-laminated articles. That is, certain formulations according to this disclosure may provide improved tear strength, while other formulations according to this disclosure may provide improved abrasion resistance. Such formulations may be laminated and co-molded to provide articles with improved overall performance compared with an article made of only one formulation. Three-dimensional articles may be molded to provide additional product features, attachment points, and other functionality without limitation unless otherwise indicated in the following claims. Three-dimensional articles may also consist of multiple formulations arranged at various locations within an article to provide functionality required for each location.

Figure 10A:
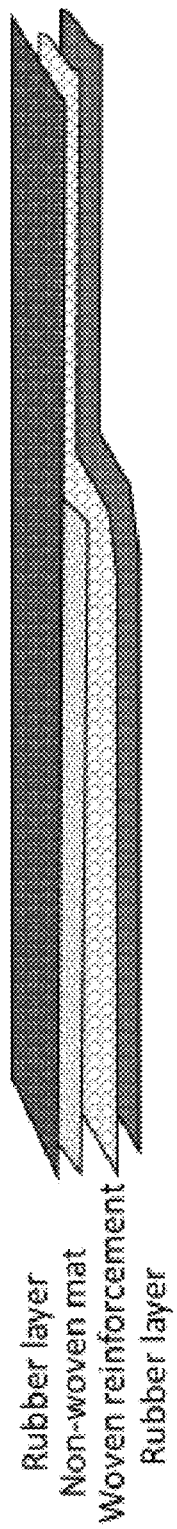
FIG. 10A provides a depiction of an ENR-based material configured with inherent functionality for engaging a belt buckle.
Figure 10B:
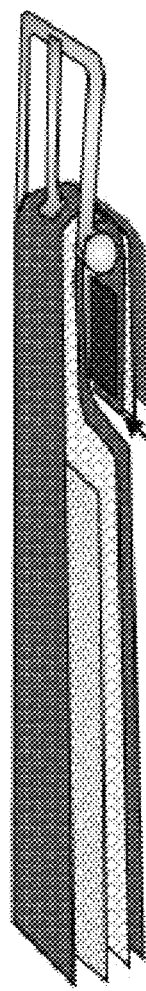
FIG. 10B provides a depiction of the ENR-based material from FIG. 10A after engagement with a belt buckle.

One example of such molded-in functionality is shown in FIGS. 10A & 10B, which provides a perspective view of a portion of a belt made of an ENR-based material. Specifically, in FIG. 10A, a tapered feature (shown on the right-hand side of FIG. 10A) may be molded into a sheet that is later slit into belt sections. The reduced thickness (which may be due to the absence of a backing material/backing layer (e.g., non-woven mat) in the area having reduced thickness) allows for a folded buckle retention area that is substantially similar in thickness to belt sections that are not folded over on itself, which is shown in FIG. 10B where the reduced-thickness area has been engaged with a buckle. Additionally, the region that is folded back onto itself may be preferentially bonded in place with additional resin or ENR-based material molded between the folded region with a cure cycle that is similar to that used during the initial molding of the sheet.

Figure 11:
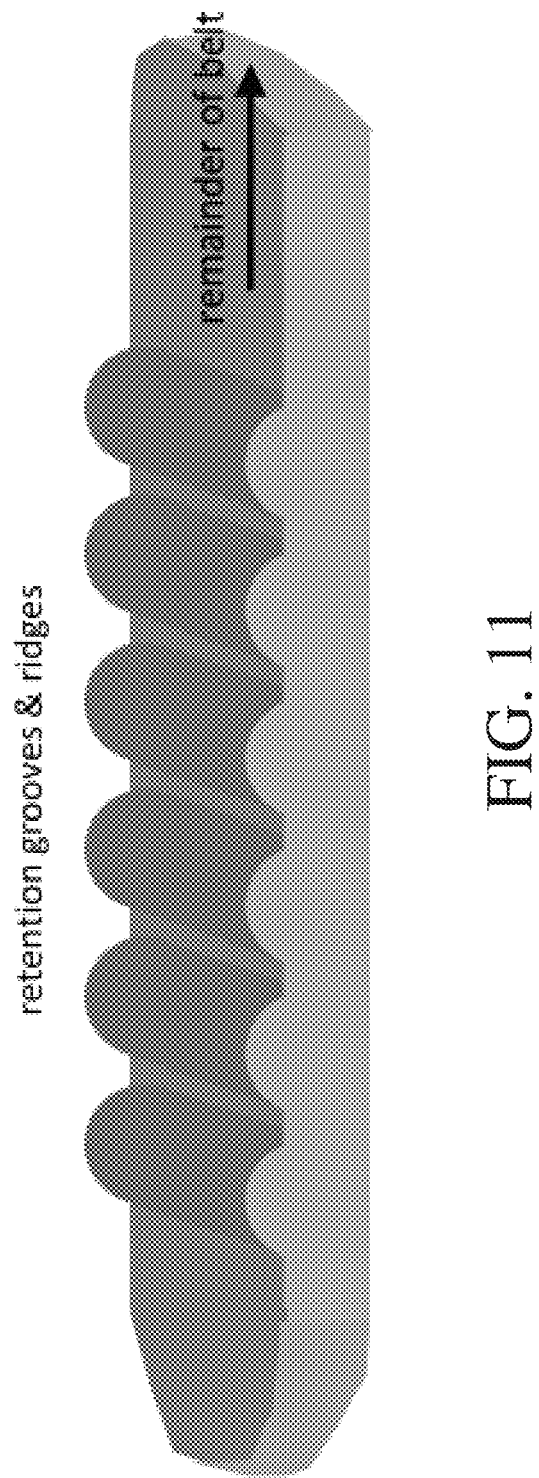
FIG. 11 provides a depiction of an ENR-based material having grooves and ridges formed therein.

Shown in FIG. 11 are a series of retention grooves and ridges that may be molded into the end of the belt to provide a friction-based retention feature. That is, some belts made with woven nylon or other textiles are tightened and retained on the wearer by friction between ribs woven into the belt and a metal bar used in the clasp. Such features may be advantageous in that they prevent stress risers from developing around punched holes used for retention in common belt buckles. Retention grooves & ridges and/or other features for retaining the position of a portion of a belt easily molded into a belt sheet by the creation of matching features in the mold tooling (which may be silicone or metal) when making an ENR-based material according to the present disclosure.

Figure 12:
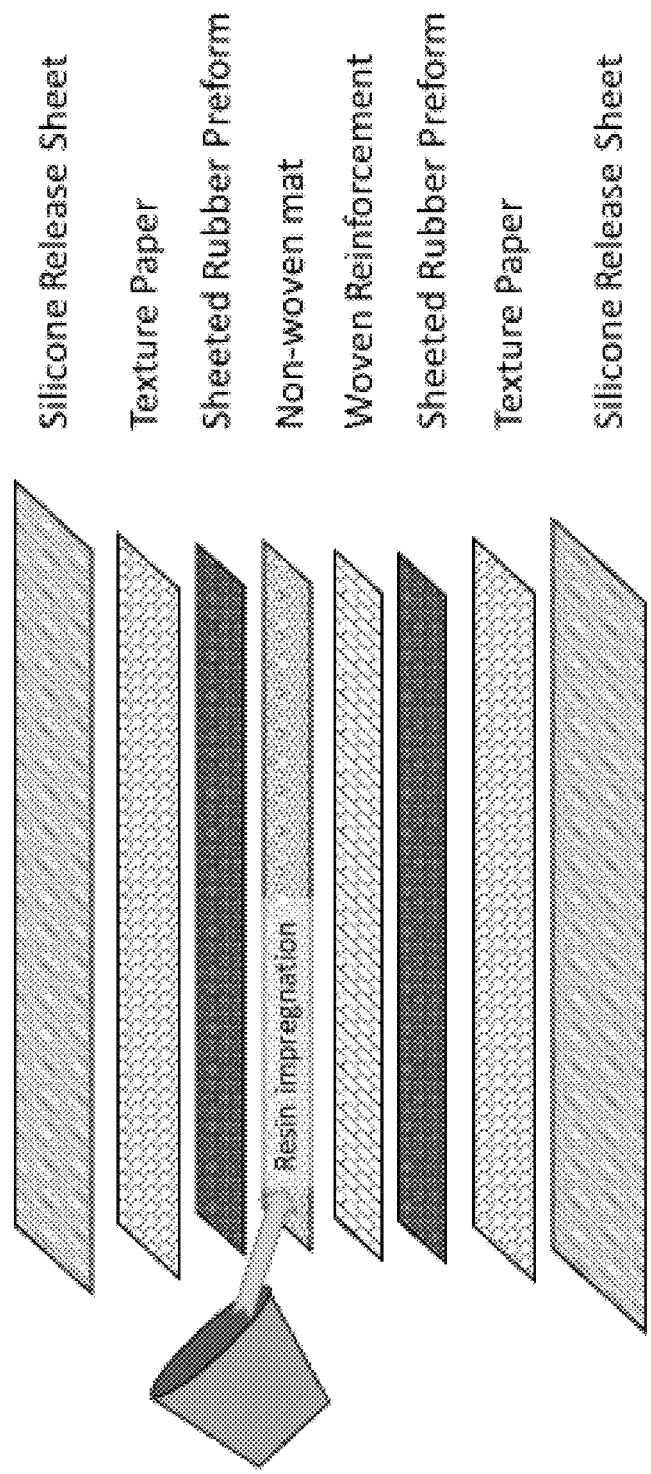
FIG. 12 provides a depiction of an illustrative embodiment of a molding system that may be used for certain ENR-based materials.

ENR-based materials configured for use as a belt may be made in sheets and may be produced by molding according to the pattern illustrated in FIG. 12. As shown in FIG. 12, the sheet may be comprised of various layers, wherein each outside layer of the sheet may be comprised of an ENR-based material (e.g., "sheeted rubber preform" in FIG. 12) with one or more fibrous backing materials/backing layers positioned therebetween. The backing materials may be comprised of a woven reinforcement or a non-woven mat in the illustrative embodiment shown in FIG. 12, but any suitable backing material/backing layer may be used without limitation unless otherwise indicated in the following claims. At least one of the backing materials may be a coated fabric (as shown in FIG. 12 for the layer labeled "non-woven mat"), which may be constructed in accordance with Section 2 described herein above. Texture paper may be positioned adjacent one or both ENR-based material layers to provide the desired aesthetics to the outer layers of the sheet and resulting article. Finally, a silicone release sheet may be positioned adjacent one or both texture papers for ease of use.

It has been found that the relatively low required pressure to yield a properly cured specimen utilizing ENR-based materials allows for the use of low-cost paper and silicone tooling. So-called texture papers are used in polyurethane and vinyl leather alternatives to achieve the desired texture. It has been found that these texture papers likewise are effective in creating patterns in ENR-based materials as disclosed herein. An advantageous molding configuration is shown in FIG. 12, wherein release silicone sheets are provided as the top-most and bottom-most layers in the sandwich that is molded under temperature and pressure. If the "outside" faces of the belt are desired to be textured, texture paper may be provided next to the silicone sheets. These may advantageously be treated with a release aid to promote easy release and reuse of the texture paper. Silicone and vegetable oil have both been found to be effective in release and reuse of the texture paper but any suitable release agent may be used without limitation unless otherwise indicated in the following claims.

The uncured rubber pre-form sheets may be loaded into the sandwich next to the texture paper(s). Between the rubber pre-form sheets a non-woven mat and/or woven reinforcement layer(s) may be provided. In one illustrative embodiment, the non-woven mat may comprise recycled textiles, hemp fibers, coconut coir fibers, or other environmentally benign (biodegradable) fibers, and/or combinations thereof without limitation unless otherwise indicated in the following claims. In one illustrative embodiment the woven reinforcement layer may comprise jute burlap or similar open-structure woven product that is high in strength and biodegradable. In another illustrative embodiment so-called cotton monk's cloth may be also used as a woven reinforcement layer without restriction unless otherwise indicated in the following claims. In some configurations open-structure woven products provide relatively good tear strength when compared to tight woven fabrics. In another illustrative embodiment, a reinforcement layer (woven or non-woven) may be configured from a protein-based fiber, which fibers include but are not limited to of wool, silk, alpaca fiber, qiviut, vicuna fiber, llama wool, cashmere, and angora unless otherwise indicated in the following claims.

ENR-based materials configured for use as leather substitutes may be used in applications where animal-hide leather is used today. Such applications may include belts, purses, backpacks, shoes, table tops, seating, and the like without limitation unless otherwise indicated in the following claims. Many of these articles are consumable items that if made from petrochemical-based leather-like products are non-biodegradable and are non-recyclable. If such items are made from the material disclosed herein, they would be biodegradable and thus not create a disposal problem. Furthermore, unlike animal-hide leather, which requires significant processing to be made durable and stable (some of which uses toxic chemicals), the materials disclosed herein may require less processing and will use environmentally friendly chemicals. Additionally, animal-hide leather is limited in size and may contain defects that render large pieces inefficient to produce. The material disclosed in at least one embodiment herein does not have the same kind of size limitations as the reaction between epoxide groups and carboxylic groups does not create any condensation by-products, there is no inherent limit to the cross-sectional thickness that may be created.

In another application for material produced according to the present disclosure, the leather substitute material (which may be configured as an ENR-based material) may be used for footwear, specifically the upper portion of the footwear. Generally, it is contemplated that leather substitute material may be engaged with a fabric backing. In one illustrative embodiment the fabric backing may be comprised of Rayon (e.g., Tencel, Lyocell, etc.), and in another illustrative embodiment the fabric backing may be comprised of canvas, hemp, or other suitable material. It is contemplated that the optimal fabric backing may vary depending on the specific application and is therefore in no way limiting to the scope of the present disclosure unless otherwise indicated in the following claims. It is further contemplated that for at least some applications, the leather substitute material and fabric backing may have the following characteristics:

Tensile Strength (ASTM D 5035-2011) 600 N/5 cm, Elongation (ASTM D 5035-2011) 80%+/−20

Color fastness to rubbing (crocking) (ISO 20433:2012), Dry≥4 and Wet≥4

Bonding Strength of coated material/between leather substitute material (which may be configured as an ENR-based material) layer and the fabric backing material, 2.5 N/mm Ball Flex at room temperature (e.g., ~15 C-30 C). ASTM D 6782-13 (23±1), 100,000 cycles, Pass Abrasion—Taber (ASTM D 3884-09, H-22, 1000 g, >1000 cycles), Pass Color fastness to wash (ISO-105-C06:2010), ≥4

However, such characteristics are not meant to be limiting in anyway and are for illustrative purposes only unless otherwise indicated in the following claims.

Generally, it has been observed through testing that when silica is added as a type of filler with the leather substitute material (which may be configured as an ENR-based material), the result may be a higher cohesive strength within the leather substitute material layer than is shown in a leather substitute material layer without a silica filler. It has also been observed that a silica filler may aide with fatigues life/bally flex, which may be evident specifically when rice hulls are also used as a filler. Additionally, because silica does not hide certain characteristics of other materials (e.g., silica provides a certain degree of translucency in certain applications as a filler material), when used with rice hulls, the speckles, texture, and/or other characteristics of the rice hulls (or other filler materials in other illustrative embodiments) may be more pronounced than when filler materials other than silica are used. It is contemplated that rice hull ash may be used in place of silica as a filler in certain applications to achieve desirable characteristics of the resulting material.

It has further been found that using Tencel as a backing fabric results in the composite material (i.e., leather substitute adhered to a fabric backing) exhibits a higher tensile elongation compared to using cotton as a backing fabric. However, the specific configuration of the backing fabric and/or leather substitute material, method of adhering the various layers, dimensions, etc. may also affect the characteristics of same without limitation unless otherwise indicated in the following claims.

4. Mechano-Chemically Modified Thermoset Material

A. Background

Leather-like materials based on synthetic polymers such as polyurethane (PU) and polyvinyl chloride (PVC) are well known in the art. These materials have been formulated to have haptics that mimic, in many ways, the feel of animal leather. Animal leather is a collagen-based structure that is usually filled with waxes and oils that impart both softness and a slick surface—termed "buttery" by those in the art. PVC, for example, may achieve similar haptics by the combination of the polymer itself that may have a glass transition temperature, Tg, above room temperature (e.g., greater than ~23 C) combined with plasticizers that drop the bulk material stiffness so that it remains flexible well below room temperature (e.g., less than ~23 C). PU, in another example, may achieve similar haptics by the combination of so-called hard block domains (with a Tg above room temperature) and soft block domains (with a Tg below room temperature) synthesized into the polymer backbone. In these examples, there is a phase or constituent with a Tg above room temperature (collagen, PVC polymer, and PU hard blocks) and a phase or constituent with a Tg below room temperature (tanning agents and oils for animal leather, plasticizers for PVC, and soft block domains for PU). This combination of phases or constituents that have a Tg above room temperature and phases or constituents with a Tg below room temperature and may yield a favorable haptic combining softness of the bulk article without imparting a "grippy" surface.

Materials based on natural rubber or other related polymers, such as epoxidized natural rubber, tend to have a polymer phase with a single Tg that is below room temperature; thus compounds based on natural rubber (NR) or epoxidized natural rubber (ENR) tend to have a "grippy" surface that is undesirable when developing a leather-alternative material. It would be desirable to combine the beneficial low temperature flexibility and softness that comes from NR or ENR with a slick or buttery surface haptic for the creation of a leather-alternative material.

B. Summary

Disclosed is a combination of a plant-based all-natural polymer that can be combined with ENR to yield a polymeric mixture that maintains the excellent low temperature flexibility of the ENR while delivering the haptics associated with a polymer having a Tg nearer room temperature (e.g., ~15 C-30 C).

In another embodiment, disclosed is a combination of a plant-based all-natural polymer that can be combined with ENR and another optional plasticizer that further suppresses the glass transition temperature to impart excellent low temperature flexibility (down to −10° C. or lower).

Disclosed is an illustrative method of selectively reversing covalent chemical crosslinks (which reversing may also referred to herein as "de-crosslinking") in a thermoset material through mechano-chemical processing using low temperature (e.g., less than 70° C.) and high shear, which may be performed by passing a thermoset material repeatedly through a narrow gap (<1 mm) of a two-roll rubber mill (approximately 1.25:1 friction ratio) or through mixing in an internal mixer. The method has been found to cause scission primarily to crosslinks to partially reverse the cure. Such mechano-chemically modified thermoset may be used as one constituent in a mixture with ENR to yield a leather-like alternative material with improved haptics.

As used herein, the term "thermoset material" is meant to include all thermosets without limitation unless otherwise indicated in the following claims, including those thermosets that are made via resin (liquid) precursors, gum precursors, semi-solid precursors, thermoplastic precursors, and/or combinations thereof.

Various methods exist for determining the power-per-unit-volume of thermoset material required to selectively break the crosslinks in the thermoset material disclosed herein, and the scope of the present disclosure is in way limited by a specific method for determining same unless otherwise indicated in the following claims. In one illustrative method for determining the aforementioned power-per-unit-volume of thermoset material, the thermoset material may be mixed on a two-roll mill with a nip gap of 0.5 mm. The power consumption may be approximately 5000 W (5 kW). As the thermoset material fills the nip width of 30 cm, it may be assumed that the majority of power input into the thermoset material happens below a nip gap of 1.5 mm because experiments show very little mechano-chemical de-crosslinking at this nip gap or larger. For mills configured with rolls with a radius of 75 mm (6-inch rolls), this corresponds to an arc of approximately 13° (+/−6.5° around the point of closest approach). One may accordingly estimate that the volume of material within this nip gap across the width of the mill is approximately 7.5 ml. Therefore, a reasonable estimate of the instantaneous power input to enable mechano-chemical de-crosslinking is 5000 W/0.0075 liters=$6.67 \times 10^5$ W/l.

However, in some instances, the power consumption on the two-roll mill may be as low as 2000 W (2 kW). The mill geometry and nip gap remain the same and the mill width remains the same. In these instances, the instantaneous power input to enable mechano-chemical de-crosslinking may be 2000 W/0.0075 liters=$2.67 \times 10^5$ W/l.

Through experimentation, the lowest shear variation that has been observed to selectively de-crosslink the thermoset material through a mechano-chemical process mechano-chemical de-crosslinking may occur with a minimum nip gap of 0.8 mm with an estimated power consumption of 2000 W (2 kW). In this instance, the estimated volume of thermoset material experiencing the high shear near the nip may be as much as approximately 10 ml. In this example, the instantaneous power input to enable mechano-chemical de-crosslinking may be 2000 W/0.01 liters=$2 \times 10^5$ W/l.

In the preceding illustrative embodiments, the mechano-chemical de-crosslinking may be characterized by very high instantaneous power-per-volume shear mixing followed by periods of cooling so that the temperature of the thermoset material that is being mixed never exceeds approximately 70° C. (above which temperature the thermoset material may begin re-curing, that is, re-crosslinking). On a two-roll mill, the high-shear mixing zone has been estimated to be happening over an arc length of approximately 13°, thus by deduction the estimated low-shear or no-shear cooling time occurs during the remaining periphery of the roll (i.e., the remaining approximately 347° of travel). Accordingly, the high shear time may be experienced by the thermoset material for approximately 13/360, or 3.6% of the total mixing time. In this way, the maximum material temperature may be limited, despite having instantaneous times of very high-power input (per volume).

Disclosed is a reaction product between an epoxidized plant-sourced triglyceride (an example of which may be epoxidized soybean oil (ESO)) and a naturally occurring polyfunctional carboxylic acid (an example of which may be citric acid) wherein the thermoset reaction product contains β-hydroxyesters as the linkages between the epoxidized plant-sourced triglyceride and the naturally occurring polyfunctional carboxylic acid. It has been unexpectedly discovered that the β-hydroxyester linkages may be selectively and reversibly broken by mechanical shear only. That is, the thermoset matrix sourced from small and highly branched precursor molecules may be transformed into a millable gum by the action of high-shear mixing. Such mechanically masticated thermoset has been found to be capable of being re-cured into a thermoset by the re-application of heat without the addition of additional curative functionality (that is, without the addition of virgin epoxidized plant-sourced triglyceride or carboxylic-acid functionality).

Disclosed is an epoxidized natural rubber that is cross-linked by a carboxylic-acid containing curative. Crosslinks between the epoxide groups and the carboxylic-acid curative form β-hydroxyesters. Such β-hydroxyesters are known to be capable of thermally-induced transesterification reactions. Such reactions have been used to make so-called "self-healing" and recyclable thermosets.[1] In the prior art, it has been assumed that transesterification reactions proceed in a sort of zero-sum rearrangement where the total number of linkages is generally stable, Leibler et. al states, "The underlying concept is to allow for reversible exchange reactions by transesterification that rearrange the network topology while keeping constant the total number of links and the average functionality of cross-links."[2]

[1] "Self-healable polymer networks based on the cross-linking of epoxidized soybean oil by an aqueous citric acid solution", Facundo I. Altuna, Valeria Pettarin, Roberto J. J. Williams, *Green Chem.*, 2013, 15, 3360
[2] "Silica-Like Malleable Materials from Permanent Organic Networks", D. Montarnal, M. Capelot, F. Tournilhac and L. Leibler, *Science*, 2011, 334, 965-968.

It has been unexpectedly discovered that by pairing a high molecular weight polymer based on a carbon-carbon backbone with crosslinks of β-hydroxyesters, the crosslinks may be selectively and reversibly broken by mechanical shear only. That is, a high molecular weight elastomer such as epoxidized natural rubber that has been crosslinked (vulcanized) through β-hydroxyesters may be mechanically processed by very high shear such that the high molecular weight linear rubber may be substantially retained while the crosslinks are selectively broken in such a way that their initial functionality is regenerated. The resultant re-milled rubber may be re-molded without the addition of additional curative—demonstrating that the curative is not only selectively broken, but also that the carboxylic-acid functionality and epoxide functionality are regenerated during the breaking of the crosslinks. Such mechanically induced regeneration of curative functionality has not before been disclosed.

Disclosed is the combination of virgin epoxidized natural rubber and mechanically masticated thermoset material (which may be configured as a thermoset resin) that was formed as the reaction product between an epoxidized plant-sourced triglyceride and a naturally occurring polyfunctional carboxylic acid. Such reaction product may be preferably produced according to the methods disclosed Section 2—Coated Fabrics, though the scope thereof is not so limited unless otherwise indicated in the following claims. The mechanically masticated thermoset material may function as the curative for the virgin epoxidized natural rubber. Such mechanical masticization of the thermoset material and mixing of the recipe has been found to be able to occur concurrently.

C. Detailed Description

Thermoset materials (and specifically, thermoset resins) and thermoset elastomers are well known in the art. In most cases, the covalent bonds formed between molecules have strength characteristics that are commensurate with the strength characteristics within the precursor molecules. In such materials, mechanical shear results in turning the thermoset material into a granule or powder that may be used as a filler in new materials, but is not capable of returning the thermoset material into a high molecular weight gum, having characteristics substantially the same or even similar to the starting precursor material(s). Some ionically crosslinked materials, when formed by the coordination of charges along the polymer backbone, may be made to flow under either high shear or the application of very high temperatures, but this type of reversible thermoset behavior is not known among covalently bonded thermoset materials.

It is known in the art that crosslinks between the epoxide groups and a carboxylic-acid curative form β-hydroxyesters. Such β-hydroxyesters are known to be capable of thermally induced transesterification reactions. Such reactions have been used to make so-called "self-healing" and recyclable thermosets. In the prior art, it has been assumed that transesterification reactions proceed in a sort of zero-sum rearrangement where the total number of linkages is generally stable, Leibler et. al states "The underlying concept is to allow for reversible exchange reactions by transesterification that rearrange the network topology while keeping constant the total number of links and the average functionality of cross-links."

It has been unexpectedly discovered that β-hydroxyester crosslinks may be selectively and reversibly broken (i.e., de-crosslinked) by mechanical shear only. That is, a thermoset material with linkages that are β-hydroxyesters, as shown in the cured thermoset resin of FIG. 13 (wherein small arrows on the right side of the figure show reactive sites in for the compound), may be mechanically processed by very high shear such that the thermoset material may be masticized as the crosslinks are selectively broken in such a way that their initial functionality is regenerated. The resultant masticized thermoset may be re-cured without additional curative—demonstrating that the curative is not only selectively broken, but also that the carboxylic-acid functionality and epoxide functionality are regenerated during the breaking of the crosslinks as shown in FIG. 15. Such mechanically induced regeneration of curative functionality has not before been disclosed.

i. Regenerated Thermoset Materials Based on Epoxidized Natural Rubber

It has been unexpectedly discovered that by pairing a high molecular weight polymer based on a carbon-carbon backbone (such as epoxidized natural rubber) with crosslinks of β-hydroxyesters, the crosslinks are selectively and reversibly broken by mechanical shear only. That is, a high molecular weight elastomer such as epoxidized natural rubber that has been crosslinked (vulcanized) through β-hydroxyesters may be mechanically processed by very high shear such that the high molecular weight linear rubber may be substantially retained while the crosslinks are selectively broken in such a way that their initial functionality is regenerated. The resultant re-milled rubber, which has been de-crosslinked (also called devulcanized), may be re-molded without additional curative—demonstrating that the curative is not only selectively broken, but also that the carboxylic-acid functionality and epoxide functionality are regenerated during the breaking of the crosslinks. Such mechanically induced regeneration of curative functionality has not before been disclosed.

Figure 16:
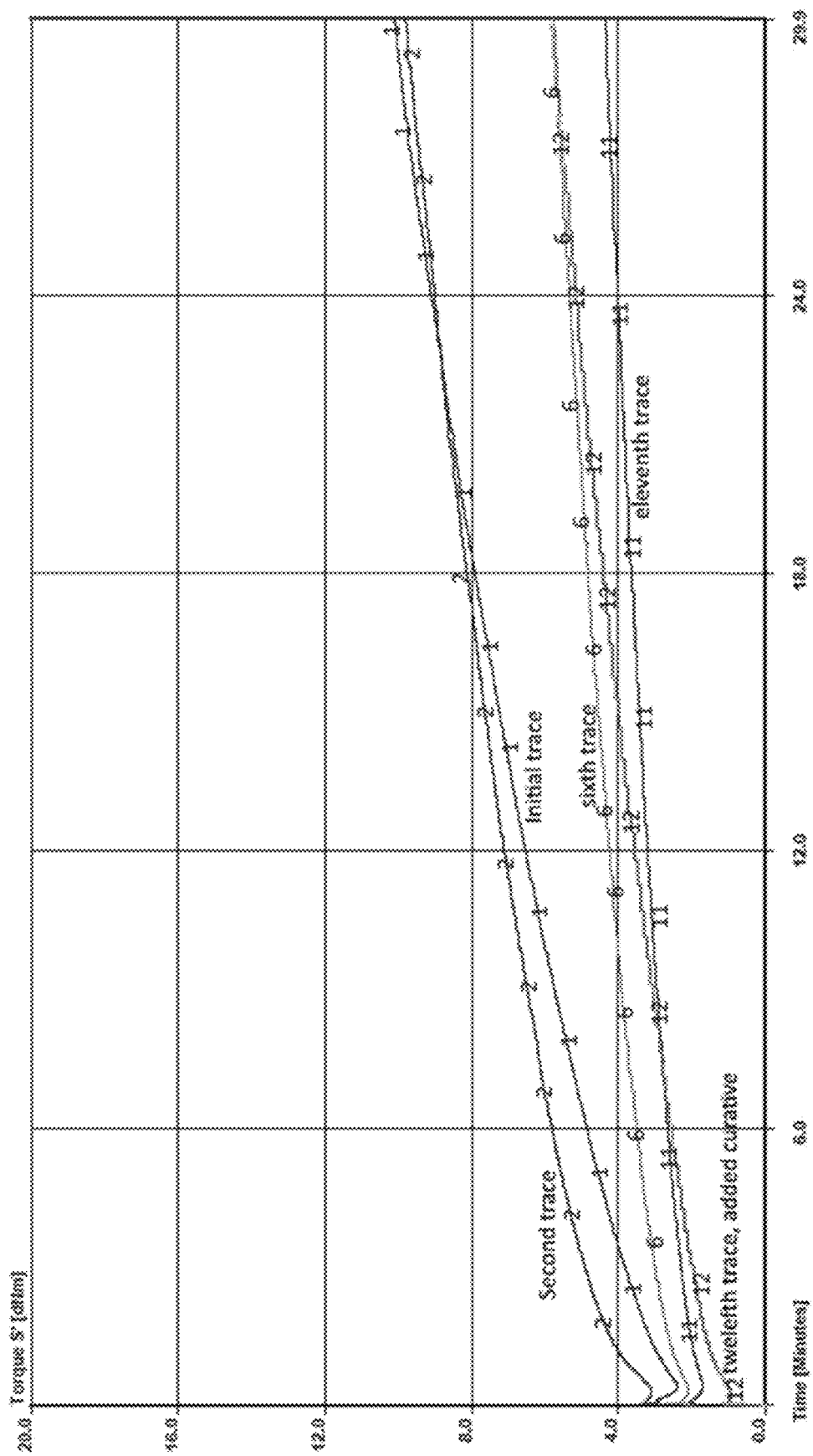
FIG. 16 shows a series of rheometer data from material that is repeatedly mechano-chemically processed.

A rubber compound of epoxidized natural rubber (ENR-25) and a carboxylic-acid functional curative as disclosed in Section 1 above may be mixed with additional fillers and additives as may be common in the art. In one illustrative embodiment, the compound contains powdered cork and precipitated silica. A series of rheometer traces is shown in FIG. 16 from a moving die rheometer (MDR) as measured at 150° C. for 30 minutes. The initial trace shows a characteristic cure curve with a brief induction time and then marching modulus for the 30-minute cure. The rheometer sample was then subject to remilling on a lab-scale (6" diameter×12" wide) two-roll rubber mill. After a few passes through the mill wherein the sample exhibited nervy behavior, it gradually became flowable in a similar way to uncured rubber under continued mixing. The second rheometer curve ("second trace" on FIG. 16) on this particular sample shows a higher initial modulus but thereafter cures to roughly the same final stiffness at a similar rate. This particular sample of material was subsequently remilled again and cured again. This was repeated eleven times—the sixth and eleventh cure traces are shown in FIG. 16. It can be seen that the general shape of the cure curve is similar for all re-curing experiments; the modulus drops as the number of recycling loops increases, but each time, the sample was shown to be capable of re-curing without the addition of more curative. The twelfth cure curve ("twelefth trace, added curative" on FIG. 16) reflects the addition of a small amount of curative that was able to increase the modulus of the sample.

The series of cure curves of FIG. 16 shows that the compound may be de-crosslinked by the application of mechanical shear only—without the addition of heat (that is, the rolls of the two-roll mill were not heated for any of these experiments). Furthermore, the rheometer traces show that the curative is capable of re-crosslinking the epoxidized natural rubber after mechanical de-crosslinking. In contrast to prior literature on transesterification, it has been shown that the total number of crosslinks do not need to be maintained to regenerate solid materials with mechanical integrity. The curative may regenerate itself after being sheared apart by mechanical forces.

Figure 17:
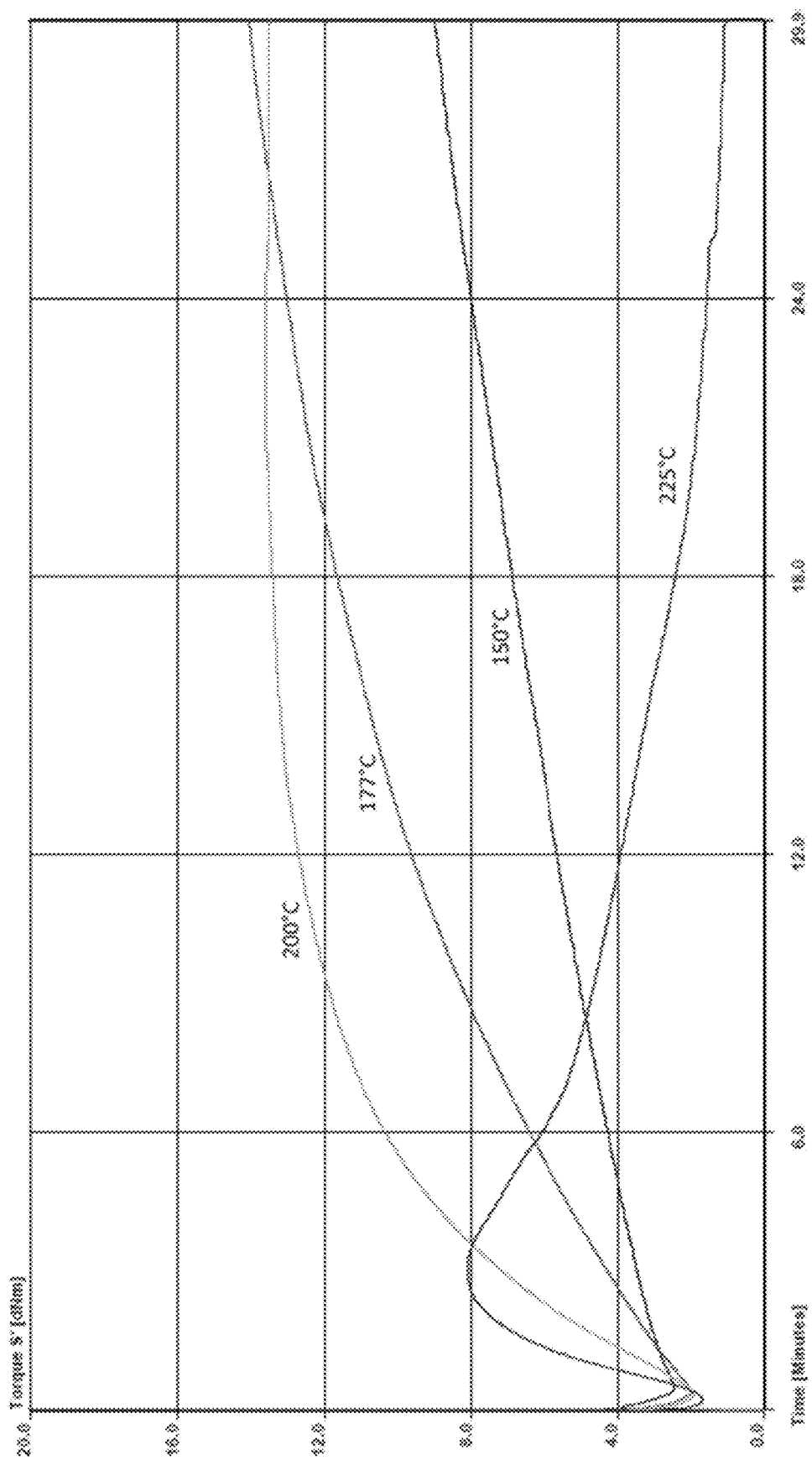
FIG. 17 shows a series of rheometer data for increasing cure temperatures.
Figure 18:
FIG. 18 shows pancake-like discs of foam product produced according to one embodiment of the present disclosure.
Figure 19:
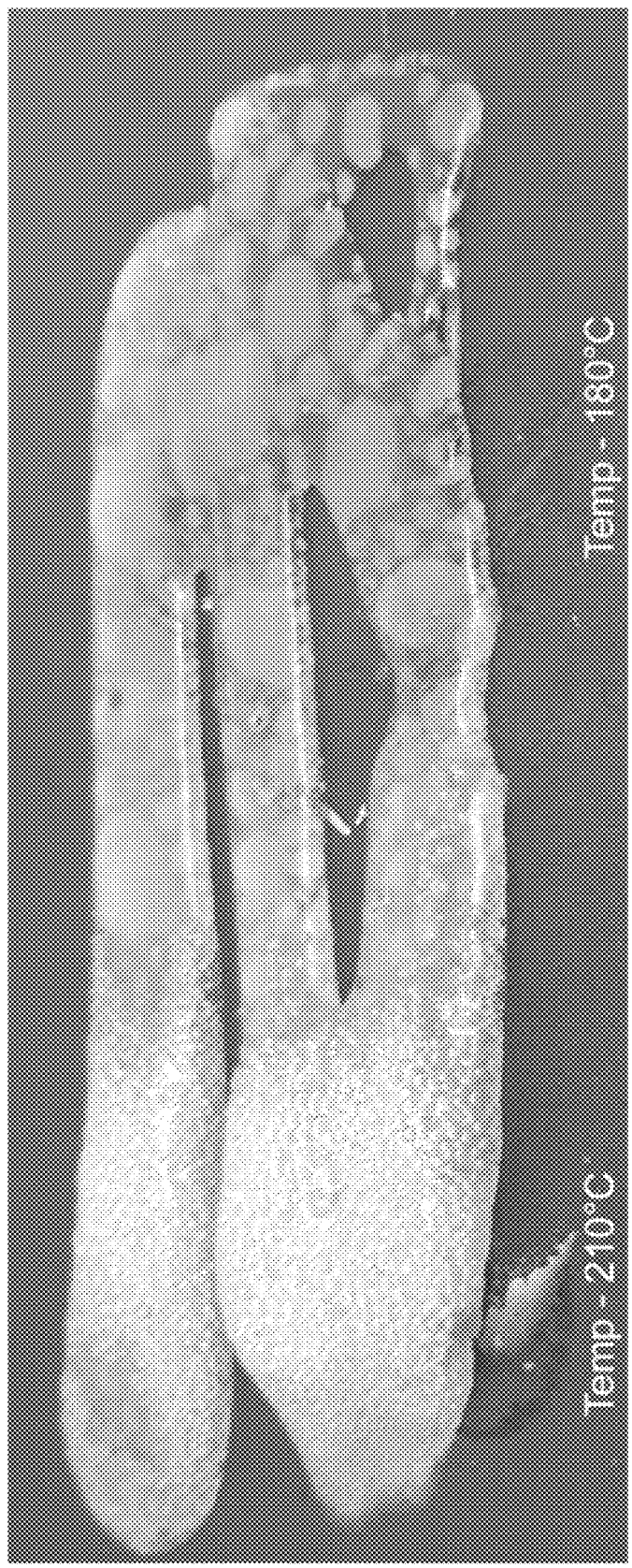
FIG. 19 shows a gradient of porosity associated with variation in curing temperature.

In another set of experiments, the same recipe that was used in FIG. 16 was subject to rheometry at a series of increasing temperatures. This data is shown in FIG. 17 for the temperatures of 150° C., 175° C., 200° C., and 225° C.

It can be seen that the state of cure increases with increasing temperature to 200° C. There is some small evidence of reversion at 200° C. At 225° C., we see an initial cure that is followed by rapid reversion that is nearly complete at the end of the 30-minute test. This is evidence that the cross-linking bonds are substantially weaker than the epoxidized natural rubber itself, which has an onset of thermo-oxidation at approximately 250° C. Therefore, we may surmise that mechanical stresses are capable of breaking the weaker subset of covalent bonds—in this case, the β-hydroxyester crosslinks.

ii. Regenerated Thermoset Materials Based on Epoxidized Plant Oil and Naturally Occurring Polyfunctional Acid It has been unexpectedly discovered that the reaction product of two small molecules (such as epoxidized soybean oil (ESO) and citric acid), wherein the covalent linkages between the molecules of the thermoset material (which for this illustrative embodiment is configured as a thermoset resin) are β-hydroxyesters, may be transformed into a millable gum by mechanical shear only. That is, a highly branched elastomer may be transformed into a more linear and extensible material through the reversible fracture of a subset of the β-hydroxyester covalent linkages as shown in FIG. 15. This millable gum may furthermore be used advantageously in two or more ways. In one preferred illustrative embodiment, the millable gum may be subsequently combined with any number of fillers, plasticizers, or functional additives and then re-cured—without the addition of additional epoxidized plant-sourced triglyceride (such as ESO) or naturally occurring polyfunctional carboxylic acid (such as citric acid). In another preferred illustrative embodiment, the millable gum may be sheeted out without combination with additional fillers, plasticizers, or functional additives and then re-cured as a transparent film (either by itself or in contact with backing fabric or other backing material). In another preferred illustrative embodiment, the millable gum may be subsequently combined with virgin epoxidized natural rubber wherein the epoxidized natural rubber is cross-linked through the action of the regenerated carboxylic acid functionality that was achieved through the mechanical shear of the thermoset material.

By way of illustration, and without limitation unless so indicated in the following claims, various processes and parameters thereof are described in detail below. The values for the parameters given below are for illustrative purposes only and are in no way limiting unless otherwise indicated in the following claims. Other parameter values, methods, equipment, etc. may be used without limitation unless otherwise indicated in the following claims.

Example 1

100 parts of Citric Acid, 100 parts of ESO, and 400 parts of Isopropyl Alcohol (IPA) are charged into a vacuum-capable reactor vessel. The mixture is slowly heated over the course of 8 hours with constant stirring and under modest vacuum (>50 Torr). The IPA is condensed during the reaction period and removed from the solution. At the end of the reaction period, when substantially all of the unbound and unreacted IPA is removed, the temperature of the reactor vessel rises quickly and the reaction is halted when the reaction product reaches 110° C.

Example 2

109 parts of the reaction product of Example 1 is mixed with 100 parts of ESO to yield a curable resin. This resin may be cured overnight at 80° C. or within two hours at 125° C. to make an elastomeric solid.

Example 3

The cured elastomeric solid of Example 2 is passed repeatedly through a tight nip on a rubber mill. The friction ratio is 1.25:1 and the nip is set to less than 0.5 mm. After a few passes, the powdery material begins to masticate and within about 3-7 minutes of mixing a millable gum is generated. This millable gum may be sheeted out and re-cured as a transparent sheet or it may be combined with fillers, plasticizers, and/or functional additives to yield a compound that may be cured under heat (e.g. 150° C. for 5 minutes) to make a thermoset elastomer. The millable gum may be combined with epoxidized natural rubber (ENR) and ENR-based compounds and act as a curative for the ENR.

Example 4

109 parts of the reaction product of Example 1 is mixed with 100 parts of ESO along with 7 parts of propylene glycol and 3.5 parts of olive-derived emulsifying wax to yield a curable resin. This resin may be cured overnight at 80° C. or within two hours at 125° C. to make an elastomeric solid.

Example 5

The cured elastomeric solid of Example 4 is passed repeatedly through a tight nip on a rubber mill. The friction ratio is 1.25:1 and the nip is set to less than 1 mm. After a few passes, the powdery material begins to masticate and within about 3-7 minutes of mixing a millable gum is generated. This millable gum may be sheeted out and re-cured as a transparent sheet or it may be combined with fillers, plasticizers, and/or functional additives to yield a compound that may be cured under heat (e.g. 150° C. for 5 minutes) to make a thermoset elastomer. The material of example 5 is more easily masticated than the material of example 3. The millable gum may be combined with epoxidized natural rubber (ENR) and ENR-based compounds and act as a curative for the ENR.

iii. Thermoset Material Blends Based on Virgin ENR and Regenerated Thermoset Materials Based on Epoxidized Plant Oil and Naturally Occurring Polyfunctional Acid By combining the technology of mechano-chemically regenerated thermoset materials (where such materials have been found to regenerate the original chemical functionality of epoxide groups and carboxylic acid groups) with virgin ENR, the regenerated functionality is able to cure (i.e., crosslink) the epoxide groups in the ENR without the addition of additional curative. This is laid out in the following examples.

Example 6

40 parts of ENR-50 is mixed with 63 parts of the cured resin of Example 4 in the previous section. It has been found that there is sufficient shear during the mixing of the ENR-50 with the cured resin of Example 4 that the cured resin is mechano-chemically broken down (de-crosslinked) and thus becomes a source of carboxylic acid functionality that is capable of curing the ENR-50. This mixture of elastomeric gum materials may be further combined with fillers, plasticizers, and functional additives to yield a compound that may then be cured as an elastomeric solid. In one illustrative embodiment, the fillers may include cork powder, ground rice hulls, activated carbon, activated charcoal, kaolin clay, metakaolin clay, precipitated silica, talc, mica, corn starch, mineral pigments, and/or various combinations thereof without limitation unless otherwise indicated in the following claims; the plasticizers may include both reactive plasticizers such as epoxidized soybean oil, semi-reactive plasticizers such as glycerol, propylene glycol, and castor oil, and non-reactive plasticizers such as naturally occurring triglyceride plant-based oils and/or various combinations thereof without limitation unless otherwise indicated in the following claims; the functional additives may include antioxidants (such as tocopherol acetate (Vitamin E)), UV absorbers (such as sub-micron $TiO_2$), antiozonants, cure retarders (such as alkali sodium salts and powdered soda glass), cure accelerators (such a certain zinc chelates), and/or combinations thereof without limitation unless otherwise indicated in the following claims. Materials made by such processing steps and with such ingredients have been found to have excellent flexibility down to −10° C. and buttery haptics.

Example 7

80 parts of ENR-50 is mixed with 21 parts of the cured resin of Example 4 in the previous section. It has been found that there is sufficient shear during the mixing of the ENR-50 with the cured resin of Example 4 that the cured resin is mechano-chemically broken down (de-crosslinked) and thus becomes a source of carboxylic acid functionality that is capable of curing the ENR-50. This mixture of elastomeric gum materials may be further combined with fillers, plasticizers, and functional additives to yield a compound that may then be cured as an elastomeric solid.

The molded materials produced according to Example 6 and Example 7 have attributes that allow them to be used as leather-substitute materials. The blend of a relatively low Tg materials such as ENR-50 with a relatively higher Tg material such as the masticized resin yields a bulk material with excellent haptics and low temperature flexibility down to at least −10° C. Furthermore, the bulk material glass transition temperature can be lowered by incorporating a plasticizer such as propylene glycol without negatively impacting the tactile properties of the material. Instead, it has been found that a plasticizer such as propylene glycol (which can be made with a catalytic process known as hydrogenolysis to readily convert plant-sourced glycerin and hydrogen to propylene glycol) acts as both a plasticizer and aid to the creation of "buttery" haptics by lowering the surface friction.

In these examples, it has been found that the combination of high molecular weight ENR and masticized resin yields an optimal balance of green strength, low temperature flexibility, and room temperature flexibility. Without wishing to be bound by theory, it is believed that there may exist domains within the final compound that remain rich in the resin-based starting thermoset and domains that are more rich in ENR. The mixture of domains may limit the localized extensibility of the compound, thus reducing the sensation of grippiness. In support of this theory, remilled resin as illustrated in FIG. 15 was stirred into ethanol overnight; the resultant solution showed some small curdled material in the bottom of the container that would not dissolve. This suggests that during the remilling operation, a portion of the thermoset material is mechano-chemically modified through shear and once the shear drops below a certain threshold, the remaining thermoset material does not experience sufficient shear to break the β-hydroxyester crosslinks. Therefore, the de-crosslinking is not homogeneously distributed throughout the material; i.e. some crosslinked domains survive the remilling process. As a result, the combined ENR and remilled resin compound will have some portion of previously crosslinked resin that survive the mixing process and act as domains that impart a locally higher Tg and thus less grippy haptic.

In another illustrative embodiment it may be desirable to configure the material such that it exhibits a relatively high Tg, and one illustrative method for increasing the Tg of an ENR-50 rubber compound is disclosed below, but other suitable methods for increasing the Tg of an ENR-50 rubber compound according to the present disclosure may be used without limitation unless otherwise indicated in the following claims. Generally, ENR-50 has a Tg of −24° C. as prepared. It has been unexpectedly discovered that a standard compound based on ENR-50 with mineral fillers (e.g., clay and talc) along with a curative that is made in accordance with methods disclosed elsewhere in this application; i.e., a reaction product of a naturally occurring polyfunctional carboxylic acid (e.g., citric acid) along with an epoxidized triglyceride (e.g., ESO) may be further made to have plastic-like attributes such that the resulting material may be configured as a rigid or semi-rigid material. In one illustrative embodiment, these attributes were found to arise when phytic acid is incorporated into the recipe at loadings as low as 2 phr and then subjected to a heat treatment. Such a compound was mixed and molded and found to have initial properties of 11.9 MPa tensile strength and 120% elongation. After heat treating at 100° C. for 168 hrs, the compound was found to be a rigid plastic with a strength of 14.8 MPa and an elongation of 16.7%. It was found that reheating the compound (from room temperature (e.g., ~15 C-30 C) to 60° C.) decreased the stiffness and increased the elongation; thus, the heat treatment did not merely cause embrittlement (characteristic of heat aging of elastomers) but rather caused a dramatic shift in the Tg from the original −24° C. to >20° C. Such a rigid or semi-rigid (e.g., plastic) material may further be filled with fibrous reinforcements to further improve the tensile strength of the material.

5. Applicability

The recycling of thermoset materials is a particularly challenging problem for the polymer-materials industry. Some proposed solutions for this challenge have included solvent-induced depolymerization, grinding of waste and re-integration with new binder, and thermal depolymerization. None of these solutions are easy to integrate into existing manufacturing processes. In contrast, the mechanically induced de-crosslinking of the thermoset material according to this disclosure utilizes the very same equipment and methodology used to mix the material in the first place. Thereby, an article may be molded using low percentages of reclaimed material all the way up to 100% reclaimed material. Such materials may be utilized in articles substantially identical to articles manufactured with virgin material.

In the manufacturing of leather-like materials, it has been advantageously found that the inclusion of at least some reclaimed and recycled material results in a sheet product having a naturally occurring texture that is particularly pleasing—having surface undulations on the scale of 1-10 mm that do not require any texture in the mold. Such surface undulations may be similar to that exhibited by bison or buffalo leather products and is highly desirable for many applications.

The ability to integrate waste material (e.g., product trimming, flawed articles, articles that have reached the end of their useful life, etc.) into articles without significant loss of mechanical properties and without the requirement of additional virgin material addition enables closed-loop manufacturing in a way not previously envisioned for thermoset materials. Importantly, such materials may be still biodegradable and may be sourced from plant-based raw ingredients without the inclusion of petrochemically derived precursors.

The use of pre-cured thermoset material as a curative for ENR is particularly advantageous from a processing standpoint. It has been found that the curative as disclosed in Section 1 and then applied in Section 3 may impart stickiness to some of the compounds, especially during mixing. The use of pre-cured themoset resin as disclosed herein significantly reduces the stickiness of the batch during processing and likewise reduces the tackiness/grippiness of the molded article.

5. Foam Material

A. Background

Most resilient foam products that are commercially available are based on synthetic polymers, specifically polyurethane. A key attribute that differentiates so-called memory foam from other foam products is the glass transition temperature ($T_g$) of the polymer. Rigid foams are generally comprised of polymers with a $T_g$ well above room temperature, an illustrative example of such a product is polystyrene foam (often used in rigid insulation boards and insulated drinking cups). Flexible and springy foams are generally comprised of polymers with a $T_g$ well below room temperature, an exemplary example of such a product is a car door weather seal based on ethylene-propylene rubber (EPR/EPDM). Natural products may be likewise found in both rigid and flexible/springy categories. Balsa wood is a generally porous and foam-like material that is substantially rigid at room temperature (e.g., ~15 C-30 C). Natural rubber latex may be foamed by either the Talalay or Dunlop process to make a flexible and springy foam product that is substantially comprised of naturally occurring polymers. To date, there is no widespread naturally occurring foam that has a $T_g$ near room temperature (e.g., ~15 C-30 C) to yield a lossy foam that is the key attribute of memory foam materials.

Natural materials that make flexible foam products today are often based on natural rubber latex. To make latex products stable to temperature excursions, the polymer must be vulcanized (i.e., crosslinked). Vulcanization of natural rubber may occur through a few known methods; most often sulfur vulcanization may be used, but peroxide or phenolic cure systems may likewise be used. Although sulfur and zinc oxide cure systems may be capable of vulcanizing natural rubber latex, very often other chemicals are added to increase the cure rate, limit reversion, and provide other functional benefits (e.g., anti-oxidants, anti-ozonates, and/or UV stabilizers). These additional chemicals may create chemical sensitivities in certain individuals. Also, natural rubber latex itself may cause allergic reactions in certain individuals due to the natural proteins that exist in the latex.

Similar natural rubber latex formulations may likewise be used as a glue for fibrous mats to create a resilient foam-like product. Notably, coconut fiber may be bonded together by natural rubber latex into a non-woven mat to provide a cushion or mattress material that is substantially all-natural in origin. Despite various claims in the prior art of being "all natural," the cure system and additives to the natural rubber may contain synthetic chemicals that may create chemical sensitivities in certain individuals; furthermore, the natural rubber latex itself may cause allergic reactions in certain individuals due to the residual protein.

Furthermore, footwear midsoles are most often made from EVA foam for performance footwear. EVA foams have low-density, high-energy resiliency, decent compression set, and are easy to form and process. EVA is a petrochemical polymer that is not bio-based nor biodegradable. Accordingly, it would be desirable to have a foam that meets the energy rebound (resiliency) and compression set attributes of EVA while being 100% bio-based.

B. Summary

A foam product based on epoxidized vegetable oil is disclosed wherein the pre-polymer curative is likewise comprised of naturally occurring and naturally derived products of biological origin. The foam product disclosed is created without the use of additional foaming agent. The foamed product may be created with or without the requirement of whipping in air into the pre-cured liquid resin. The foam product disclosed may have a $T_g$ near room temperature (e.g., ~15 C-30 C), thus providing a lossy product. Additionally, the foam product may be formulated to have a $T_g$ below room temperature (e.g., less than ~23 C) to provide a flexible, springy product. Memory foam attributes may be attained by polymers prepared according to this disclosure. Such polymers are reaction products of the pre-polymer curative as described herein above and epoxidized vegetable oils, reaction mixtures may also contain other natural polymers and modified natural polymers as described in further detail below.

In certain embodiments, the foam product may contain a certain fraction of epoxidized natural rubber. Notably, the process that creates epoxidized natural rubber also reduces the free protein that may create allergic reactions in certain individuals. The reduction in allergic response for epoxidized natural rubber compared to untreated natural rubber is greater than 95%.

Disclosed is a castable resin comprising EVO (and/or any suitable epoxidized triglyceride as disclosed above) combined with the pre-polymer curative (as disclosed above in Section 1), and in one illustrative embodiment ENR that has been solubilized in the EVO.

It has been found that a pre-polymer curative, as disclosed in Section 1, can be created that eliminates the risk of porosity when cured within a certain temperature range, but that evolves gas during the curing process when conducted within a second higher temperature range. Furthermore, the oligomeric pre-polymer curative may incorporate substantially all of the polyfunctional carboxylic acid so that no additional solvent is required during the curing process. For example, citric acid is not miscible in ESO but they may be made to react with each other in a suitable solvent. The amount of citric acid may be selected so that the pre-polymer curative is created so that substantially all of the epoxide groups of the ESO in the pre-polymer curative are reacted with carboxylic acid groups of the citric acid. With sufficiently excess citric acid, the pre-polymerization extent may be limited so that no gel fraction is formed. That is, the target pre-polymer curative is a low molecular weight (oligomeric) citric-acid capped ester-product formed by the reaction between carboxylic acid groups on the citric acid with epoxide groups on the ESO.

Illustrative oligomeric pre-polymer curatives may be created with weight ratios of ESO to citric acid in the range of 1.5:1-0.5:1. If too much ESO is added during pre-polymer curative creation, the solution may gel and further incorporation of ESO to create the target resin becomes impossible. Note that on a weight basis, stoichiometric equivalent amounts of epoxide groups on the ESO and carboxylic acid groups on the citric acid occur at a weight ratio of 100 parts of ESO to about 30 parts of citric acid. A ratio of ESO:citric acid above 1.5:1 may build a pre-polymer curative with excessive molecular weight (and hence viscosity) which limits its usefulness as a casting resin. If the ratio of ESO:citric acid is below 0.5:1 it has been found that there is so much excess citric acid that after solvent evaporation, ungrafted citric acid may precipitate out of solution.

In addition to controlling the ratio of ESO to citric acid, according to the present disclosure it has been found that selective control of the amount of alcohol used as a solvent may also be used to tailor the physical properties of the resulting elastomeric foam. It has been found that the alcohol solvent may itself be incorporated into the elastomer by forming ester linkages with the polyfunctional carboxylic acid that are reversible and thus gas-evolving when the material is cured at a temperature higher than that required to make a porosity-free product. A mixture of two or more solvents may be used to tailor the amount of grafting of an alcohol-containing solvent onto the citric acid-capped oligomeric pre-polymer curative.

For example, and without restriction or limitation unless otherwise indicated in the following claims, isopropyl alcohol (IPA) or ethanol may be used as a component of a solvent system used to miscibilize citric acid with ESO. IPA or ethanol are capable of forming an ester linkage via a condensation reaction with citric acid. Since citric acid has three carboxylic acids, such grafting reduces the average functionality of the citric acid molecules that are reacting with the ESO. This is beneficial in creating an oligomeric structure that is more linear and therefore less highly branched. Acetone may be used as one component of a solvent system used to miscibilize citric acid with ESO, but unlike IPA or ethanol, acetone itself is not capable of being grafted onto the citric acid-capped oligomeric pre-polymer curative. Indeed, during creation of the oligomeric pre-polymer curative it has been found that the reactivity of the pre-polymer curative is determined, in part, by the ratio of IPA or ethanol to acetone that may be used to solubilize citric acid with ESO. That is, in reaction mixtures with the similar amounts of citric acid and ESO, a pre-polymer curative created from a solution with a relatively high ratio of IPA or ethanol to acetone creates a lower viscosity product than pre-polymer curative created from a solution with a relatively low ratio of IPA or ethanol to acetone under similar reaction conditions. Also, the amount of IPA or ethanol grafted on the pre-polymer curative determines the extent to which such IPA or ethanol is evolved when the formulated resin is foamed at a temperature higher than that required to make a porosity-free resin product.

C. Illustrative Methods and Products

Illustrative blends that create resilient memory foams have been created from a combination of inputs that include a pre-polymer curative, a liquid blend of epoxidized natural rubber and epoxidized vegetable oil and may contain unmodified epoxidized vegetable oil.

In a first illustrative embodiment of a foam material, the resilient memory foam is produced using a pre-polymer curative creation and by dissolving 50 parts of citric acid in 125 parts of warm IPA, accelerated by mixing (again with reference to FIG. 1). After dissolution of the citric acid, 50 parts of ESO is added to the stirring solution. The solution is preferably mixed and reacted at temperatures of 60° C.-140° C. with optional use of mild vacuum (50-300 Torr). One illustrative batch was mixed in a jacketed reactor vessel with a jacket temperature of 120° C. (solution temperatures of ~70° C.-85° C.) and the citric acid grafting onto ESO occurred concurrently with IPA evaporation. At the end of the reaction sequence it was discovered that roughly 12 parts of IPA was grafted onto the combined 100 parts of ESO and citric acid. Accordingly, temperatures above the boiling point of IPA and application of vacuum could no longer yield IPA condensate in the condensing system. Calculations reveal that of the starting carboxylic acid sites on the citric acid, roughly 31% reacted with epoxide groups on the ESO (assuming all of the epoxides were converted during the reaction to ester linkages), roughly 27% of the carboxylic acid sites reacted with IPA to form pendant esters, and roughly 42% remain unreacted and available for crosslinking the resin in a subsequent processing step. However, these calculations are for illustrative purposes only and in no way limit the scope of the present disclosure unless otherwise indicated in the following claims.

In a second illustrative embodiment of a foam material, the resilient memory foam was created via a rubber-containing resin precursor. Epoxidized natural rubber may be included in resin-based formulations at levels below twenty-five weight percent (25 wt %) and still yield a pourable liquid. Creation of the rubber-containing precursor may be done in two-stages without requiring the use of a solvent for rubber dissolution. In the first stage 100 parts of epoxidized natural rubber (ENR-25) are mixed with 50 parts of ESO using rubber mixing techniques (a two-roll mill or internal mixer). This yields a very soft gum that cannot effectively be further mixed on rubber processing equipment, but with the application of heat (e.g., 80° C.) additional ESO may be mixed into the rubber with a Flacktek Speedmixer or alternative low-horsepower equipment (e.g., a sigma-blade mixer) to create a flowable liquid containing 25% ENR-25 and 75% ESO.

Figure 13:
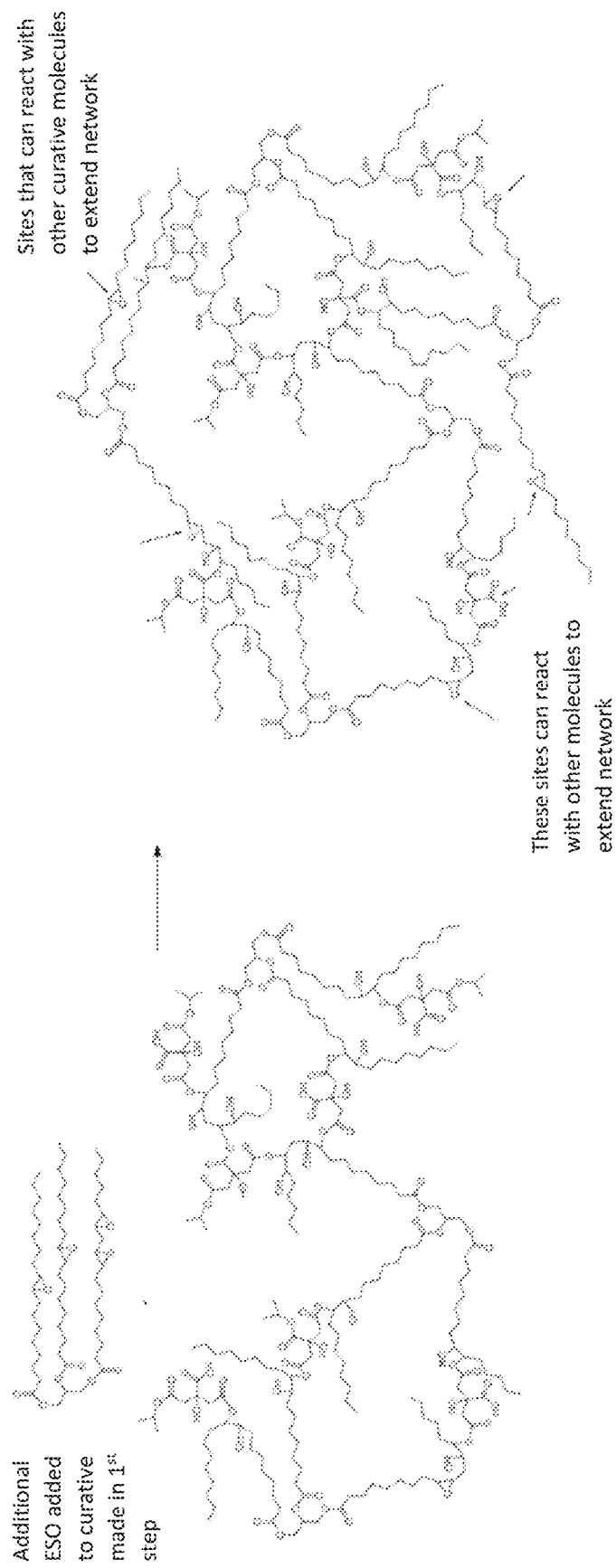
FIG. 13 shows a chemical representation of a cured thermoset material.
Figure 14:
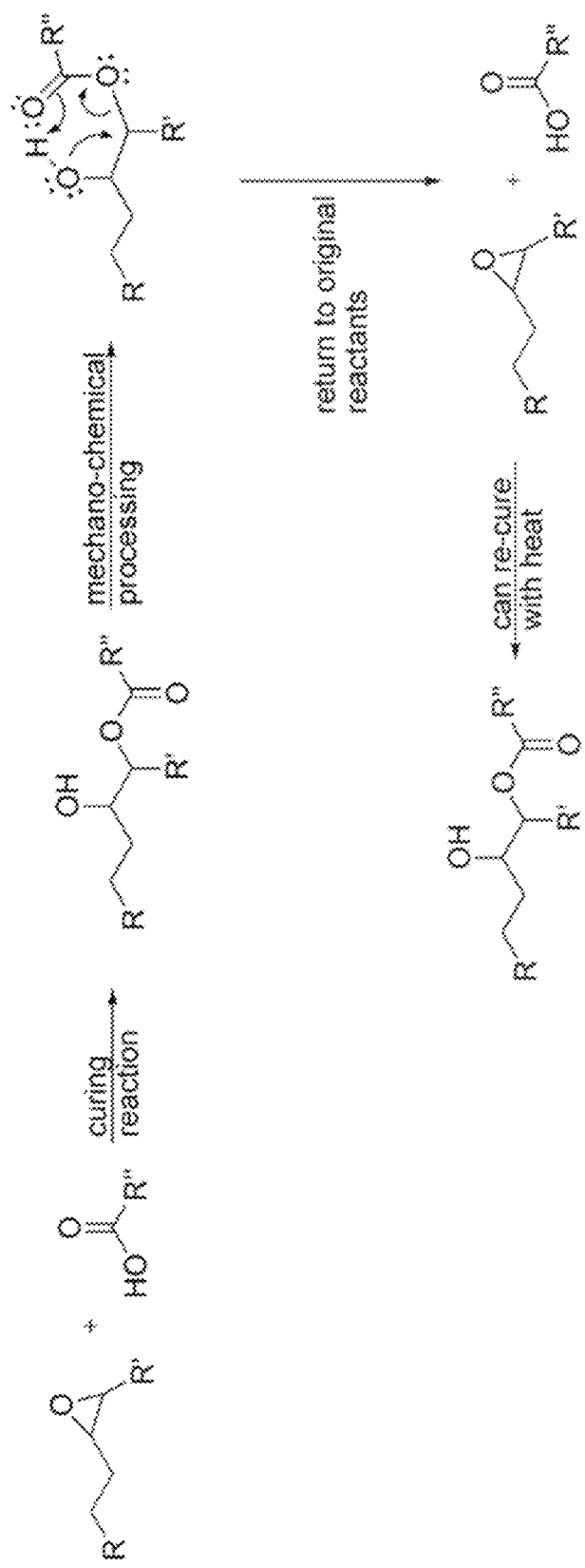
FIG. 14 shows a chemical representation of mechano-chemical reversibility.

A third illustrative embodiment of a foam material may also produce a resilient memory foam-type creation. In this embodiment, the foamable resin is produced via mixing and curing. For this illustrative embodiment, 40 parts of pre-polymer curative from the first illustrative embodiment of a foam material was added to 80 parts of rubber-containing resin from the second illustrative embodiment. The resulting combination was then mixed with a Flacktek Speedmixer until a homogeneous solution was obtained (about 10 minutes of mixing). This resin was cured using the following two procedures:

1. Resin cured on 200° C. (nominal temperature) hot griddle (PTFE coated) just like a pancake. The material foamed to a relatively homogenous article with memory-foam characteristics; specifically, lossy behavior. A depiction of the resulting material is shown in FIG. 13.
2. Resin was vacuum degassed after mixing and placed on the same 200° C. hot griddle. In this instance, porosity was observed over the heating element (measured temperature 210° C.) but no porosity was observed over the region of the griddle without the heating element (measured temperature 180° C.). Depictions of the resulting materials are shown in FIG. 14.

From these two procedures, it is clear that there may be two sources of porosity. One source may involve small bubbles of air that are incorporated during mixing. Additional experimentation has shown that the presence of ENR-25 in the resin is an important contributor to stabilizing this incorporated air and preventing bubble coalescence during the curing stage. The second source of porosity is evolved gas, likely removal of the grafted IPA, at temperatures at or above 200° C.

As previously described, certain catalysts are known in the art to speed up the carboxylic acid addition to epoxide groups and such may be used in formulating recipes according to the present disclosure without limitation unless otherwise indicated in the following claims.

Figure 20:
FIG. 20 shows a foam slab made according to various aspects of the present disclosure.
Figure 20A:
FIG. 20A is a detailed view of a portion of the foam slab shown in FIG. 20.

Referring now to FIGS. 20 & 20A, shown therein is a foam that is suitable for certain footwear applications, wherein the foam is substantially or completely free of petrochemical inputs and does not require petrochemical blowing agents. A slab of such foam is shown generally in FIG. 20 and a detailed view of an exterior surface and a cross-section thereof is shown in FIG. 20A. This foam is based on epoxidized natural rubber and is cured with a curative that is made according to the preceding description. Additionally, this foam may be made into slabs with a thickness between approximately 2.5 mm and 25 mm in which the heat transfer may be accomplished with heated plates applied to the two planar surfaces.

Figure 21:
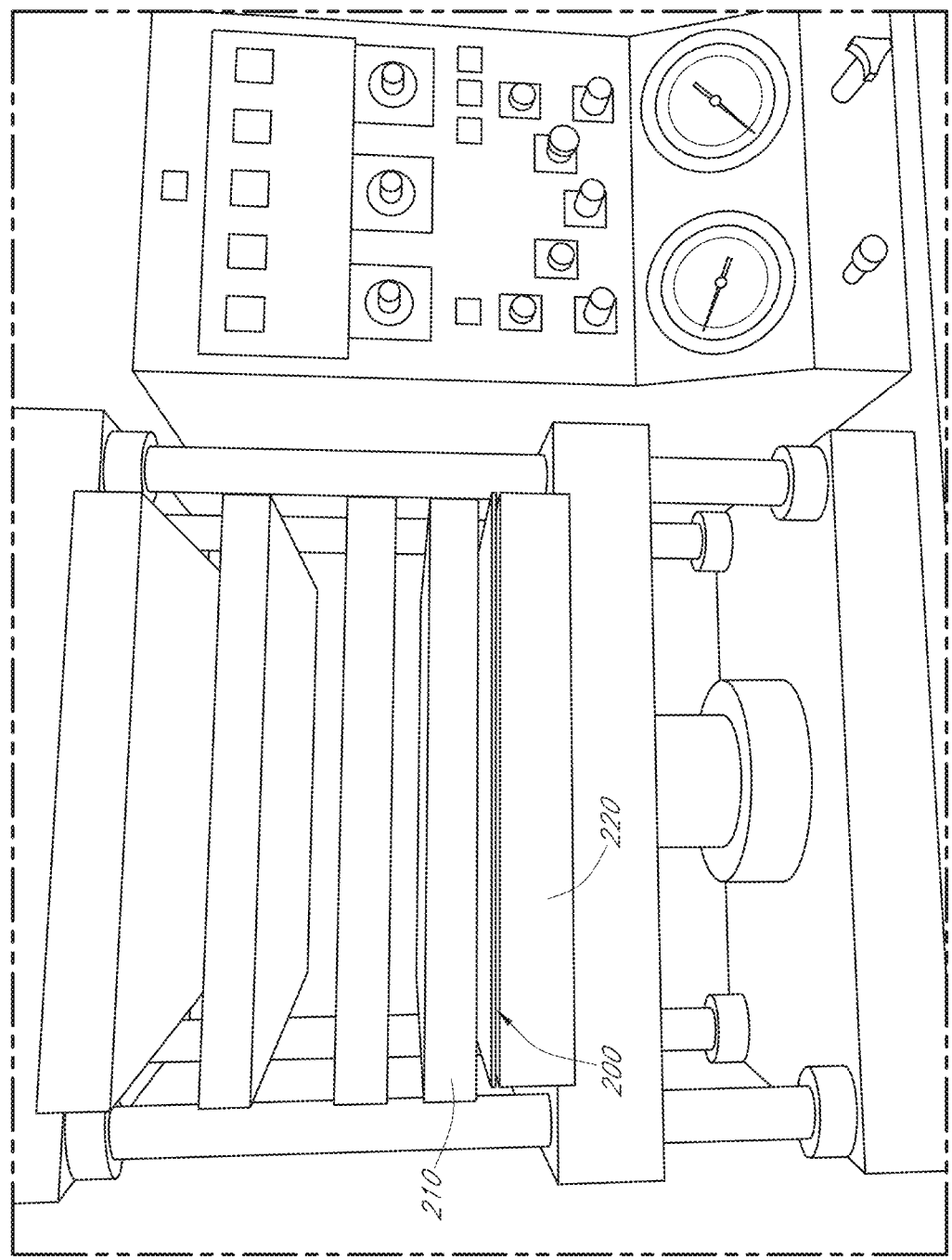
FIG. 21 shows an illustrative method of making the foam slab shown in FIGS. 20 & 20A.

Referring now to FIG. 21, which provides a depiction of one illustrative embodiment of a method of making such a foam, the heated plate on top (floating platen 210) may be sized and/or configured to exert between 0.5 psi and 2.0 psi vertical pressure on the expanding foam 200 to keep it from developing non-planar attributes and to keep any large air pockets (that may be introduced by mixing and/or sheeting) from growing into large defect sites. The expanding foam 200 may be positioned between the floating platen 210 and lifting platen 220. However, other methods of making a foam with the desired characteristics and according to the present disclosure without limitation unless otherwise indicated in the following claims.

TABLE 3

Illustrative Ranges of Ingredients.

| Ingredient | Parts per Hundred Rubber | Ingredient Class |
| --- | --- | --- |
| ENR-25 | 100 | Polymer |
| Cork powder | 0-40 | Filler |
| Starch | 0-100 | Filler |
| Precipitated Silica | 0-10 | Filler |
| Epoxidized Soybean Oil | 0-10 | Plasticizer |
| Castor Oil | 0-10 | Plasticizer |
| Plant-Based Wax | 0-1 | Release Aid |
| Curative (as defined herein above) | 5-20 | Curative |

As shown in Table 3, a foam produced according to the present disclosure may include a varying array of ingredients, and the specific ingredients and their relative proportions within the foam in no way limit the scope of the present disclosure unless otherwise indicated in the following claims. In one illustrative embodiment, epoxidized natural rubber 25 (ENR-25) may be mixed with fillers such as cork powder, corn starch, silica, plasticizing oils, and curative prepared according to the present disclosure as described in detail herein above. This mixture may be sheeted out on a two-roll mill or calender to a thickness roughly half of the final target thickness. The calendered sheet may be placed between two heated steel plates for both curing (vulcanization) and foaming. In one illustrative embodiment, a multiple-daylight platen press, such as that shown in FIG. 16, may be used in which the weight of a single platen exerts between 0.5 psi and 2.0 psi on the calendered sheet.

While the mixture expands, the heat from the top (floating) platen 210 and bottom (fixed), or lifting platen 220 convey heat into the compound to simultaneously cure the rubber. The cure time may be directly impacted by the thickness of the sheet and may be between 5 minutes and 2 hours (wherein longer cure times may be required for thicker slabs). The curing temperature is preferably between 120° C. and 180° C., or even more preferably between 130° C. and 170° C., and even more preferably between 140° C. and 160° C. without limitation unless otherwise indicated in the following claims. After curing, a slab of foam made according to the present disclosure may exhibit performance attributes as shown in Table 3. However, a foam produced according to the present disclosure may be configured to exhibit other properties and/or other values and/or ranges of the properties shown in Table 4 without limitation unless otherwise indicated in the following claims.

TABLE 4

Illustrative properties of a foam made according to the present disclosure.

| Density | Resiliency | Dynamic Compression Set | Energy Efficiency |
|---|---|---|---|
| 0.35-0.55 g/cm$^3$ | >20% | >10% | >60% |

Foams made according to this disclosure may be used in footwear midsoles, insoles, and foam padding for tongues at various thicknesses. Of particular utility may be the use of foams according to this disclosure in footwear midsoles. Foams produced according to the present disclosure may be applicable to other products without limitation unless otherwise indicated in the following claims.

D. Applications/Additional Illustrative Products

Materials according to this disclosure may be used as flooring, exercise mats, bedding, shoe insoles, shoe outsoles, or sound absorption panels without limitation unless otherwise indicated in the following claims.

Materials according to this disclosure may be molded into complex three-dimensional articles and multi-laminated articles. Three-dimensional articles may also consist of multiple material formulations arranged at various locations within an article to provide functionality required for each location.

The resilient memory foam based on vegetable oil may be used in applications where polyurethane is used today. Such applications may include shoes, seating, flooring, exercise mats, bedding, sound absorption panels, and the like without limitation unless otherwise indicated in the following claims. Many of these articles are consumable items that if made from synthetic polyurethane foams are non-biodegradable and are non-recyclable. If such items are made from the material disclosed herein, they would be biodegradable and thus not create a disposal problem.

6. Additional Articles

Summary

One object of various embodiments of the present disclosure is to provide methods of manufacture for various articles (including but not limited to footwear unless otherwise indicated in the following claims), wherein an article may be comprised of various types of materials that all utilize the same class(es) of polymer(s) for all functional components therein. That is, the continuous polymer phase of all types of materials are compatible with each other.

Additionally, another object of illustrative embodiments of the present disclosure is to provide such types of materials that all utilize the same class(es) of polymer(s) wherein said polymer(s) are bio-based (i.e., coming from agricultural sources, either in entirety or in substantial majority) with nominal or no detectable synthetic and/or petroleum-based compounds. Such types of materials include, but are not limited to unless otherwise indicated in the following claims: a foam material that is applicable to midsole and/or insole components, a solid molded material that is applicable to the outsole, a sheet-good material that is applicable to the upper components, an adhesive material that may be used to bond components together, a coating material that may be used to provide preferred haptics and possibly coat textile material(s), a textile material (used as a knit upper for example or a backer for the sheet-good material), and/or a rigid or semi-rigid material (which may be used for various components such as buckles, clasps, eyelets, zippers, loops, eye stays, clips, and/or similar components without limitation unless otherwise indicated in the following claims).

Another object of illustrative embodiments of the present disclosure is to provide a mechanical processing technology that may render said materials reformable into a new article comprising one homogeneous blend of the various types of input materials used in the entire article. It is a further object of illustrative embodiments of the present disclosure to provide a mechanical processing technology that utilizes mechano-chemical reactions that render the blended types of input materials capable of being remolded (using thermoset molding chemistries) into a new article. Other objects of illustrative embodiments of the present disclosure may be utilized, inherent, and/or expressed herein without limitation unless otherwise indicated in the following claims.

Materials that may be suitable for inclusion in such illustrative embodiments of a footwear article include, but are not limited to unless otherwise indicated in the following claims, those manufactured according to technologies disclosed in U.S. Pat. Nos. 10,400,061; 10,882,950; 10,882,951, and other related pending applications by the same inventor(s). Such materials may utilize a mechano-chemically reversible thermoset curative. Materials utilizing this technology (both epoxidized polymer(s) and β-hydroxyesters as cure sites) are able to be homogeneously combined regardless of the starting form; either sheet good, molded component, foam, coating material, rigid or semi-rigid material, or adhesive interlayer without limitation unless otherwise indicated in the following claims.

Generally, at least six types of materials may be manufactured according to the present disclosure, which materials may be used in various articles as disclosed herein or as suitable for the particular material or combinations of materials without limitation unless otherwise indicated in the following claims. These various material types may share at least a common chemistry in that each may include β-hydroxyester linkages, and that in various illustrative embodiments each type of material may be constructed with only naturally occurring compounds (and without use of any animal-hide leather) yet exhibit the performance characteristics desired for a wide range of applications. That is, the materials may be completely petro-chemical, synthetic chemical, and/or animal-hide leather free yet simultaneously perform similar to or better than the prior art materials. The commonality in chemistry among the various materials disclosed herein may result in various advantages, including but not limited to the miscibility of virtually any combination and/or configuration of the various materials during a mechano-chemical process (such as that disclosed herein for recycling materials) without limitation unless otherwise indicated in the following claims. The materials may be bonded to one another during processing in any order, number, layers, thicknesses, configuration, etc. suitable for the material and particular application thereof without limitation unless otherwise indicated in the following claims.

A first material may be configured as a leather-like material as described in detail herein above, wherein the leather-like material may serve as a substitute for applications currently served by synthetic leathers and/or animal-hide leathers without limitation unless otherwise indicated in the following claims. Such a material may be comprised of a thermosetting elastomer that is crosslinked with β-hydroxyester linkages, wherein said first material is defined as being a leather-like material with a glass transition temperature generally below room temperature (e.g., less than ~23 C), wherein said first material may be configured as generally planar and having a thickness between about 0.3 mm and 2.5 mm but without limitation unless otherwise indicated in the following claims.

A second material may be comprised of the same thermosetting elastomer that is crosslinked with β-hydroxyester linkages, wherein the second material may be defined as being a foam material with a glass transition temperature generally not greater than room temperature or just above room temperature (e.g., around ~23 C or between ~20 and ~30 C) and having a density less than 0.7 g/cc but without limitation unless otherwise indicated in the following claims.

A third material may be comprised of the same thermosetting elastomer that is crosslinked with β-hydroxyester linkages, wherein the third material may defined as being a molded elastomer material with a glass transition temperature generally not greater than room temperature or just over room temperature (e.g., around ~23 C or between ~20 and ~30 C), wherein the third material may be cast and/or molded in a three-dimensional in shape but without limitation unless otherwise indicated in the following claims.

A fourth material may be comprised of the same thermosetting elastomer that is crosslinked with β-hydroxyester linkages, wherein the fourth material may be defined as being a coating material with a glass transition temperature generally below room temperature (e.g., less than ~23 C), wherein the fourth material may be configured with a thickness from 10 to 100 microns but without limitation unless otherwise indicated in the following claims.

A fifth material may be comprised of the same thermosetting elastomer that is crosslinked with β-hydroxyester linkages, wherein the fifth material may be defined as being an adhesive material with a glass transition temperature generally below room temperature (e.g., less than ~23 C), and wherein the fifth material has a thickness of 1 mm or less but without limitation unless otherwise indicated in the following claims. Further, it is contemplated that the adhesive material may generally be positioned between two substrates, wherein either substrate may be one of the other materials disclosed herein but without limitation unless otherwise indicated in the following claims.

A sixth material may be comprised of the same thermosetting elastomer that is crosslinked with β-hydroxyester linkages, wherein the sixth material is defined as being a rigid or semi-rigid material with a glass transition temperature generally greater than room temperature (e.g., greater than ~23 C), and wherein the sixth material is substantially non-crystalline in structure but without limitation unless otherwise indicated in the following claims.

These six materials may be bonded to one another in nearly any combination to fabricate an article having a desired set of characteristics and/or functional attributes. That is, the first material may be bonded to the second material, third material, fourth material, fifth material, and/or sixth material; the second material may be bonded to the third material, fourth material, fifth material, and/or sixth material; the third material may be bonded to the fourth material, fifth material, and/or sixth material; the fourth material may be bonded to the fifth material and/or sixth material; and the fifth material may be bonded to the sixth material in any suitable combination, ordering, and/or layering without limitation unless otherwise indicated in the following claims. Additionally, an article may include more than one layer of a specific type of material separated by layers for other types of material (e.g., a layer of the second material sandwiched between two layers of the first material) in any suitable configuration without limitation unless otherwise indicated in the following claims. The common chemistry among the six materials, and particularly the β-hydroxyester linkages, allow any and all combinations of the six materials to be miscible during certain types of recycling as described in detail below, including but not limited to mechano-chemical processing (which may serve to selectively and/or reversibly break or the β-hydroxyester linkages or "de-crosslink" the material) unless otherwise indicated in the following claims.

Detailed Description

An illustrative embodiment of a footwear article produced according to the present disclosure may contain one or more types of materials that utilize a polymer matrix that is molded and cured wherein β-hydroxyesters are crosslinks between epoxidized polymer inputs. An illustrative embodiment of a footwear article according to this disclosure may contain textile components without limitation as well unless otherwise indicated in the following claims. In one illustrative embodiment, said textile components are preferably made from bio-based inputs such as: cotton, regenerated cellulose, various animal fibers (wool, silk, alpaca fiber, etc.), protein fibers (soy protein, casein), and man-made bio-based fibers (e.g. polyhydroxyalkanoates, polylactic acid) without limitation unless otherwise indicated in the following claims. For certain applications it may be preferable to utilize foams based on epoxidized natural rubber (ENR) as the continuous polymer matrix that are cured (vulcanized) via β-hydroxyesters. In one illustrative application a preferred curative may be prepared according to U.S. Pat. No. 10,400,061 which is incorporated by reference herein in its entirety.

Mechano-chemical recycling of footwear articles as manufactured according to illustrative embodiments of the present disclosure may involve at least two steps: (1) the pre-shredding of the footwear article; (2) subjecting the shredded material to high-shear mixing (such as may be accomplished by a two-roll mill as is commonly used in rubber mixing or an internal mixer as is commonly used in rubber mixing); (3) shaping the homogenously mixed elastomeric material to an appropriately sized pre-form (whether through calendering or extrusion or other suitable process);

and/or 4) molding a desired article through heat and pressure to yield a formed thermoset material.

I. Foams

Foams are used in footwear components as midsoles, insoles, tongue padding, and/or around the cuff area. Foams of various thicknesses and densities are possible within the inventive framework disclosed herein. In one illustrative embodiment, foams may be manufactured by mixing an ENR-based batch of material containing a substantial (>10 wt %) content of cork powder. It has been discovered that certain kinds of cork powder can be incorporated into ENR-based recipes and entrain trapped air that may expand upon low-pressure curing to yield foams with densities less than 0.75 g/cc. Even more preferably, certain recipes may be subject to low-pressure curing and achieve densities less than 0.6 g/cc. Even more preferably, certain recipes have discovered that, even though they contain no chemical blowing agents, still achieve densities less than 0.5 g/cc.

In one particular illustrative embodiment, a recipe containing 100 parts of ENR was combined with a total of 35 parts of various cork powders along with 15 parts of natural plasticizers, 10 parts of precipitated silica, and curative (as further described in U.S. Pat. No. 10,400,061) to yield a recipe that was sheeted out and cured with low pressure (0.5-4 psi), It has been found that pressure-free curing may result in sheets that are not smooth and may have large trapped-air pockets. Low-pressure curing may result in an optimal balance of sufficient pressure to reduce the propensity of large trapped-air pockets to expand while still allowing for the expansion of air to create pores on the 0.1-3 mm size scale. Curing temperatures may be 120° C.-180° C., or even more preferably between 130° C.-170° C., and in some cases between 140° C.-160° C. Concurrent with the curing process is the expansion of the entrained air to form the porosity. That is, the sheet (or article) may be placed in an oven at one (higher) density and the sheet (or article) expands with the application of heat to reach the target thickness and a second (lower) density. Immediately after expansion, and even during expansion, the curing reaction may be instigated and may act to chemically fix the new dimensions in-place. In one illustrative embodiment, a sheet that is placed into an oven or between hot plates at 5 mm thickness may expand to a sheet that is 9-11 mm in thickness after expansion and curing. Surprisingly, it has been found that vertical pressure applied to a preform may be sufficient to constrain lateral growth while allowing vertical growth. That is, the thickness of the sheet may grow while the lateral dimensions remain relatively unchanged.

If oven curing is used, it may be preferable to have a preheated metal plate to place on top of the foaming sheet to apply the target pressure range (0.5-4 psi). In one illustrative embodiment, a custom molded shape may be created by manufacturing a preform of dimensions roughly half as thick as the final target thickness (including any convolutions or variations in thickness required), placing a preheated metal mold on the top of preform, and allowing said preform to expand to the final target shape. In one illustrative embodiment, said custom molded shape may be a shoe midsole. In this instance, the midsole preform may be created by pressing the rubber compound into a shape that is substantially similar to the contours of the final midsole—but roughly half of the final target thickness. The midsole preform may then be placed between two heated metal molds (one side may be a simple plate) to both foam the material and cure the material concurrently. The heat from the metal molds (again, one side may be a simple plate) will cause the entrained air to expand and increase the thickness of the rubber, reducing the density, and the rubber will cure.

For articles that do not require complex contours, the creation of sheet preforms may be created by calendering or extruding the rubber compound to a thickness that is less than the final target thickness. That is, a 5 mm calendered sheet may foam to a final thickness of 9-11 mm. In some instances, the thickness of the final foam would require a preform thickness that is beyond the range of control that is possible with calendering. In such cases, sheet extrusion may be used to make a sheet preform that is substantially free of large trapped-air pockets.

II. Outsoles

Outsoles used in many footwear articles are 3-dimensionally molded components that comprise features that provide traction, provide wear material, and interface with the other components of the shoe. Rubber outsoles are well known in the art; they are often made of thermoset (i.e. vulcanized) elastomers but may also be made from thermoplastic elastomers (TPE)—of which there are many subtypes that may be suitable, including but not limited to: ethylene vinyl acetate copolymers (EVA), styrene butadiene styrene (SBS), styrene ethylene butadiene styrene (SEBS), other styrenic block copolymers (generically TPS), polyether block amide (TPA), copolyester (TPC), thermoplastic polyurethane (TPU), thermoplastic polyolefins (TPO). Additionally, outsoles may be made from thermoplastic vulcanizates (TPV); compounds that contain crosslinked rubber within a thermoplastic matrix. The highest performing outsoles are made from thermoset elastomers. Among the most common thermoset elastomers that may be used for outsoles, natural rubber (NR), styrene butadiene rubber (SBR), butadiene rubber (BR), and ethylene propylene diene monomer (EPDM) are the most widely used. Polychloroprene (CR) or acrylonitrile butadiene rubber (NBR) may be used for oil-resistant sole formulations.

According to an illustrative embodiment of the present disclosure, a preferred thermoset elastomer outsole formulation may be based on epoxidized natural rubber (ENR). ENR is commercially available in two grades: ENR-25 and ENR-50, which are differentiated by their respective degrees of epoxidation; 25% of the double bonds are converted to epoxides in ENR-25 while 50% of the double bonds are converted to epoxides in ENR-50. According to one illustrative embodiment, ENR-25 may be used for the outsole base rubber. ENR may be crosslinked (vulcanized) through means known in the art for unsaturated elastomers; including but not limited to sulfur vulcanization, peroxide vulcanization, alkylphenol vulcanization (so-called "resin cure"), and radiation vulcanization. Additionally, because ENR contains epoxy functional groups, there are other cure mechanisms that may be used that are uniquely suited to reactions with the epoxy functionality. Polyfunctional amines, polyfunctional acids, and polyphenol compounds may all be used to crosslink epoxidized polymers such as ENR. Among simple polyfunctional molecules that may be used to crosslink ENR, the bio-based Priamine™ molecules from Croda—all polyfunctional amines—are one pathway. Another group of polyfunctional molecules that may be used to crosslink ENR are the polyfunctional carboxylic acids. For certain illustrative embodiments, preferred naturally occurring or naturally derived polyfunctional carboxylic acids include, but are not limited to unless otherwise indicated in the following claims, citric acid, tartaric acid, succinic acid, malic acid, maleic acid, oxalic acid, azelaic acid, dodecanedioic acid, malonic acid, sebacic acid, glutaric acid, glucaric acid, fumaric acid, crocetin, muconic acid, citraconic acid, mesaconic acid, itaconic acid, glutinic acid, glutamic acid, aspartic acid, acetonedicarboxylic acid, aconitic acid, agaric acid, and phytic acid. Another class of potential curatives are those that are reaction products between a polyfunctional naturally occurring carboxylic acid and an epoxidized plant oil; such reaction products are further disclosed in U.S. Pat. No. 10,400,061.

When outsoles are manufactured with certain classes of curatives according to this disclosure, those compounds are able to be recycled according to mechano-chemical processing and are miscible with other articles, whether they be foams or sheet goods, that utilize closely related cure systems and polymer types. For example, an outsole that is manufactured with ENR that is cured with polyfunctional carboxylic acids may be mechno-chemically recycled concurrently (and miscibly) with a foam or sheet-good (used as a shoe upper) that also is made using ENR that is cured with polyfunctional carboxylic acids. This is true whether the ENR of one component (or subcomponent) is ENR-25 and another component (or subcomponent) of the shoe utilizes ENR-50 as the base rubber. Furthermore, ENR-based components (or subcomponents) may be mechno-chemically processed concurrently (and miscibly) with materials that are reaction products between polyfunctional carboxylic acids and epoxidized plant oils. Various types of such mechano-chemical processing are disclosed in U.S. Pat. No. 10,882,951.

Outsole thermoset elastomer compounds formulated according to this disclosure may utilize fillers that are only bio-based and mineral based. Non-marking soles may be formulated without carbon black as a filler; instead they may use precipitated silica as the primary reinforcing agent. Alternatively, rice husk ash may be used as an alternative silica source that imparts similar primary reinforcing benefits. In some illustrative embodiments, mineral fillers that may be used include talc, mica, wollastonite, clay(s), sepiolite, muskovite, and other silicates and aluminates. In some illustrative embodiments that do not require translucency, agricultural byproducts may be used as fillers. Common agricultural byproducts include, but are not limited to, materials such as cork powder, ground rice hulls, ground coir fiber, cellulosic powders, various ground nut powders, and ground grasses (e.g. *miscanthus* powder). In general, high performance outsole compounds may contain some primary reinforcing filler(s) and may contain various extending fillers that improve processing but do not significantly impact strength and abrasion performance attributes.

III. Manufacture of Adhesive

Many types of footwear are constructed using adhesives. Adhesives may serve as fixturing aids to supplement sewing, they may be the primary attachment medium between midsoles and shoe uppers (and/or other footwear/article components), they may be the primary attachment medium between midsoles and outsoles (and/or other footwear/article components), and they may be used to secure foxing or other elements to the outside of the shoe surface. Many adhesives in use for footwear construction are elastomeric and function as contact adhesives (with high initial tack). Many are solvent-based to facilitate dispensing and spreading the adhesive. Many are heat-cured thermosets. Most all adhesives in current use are petrochemical-based.

According to the present disclosure, am entire class of adhesives based on illustrative embodiments of bio-based resins may be used in various articles/footwear. In one illustrative embodiment, the adhesive may be a 2-part (2K) thermosetting system that comprises a curative prepared as disclosed in U.S. Pat. No. 10,400,061 and an epoxidized plant-based oil. In one illustrative embodiment, the adhesive is solvent-free and substantially petrochemical-free. In one illustrative embodiment the epoxide & carboxylic acid reaction is catalyzed to allow for a thermosetting reaction to occur at ~100° C.-150° C. in less than 30 minutes to yield a sufficiently vulcanized adhesive. In one illustrative embodiment, the adhesive may be catalyzed before usage so that temperatures lower than 100° C. and times less than 30 minutes are sufficient to cure the adhesive.

In another illustrative embodiment of a suitable adhesive prepared according to the present disclosure, the adhesive may be a 1-part (1K) thermosetting system that comprises a material that is partially reacted to completion at one temperature (e.g. a first reaction temperature of ~40° C.-60° C.) and then cooled to a temperature for storage that is less than room temperature (e.g., less than ~23° C.) and preferably stored at refrigerated temperatures (e.g., less than ~5° C.), and even more preferably stored at deeper freezing temperatures (e.g., less than ~-15° C.). This 1K thermosetting system may be reacted at the first reaction temperature with a naturally-occurring polyfunctional carboxylic acid and an epoxidized plant-based triglyceride. At this first reaction temperature, the naturally-occurring polyfunctional carboxylic acid (e.g. citric acid) may be miscibilized with the epoxidized plant-based triglyceride (e.g. epoxidized soybean oil, ESO) with a miscibilizing solvent (e.g. acetone, isopropyl alcohol, or ethanol). At the first reaction temperature, it has been found that a stable intermediate product may be created that creates a pre-polymer in stoichiometric balance but that is not completely polymerized. After that first reaction is progressed sufficiently—in one illustrative embodiment this may take 16-32 hours, or more preferably this may take 20-28 hours—the temperature may be lowered to a second temperature at which residual miscibilizing solvent may be vacuum extracted. This second temperature may be between ~15° C.-40° C., or more preferably between ~20° C.-30° C. At this second (lower) temperature, the reaction rate may be considerably slowed such that the solvent may be removed without causing excessive pre-polymer growth (and thus viscosity increase). After the solvent has been removed (which in on illustrative embodiment may be performed by vacuum), the reaction product may be stored at sub-ambient temperatures (as already described). This 1K thermosetting adhesive system may be applied to various articles, article components, and/or footwear components and then cured (vulcanized) at ~100° C.-150° C. in less than 30 minutes to set the adhesive joint. In one illustrative embodiment, the adhesive may be catalyzed before usage so that temperatures lower than 100° C. and times less than 30 minutes are sufficient to cure the adhesive.

IV. Coated Textiles

Generally, for some applications it may be desirable to configure one or more portions of an article as a coated textile. Specifically, but without limitation unless otherwise indicated in the following claims, all or a portion of a shoe upper may be comprised of a coated textile.

In an illustrative method for manufacturing such a coated textile, a resin prepared according to the present disclosure may be diluted in a solvent. The resulting solution may be applied to a fabric and/or textile via any suitable method using any suitable apparatus unless otherwise indicated in the following claims. It is contemplated that for some applications the solution may be sprayed, rolls, or padded onto the fabric and/or textile.

After the solution is applied to the fabric and/or textile, the solvent may be allowed to evaporate and the resin may be cured. The solvent evaporation may be achieved under ambient pressure and/or temperature or under reduced pressure and/or increased temperature without limitation unless otherwise indicated in the following claims. The resin cure may be achieved under ambient pressure and/or temperature or under increased temperature and/or pressure without limitation unless otherwise indicated in the following claims.

In one illustrative embodiment of a method of manufacturing a coated fabric and/or textile, but without limitation unless otherwise indicated in the following claims, the coated fabric and/or textile may be manufactured without a solvent or with a minimal amount of solvent. In such a method, an aqueous emulsion may be prepared with a resin configured as those previously described herein above, wherein the aqueous emulsion may subsequently be applied to the fabric and/or textile. In such a method, the aqueous emulsion may be prepared using a solvent-free or solvent-poor resin that may be mixed under relatively high-shear conditions with a suitable surfactant. Utilizing the proper amount of dilution of resin in the aqueous emulsion and proper application of the aqueous emulsion to the fabric and/or textile (e.g., small enough emulsion droplets, flow rates and flow characteristics of aqueous emulsion, etc.) may result in the desired attributes of the coated fabric and/or textile (e.g., adequate coverage, penetration of the fabric and/or textile, etc.).

After application of the aqueous emulsion to the fabric and/or textile, the treated fabric and/or textile may be allowed to dry under ambient pressure and/or temperature or under reduced pressure and/or increased temperature without limitation unless otherwise indicated in the following claims. The resin cure may be achieved under ambient pressure and/or temperature or under increased temperature and/or pressure without limitation unless otherwise indicated in the following claims.

The resulting coated textile and/or fabric may exhibit various desirable attributes, including but not limited to, increased waterproof attributes, increased durability, increased strength, and/or combinations thereof unless otherwise indicated in the following claims.

V. Integration into Footwear/Articles (Examples of Various Styles)

Footwear is often created by combining multiple material types; most often from various material families. In some instances, the various material types (foam, fabric, strapping, etc.) may be made from the same (or closely related) material families. For example, a shoe may use a polyester fabric upper, be closed with polyester fiber laces, it may use a polyester co-polymer foam, and perhaps could even use a polyester co-polymer thermoplastic elastomer outsole. In such instances, the entire shoe (made of related thermoplastics) could hypothetically be recycled by melting all the constituents and molding a new article (shoe component or alternative article) out of the blended material. In such a case, there may be some limitations in regards to the performance suitability of the available options for the various components when trying to keep all the materials in the same family. Additionally, there may be certain components (such as those listed above, but without limitation unless otherwise indicated in the following claims) that are better served by thermoset polymers instead of thermoplastic polymers. Also, the most commonly used thermoplastic polymers used in footwear components are neither biobased nor biodegradable.

An illustrative embodiment of the present disclosure provides for the combination of multiple material types drawn from a common family of thermosetting polymers. In addition, illustrative embodiments of the thermosetting polymers of this disclosure may be mechano-chemically recyclable using high-shear low-temperature mixing process(es) as disclosed in U.S. Pat. No. 10,882,951. It has been found that incorporation of fabrics (e.g., a cotton upper or a cellulosic backing fabric for a leather-like material) does not inhibit the mechano-chemical recycleability as such fabrics are dispersed into the resultant mixed product and act as fibrous reinforcement to the compound. Therefore, an illustrative embodiment of a footwear article contemplated by this disclosure may include two or more instances of materials types (e.g., a foam and an outsole, or a foam/outsole unit and an ENR-based material upper (fabric-backed or not), or a foam and an outsole with a fabric upper, etc.), wherein such materials may be co-molded, or alternatively bonded with an adhesive from same family of thermosetting polymers. The mechano-chemically recyclable attribute of the ENR-based material curative or resin-based adhesive (as discussed herein) may enable the entire footwear article to be subject to the same mechano-chemical recycling treatment without requiring separation of the constituent components.

In one illustrative embodiment of an article configured according to the present disclosure the article may be configured as a slide sandal having the above-referenced combination of materials. In this embodiment, three constituent components may include an outsole, a foam, and an ENR-based material strap. The outsole may be molded in a compression mold as is commonly practiced in the art. The outsole may be comprised of an ENR-based compound that is cured with curative formulated according to U.S. Pat. No. 10,400,061. A strap also made from an ENR-based compound that is cured with curative formulated according to U.S. Pat. No. 10,400,061 may be provided. The strap may optionally be fabric backed, made by co-molding a fabric backer with an ENR-based compound that is cured with curative formulated according to U.S. Pat. No. 10,400,061. Said strap may in one illustrative embodiment be adhesively bonded between the outsole and a foam footbed. In one embodiment, after molding the outsole, it may be coated on the backside with an adhesive as disclosed herein. In one embodiment, an uncured foam preform may be placed on pre-molded and adhesive-coated outsole, a heated weight placed thereon may provide sufficient pressure (~0.5-4 psi) to cause vulcanization between the outsole and the foam and yet still allow the foam preform to concurrently "rise" (that is, actually grow in thickness and thereby become a less-dense foam) and cure (i.e. vulcanize).

In one illustrative embodiment a preferred curing and foaming temperature may be between 110° C.-170° C., or even more preferably between 120° C.-160° C., for between 10-90 minutes, or even more preferably between 15-60 minutes. In such a method, the shape of the top heated weight may determine the final shape and contour of the footbed while controlling the growth of the foam. A slide sandal made according to this embodiment may consist of three variations of the same material family (four if the adhesive is included), which yields an article that may be subject to mechano-chemical recycling at the end of its life. Alternatively, according to this illustrative embodiment, the slide sandal is comprised of non-petrochemically derived materials and thus may be returned to the ground for biodegradation.

Figure 23B:
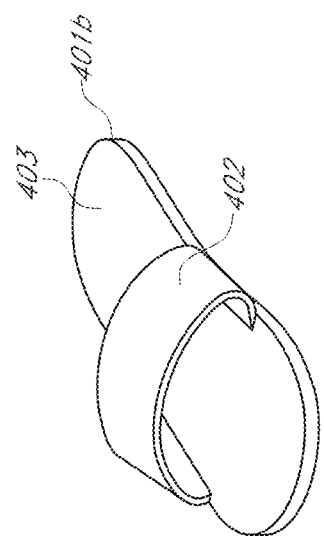
FIGS. 23A-23D provide schematic representations of four steps for an illustrative method of making one type of article.
Figure 23A:
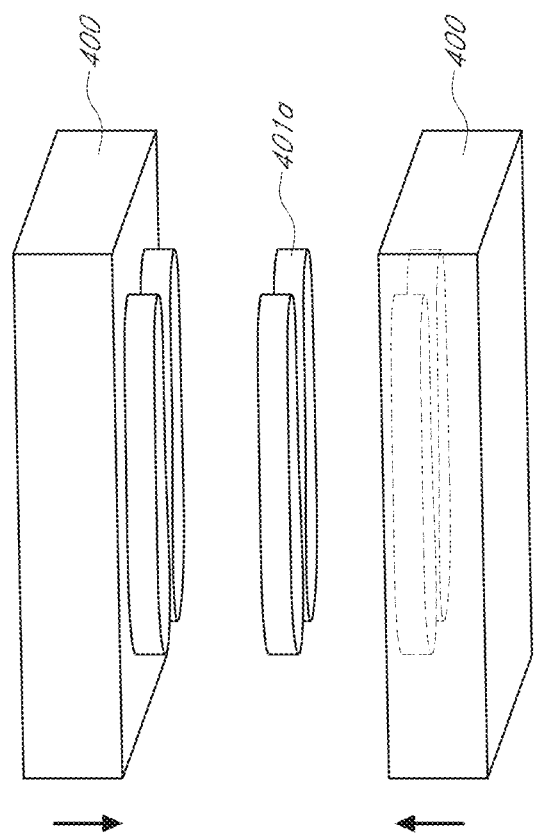
Figure 23D:
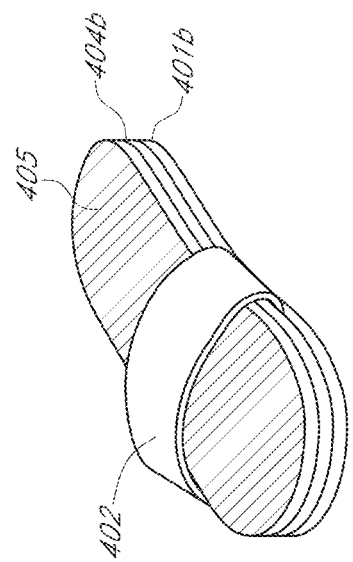
Figure 23C:
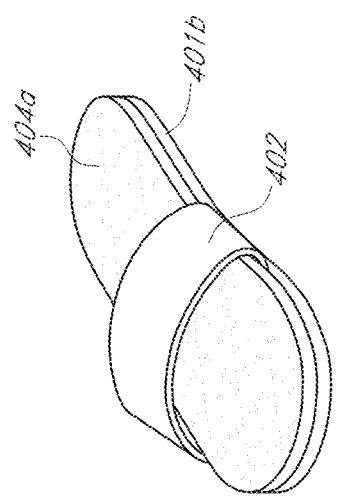

Referring now to FIGS. 23A-23D, which provide schematic representations of four steps for an illustrative method of making one type of article, the illustrative article therein may be configured as a slide sandal. Generally, in a first step as shown in FIG. 23A, a compression mold technique may be used to create a pair of outsoles, wherein the compression molding process may be completed at a specific temperature(s), pressure(s), and/or ranges thereof. A sole preform 401a may be positioned in a mold 400 at a specific temperature and pressure for a specific amount of time to create a sole (or outsole) 401b. In a second step as shown in FIG. 23B an adhesive material 403 may be applied to one surface of the outsole(s) 401b to affix a strap 402 to the outsole 401b. A third step is shown in FIG. 23C, wherein an uncured foam-in-place layer (foam footbed preform 404a) may be applied over an upward-facing surface of the outsole 401b, such that the foam-in-place layer may cover one or more terminal ends of the strap 402. Finally, in a fourth step as shown in FIG. 23D, a metal plate (which may be pre-heated) 405 may be positioned on the foam footbed preform 404a to facilitate the foaming process and/or to generate crosslinking of the material to create a foaming/foamed footbed 404b, and the article may be placed in an oven for curing.

In an illustrative embodiment of an article configured as a clog-like shoe (colloquially referred to oftentimes by the trademark Crocs®), an outsole/sole 401b may in a first step be pre-molded using an ENR-50 based compound and cured with curative formulated according to U.S. Pat. No. 10,400,061. That outsole/sole 401b may optionally be coated with adhesive material 403 as disclosed herein on the backside of the outsole/sole 401b. That adhesive material 403-coated outsole/sole 401b may be placed in a rubber injection-molding tool that is fabricated to form the entire body of the clog-like shoe. In this illustrative embodiment, a foaming compound may be injected into the heated mold and the combination of heat from the tooling and heat generated by shear (during injection) may result in vulcanization and foaming of the compound and concurrent curing of the adhesive-coated outsole to the foamed shoe body. It may be preferred to avoid the use of any petrochemical blowing agents to create the thermoset foam and instead rely on moisture in compounded ingredients that turn to steam during the molding and curing process. Lignocellulosic fillers and starches are two classes of illustrative fillers that may carry controlled levels of moisture that may generate steam during molding and curing that gives rise to foams. This technology (steam expanded starch) is known in the food industry (e.g. to make "corn puffs") but has not been used as a formulation approach in thermoset elastomers to create foams.

Figure 24A:
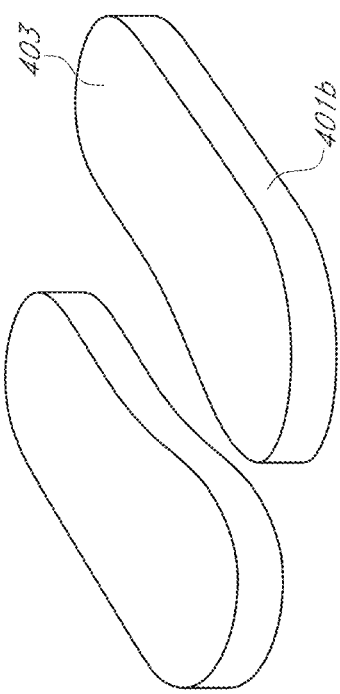
FIGS. 24A-24D provide schematic representations of four steps of another illustrative method of making one type of article.
Figure 24B:
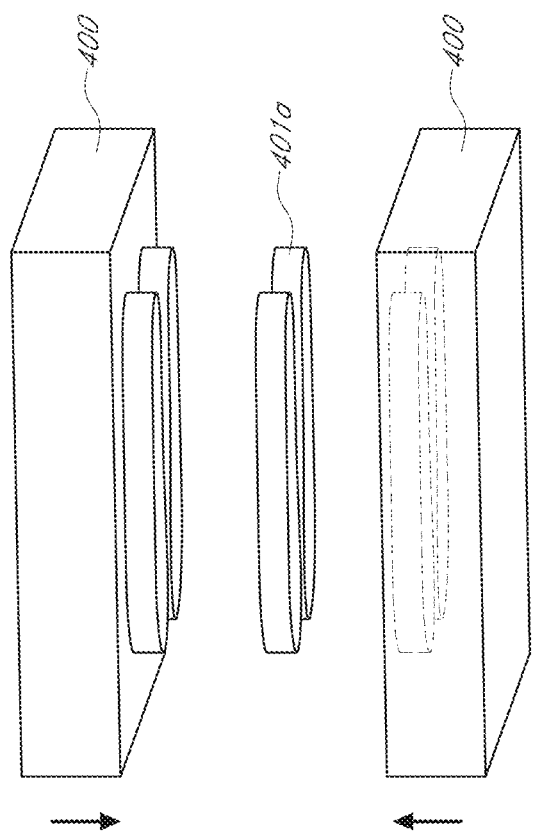
Figure 24D:
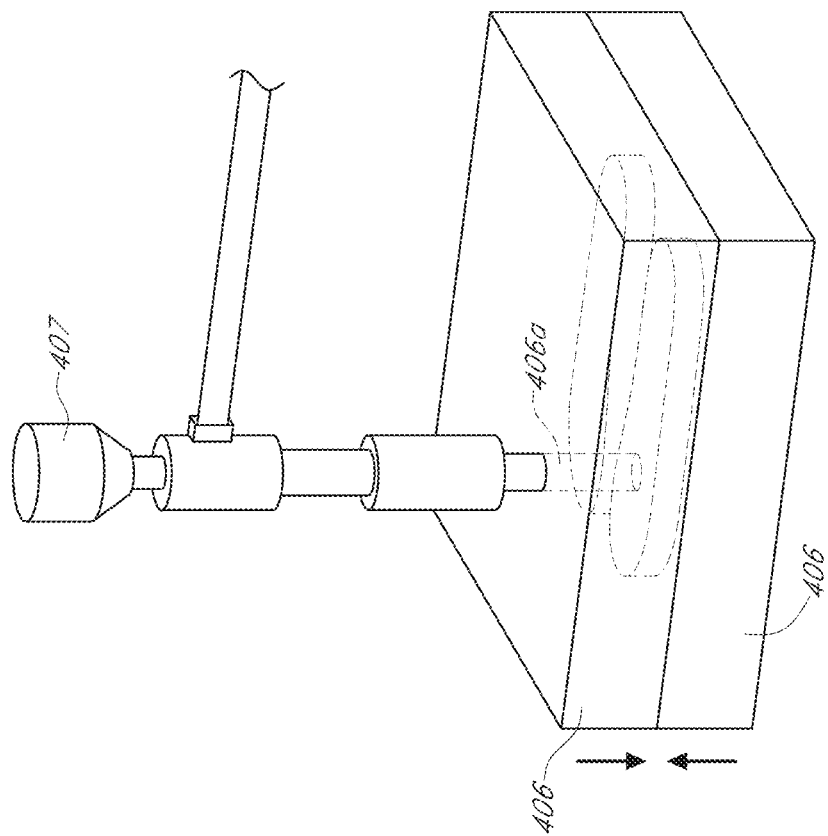
Figure 24C:
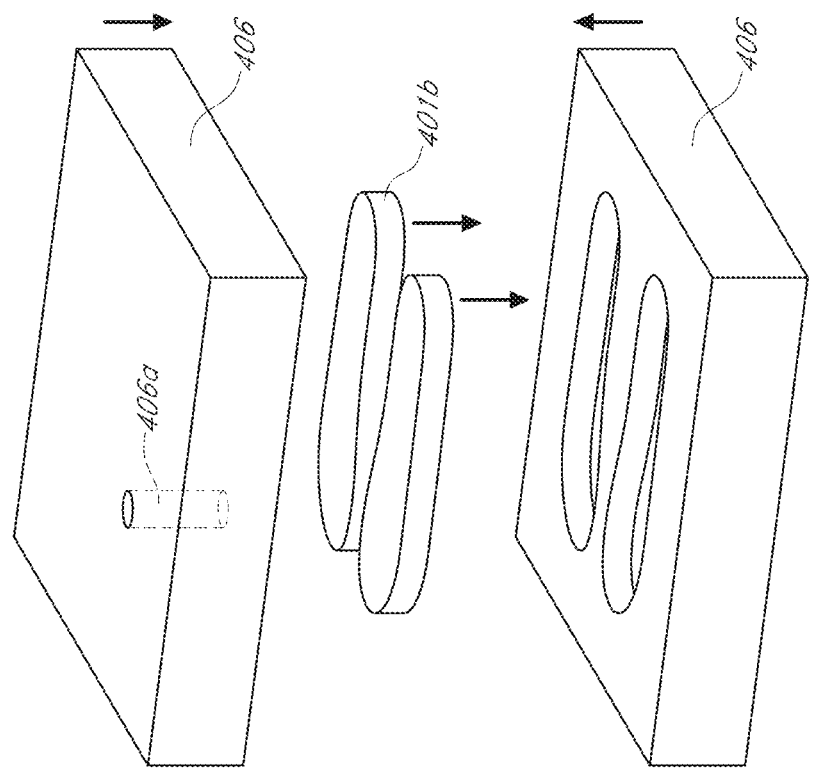

Referring now to FIGS. 23A-23D, which provide schematic representations of four steps of another illustrative method of making one type of article, the illustrative article therein may be configured as an injection-molded clog or Croc®-type shoe. Generally, in a first step as shown in FIG. 24A, a compression mold technique may be used to create a pair of outsole(s) or soles 401b from one or more sole preforms 401a using a mold 400, wherein the compression molding process may be completed at a specific temperature(s), pressure(s), and/or ranges thereof. In a second step as shown in FIG. 24B an adhesive material 403 may be applied to one surface of the outsole(s)/soles 401b. A third step is shown in FIG. 24C, wherein the outsole(s)/soles 401b with adhesive material 403 applied thereto may be positioned within an injection molding tool or foaming compound mold 406. Finally, in a fourth step as shown in FIG. 24D a foaming compound may be injected into the foaming compound mold 406 through an injection port 406a using an injection barrel 407 for injection molding thereof adjacent the adhesive material 403 on the outsole(s)/sole(s) 401b.

In yet another illustrative embodiment of an article according to the present disclosure that may be configured as footwear, a shoe may be manufactured using multiple material types from the same family. Such an illustrative embodiment may be configured with an upper using a leather-like material, an outsole, and a midsole. In this illustrative embodiment, a pre-molded outsole may be made using an ENR-50 based compound and cured with curative formulated according to U.S. Pat. No. 10,400,061. That outsole/sole 401b may optionally be coated with adhesive material 403 as disclosed herein on the backside of the outsole. A mold 406 may be provided that contains the outsole/sole 401b and also has a heated last 408 around which is wrapped the pre-manufactured and/or preformed upper 409 (which may be configured to not entirely envelop the last 408, but only in-part). The last 408 may form one half of the mold cavity (within the shoe) and the outsole/sole 401b (and the side of the tool that holds it) may form the other half of the mold cavity. The pre-manufactured/preformed upper 409 may be pinched between the last 408 and the outsole half of the mold cavity, thus creating a cavity into which a foaming compound may be injected. The foaming compound may be injected through the outsole half of the mold or directly through the last side of the tool to fill the space between the pre-molded outsole/sole 401b and the last 408; while entrapping and bonding to the upper 409 that is wrapped around the last 408 (at least in-part). In this manufacturing process, the foaming compound may serve as the midsole (and/or insole) and subsequently may initiate bonding to and between the outsole/sole 401b and upper 409.

Figure 25B:
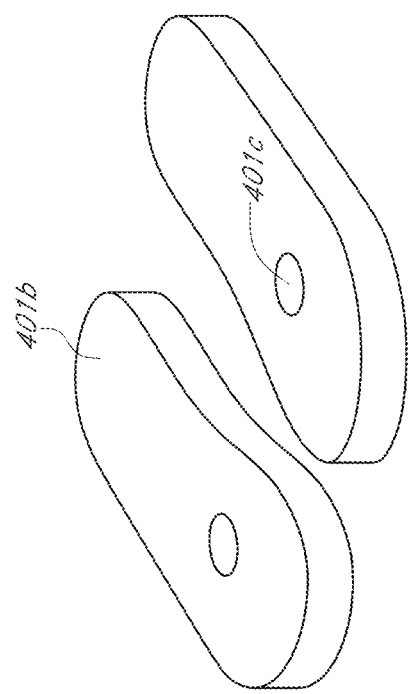
FIGS. 25A-25F provide schematic representations of four steps of another illustrative method of making one type of article.
Figure 25A:
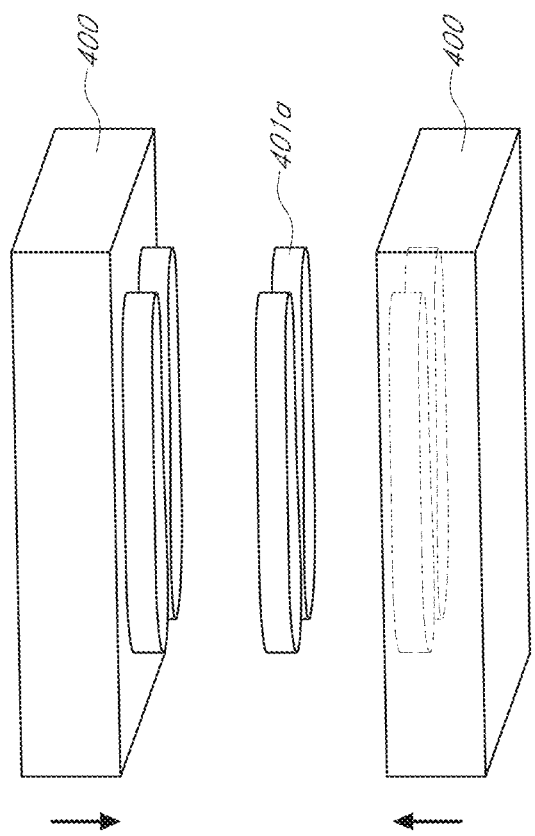
Figure 25D:
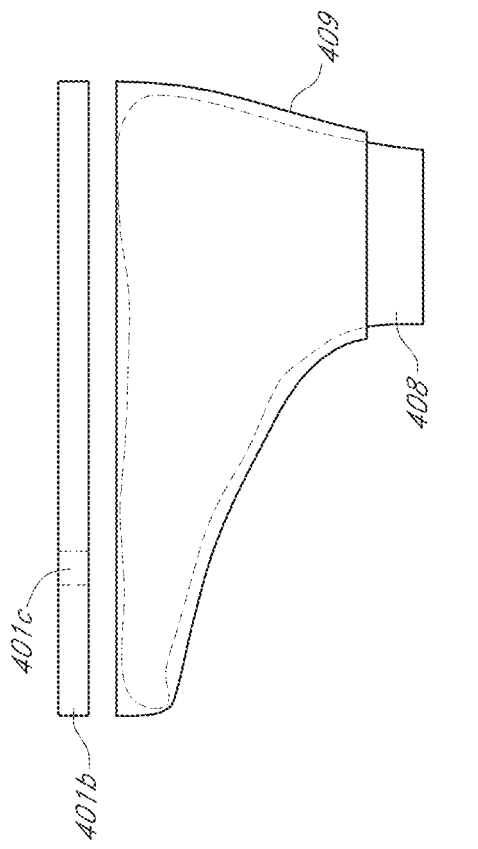
Figure 25C:
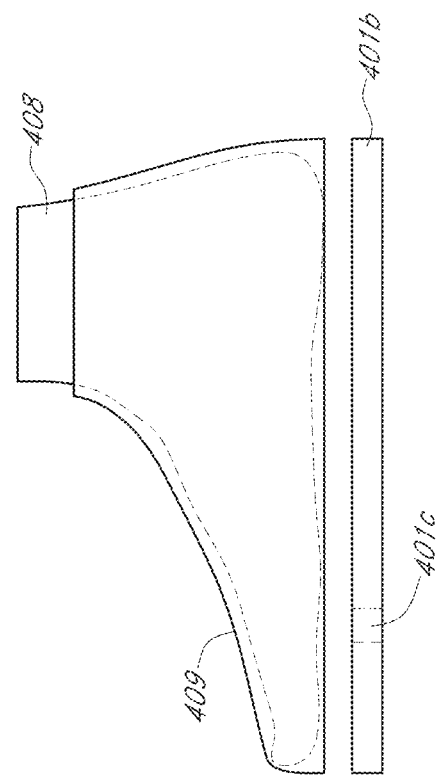

Referring now to FIGS. 25A-25F, which provide schematic representations of six steps of another illustrative method of making one type of article, the illustrative article therein may be configured as a shoe having a distinct sole and upper portion. Generally, in a first step as shown in FIG. 25A, a compression mold technique may be used to create a pair of outsole(s)/soles 401b, wherein the compression molding process may be completed at a specific temperature(s), pressure(s), and/or ranges thereof. In a second step as shown in FIG. 25B an adhesive material 403 may be applied to one surface of the outsole(s)/sole(s) 401b. Additionally, a foam injection aperture 401c may be fashioned in a portion of each outsole/sole 401b if not done in step one. A third step is shown in FIG. 25C, wherein a portion of a shoe preformed upper 409 portion may be wrapped around a portion of the outsole(s)/sole(s) 401b.

Figure 25F:
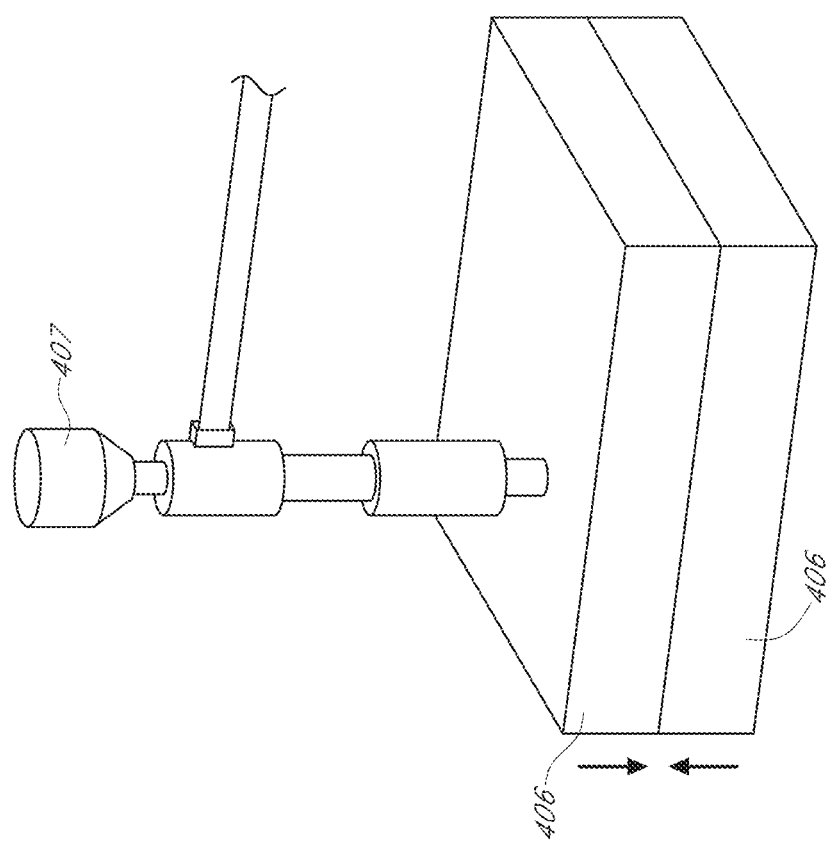
Figure 25E:
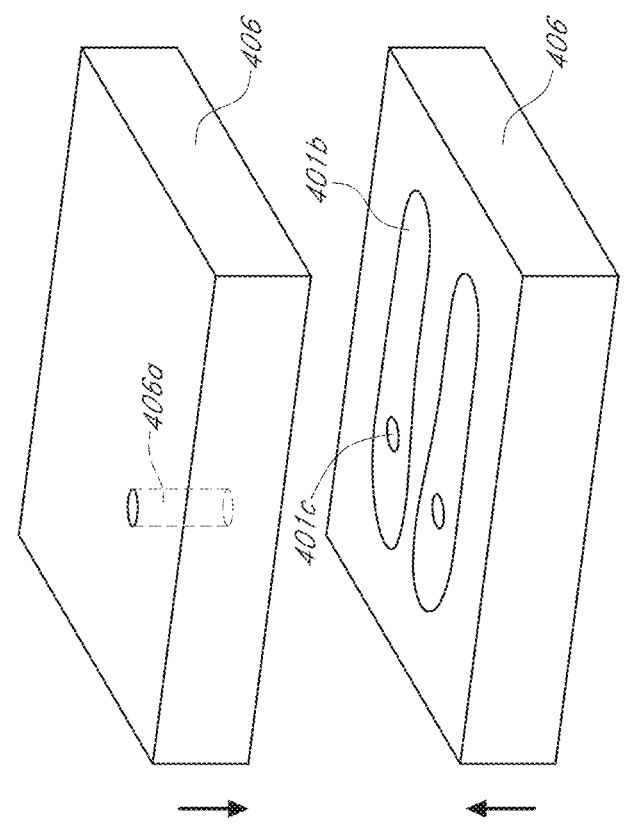

In a fourth step as shown in FIG. 25D, the upper 409 portion of the shoe and outsole/sole 401b may be inverted for positioning in a mold 406, which may be configured as a foaming compound mold 406. In a fifth step shown in FIG. 25E, the outsole/sole 401b and upper 409 may be positioned with respect to a mold 406. Finally, FIG. 25F shows a sixth step wherein a midsole compound (which may be configured as a foaming compound and/or foaming material as disclosed in detail herein without limitation unless otherwise indicated in the following claims) may be injected into the foam injection aperture 401c formed in the outsole/sole 401b. However, the preceding examples of illustrative methods of manufacture for an article configured as a shoe are in no way limiting to the scope of the present disclosure unless otherwise indicated in the following claims These three illustrative embodiments of articles and method for making same are neither exhaustive nor exclusive but are meant to serve as examples of the types of construction that may be utilized to combine multiple material types wherein all the material types are of the same broad material family, and the present disclosure is not limited to articles configured as footwear unless otherwise indicated in the following claims. The common cure system, relying on a reaction between a carboxylic acid and an epoxide to facilitate crosslinking with β-hydroxyester linkages, may enable co-mingling and bonding of the various form factors of the material—whether it be an elastomeric outsole compound, an adhesive layer, a leather-like sheet good, a rigid or semi-rigid and/or plastic-like material, and/or a foam. Textiles may be incorporated without limitation into the construction of such a shoe unless otherwise indicated in the following claims.

VI. Method of Recycling

Illustrative embodiments of articles made according to the present disclosure that are configured as footwear articles may contain polymers that are thermosets manufactured with similar cure (vulcanization) chemistry. The particular cure chemistry, described in detail in U.S. Pat. No. 10,400,061, is unique in its ability to make elastomers that may be mechano-chemically recycled according to U.S. Pat. No. 10,882,951. This method of recycling may utilize a very high specific power input while simultaneously limiting the heating of the material.

Figure 22:
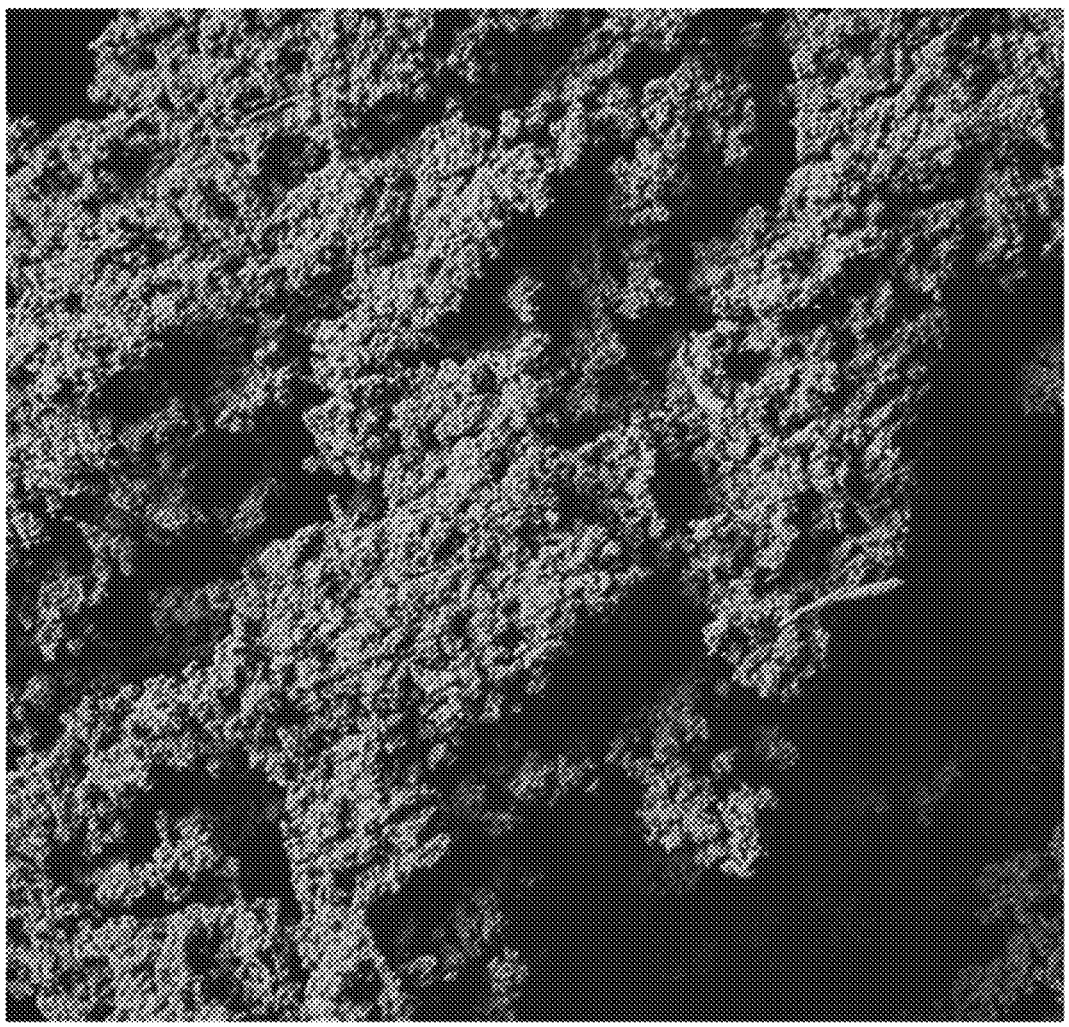
FIG. 22 shows material(s) manufactured with compounds according to the present disclosure that has been ground for recycling.

The recycling of articles (which may be configured as footwear) that utilizes materials disclosed herein may be subject to mechano-chemical recycling without requiring any pretreatment apart from the removal of metallic hardware that may have been added to the article (as to not damage the processing equipment) so as to create a metallic-free mixture. In one illustrative embodiment, the mechano-chemical recycling may be conducted in two stages. In the first stage, articles (e.g., footwear) to be recycled may be fed into an internal rubber mixer. The rubber mixer may be used to break down the articles (e.g., footwear) and make a homogeneous mixture—in practice, the mixer may not be able to deliver the specific energy required to render the mixture a millable gum (due to the clearance limitations in a rubber mixer and the heat build-up therein), but it is capable of making a rubber fluff, an illustrative embodiment of which is depicted in FIG. 22.

In a second stage, this fluff may be fed to a two-roll rubber mill with a nip set to 0.2 mm-2.0 mm, or more preferably to 0.4 mm-1.6 mm. The mill must be set with a friction ratio of 1.1-1.5 or even more preferably between 1.2-1.4 to create the energy input requirements to create a millable gum. However, other values for these clearances may be used in other embodiments without limitation unless otherwise indicated in the following claims. A two-roll rubber mill allows for the combination of sufficient cooling (to prevent scorch, i.e., re-curing) and the specific energy required. After the mixture is rendered a millable gum compound, it may be molded again into a new article; either a component of footwear or another article appropriate to the properties of the material (now a mixture of various inputs which may include ground-up textiles that were part of the recycled article (e.g., footwear)).

In another illustrative embodiment, the recycling may be conducted in a single stage wherein the article (e.g., footwear) may be delivered directly to a two-roll mill and the entire shredding, blending, and creating of a millable gum compound are all achieved in one step.

VII. Example Articles

In this disclosure, particular focus has been placed on footwear, but there are analogous articles that are combinations of elastomeric solids/molded components, elastomeric foams, rigid or semi-rigid plastic-like materials, adhesives, coatings, and/or flexible sheet goods (e.g., leatherlike materials and/or textiles) that may also be manufactured and/or recycled according to the methods disclosed herein. For example, a handbag with elastomeric corner protectors, sheet good sides, and a foam bottom may, by analogy, be manufactured and/or recycled according to the methods disclosed herein. Accordingly, the present disclosure may be applicable to bags of nearly any kind, including but not limited to purses, clutches, satchels, messenger bags, pouches, backpacks, knapsacks, and/or similar bags/sacks without limitation unless otherwise indicated in the following claims. A computer backpack or bag may also be manufactured using a combination of elastomeric solid corner protectors and handles, sheet good sides, and foam bumpers to protect electronics; such an article may be manufactured and/or recycled according to the methods disclosed herein, as may any other suitable article without limitation unless otherwise indicated in the following claims.

Additional articles may be manufactured utilizing various combinations of the six materials having a common chemistry of β-hydroxyester linkages, wherein such articles include but are not limited to furniture and its components (e.g., coverings, cushions, structural members, etc.), luggage and its components (e.g., exterior coverings, cushions, bumpers, handles, clasps, buckles, zippers, etc.), electronics cases and/or accessories (e.g., mobile phone, tablet, and/or mobile computer cases and/or covers), and/or similar articles without limitation unless otherwise indicated in the following claims.

Also, by analogy, such articles that are combinations of materials from the same material family, using the same cure system, but be manifest in different material forms—any such article—may be recycled by the mechano-chemical method. The mixture of those input materials may likewise be rendered into a millable gum compound and thus be moldable into a new article without limitation unless otherwise indicated in the following claims.

Although the methods described and disclosed herein may be configured to utilize a curative comprised of a natural materials, the scope of the present disclosure, any discrete process step and/or parameters therefor, and/or any apparatus for use therewith is not so limited and extends to any beneficial and/or advantageous use thereof without limitation unless so indicated in the following claims.

The materials used to construct the apparatuses and/or components thereof for a specific process will vary depending on the specific application thereof, but it is contemplated that polymers, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes, apparatuses, and products made thereby, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the chemical process, process steps, components thereof, apparatuses therefor, products made thereby, and impregnated substrates according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the welding processes, apparatuses and/or equipment therefor, and/or impregnated and reacted upon substrates produced thereby are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of a chemical process, a process step, a substrate, and/or an impregnated and reacted substrate, may be used alone or in combination with one another depending on the compatibility of the features, components, functionalities, advantages, aspects, configurations, process steps, process parameters, etc. Accordingly, an infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A footwear article comprising:
   a. a first material comprising a thermosetting elastomer that is crosslinked with β-hydroxyester linkages, wherein said first material is defined as being a leather-like material with a glass transition temperature below room temperature, wherein said first material is planar having a thickness between about 0.3 mm and 2.5 mm;
   b. a second material comprising said thermosetting elastomer that is crosslinked with β-hydroxyester linkages, wherein said second material is defined as being a foam material with a glass transition temperature not greater than about 25 C and a density less than 0.7 g/cc; and,
   c. a third material comprising said thermosetting elastomer that is crosslinked with β-hydroxyester linkages, wherein said third material is defined as being a molded elastomer material with a glass transition temperature not greater than about 25 C, wherein said third material is three-dimensional in shape, wherein said first material is bonded to said second material or said third material, and wherein said second material is bonded to said first material or said third material.

2. The footwear article according to claim 1 further comprising a fourth material, said fourth material comprising said thermosetting elastomer that is crosslinked with β-hydroxyester linkages, wherein said fourth material is defined as being a coating material with a glass transition temperature below room temperature, wherein said fourth material has a thickness from 10 to 100 microns, wherein said fourth material is bonded to said first, said second, or said third material.

3. The footwear article according to claim 2 further comprising a fifth material, said fifth material comprising said thermosetting elastomer that is crosslinked with β-hydroxyester linkages, wherein said fifth material is defined as being an adhesive material with a glass transition temperature below room temperature, wherein said fifth material has a thickness of 1 mm or less, and wherein said fifth material is positioned between and bonded to said first material and said second material, said first material and said third material, said first material and said fourth material, said second material and said third material, said second material and said fourth material, or said third material and said fourth material.

4. The footwear article according to claim 3 further comprising a sixth material, said sixth material comprising said thermosetting elastomer that is crosslinked with β-hydroxyester linkages, wherein said sixth material is defined as being a rigid or semi-rigid material with a glass transition temperature greater than room temperature, wherein said sixth material is substantially non-crystalline in structure, wherein said sixth material is bonded to said first, said second, said third, said fourth, or said fifth material.

5. The footwear article according to claim 4 wherein said sixth material is further defined as a rigid or semi-rigid component of the footwear article.

6. The article according to claim 1 wherein said thermosetting elastomer is substantially the reaction product between a naturally occurring polyfunctional carboxylic acid and an epoxidized triglyceride.

7. The footwear article according to claim 1 wherein a crosslinking with β-hydroxyester linkages of said thermosetting elastomer is effected using a reaction product between a naturally occurring polyfunctional carboxylic acid and an epoxidized triglyceride.

8. The footwear article according to claim 1 wherein said first material is further defined as an upper of said footwear article.

9. The footwear article according to claim 8 wherein said second material is further defined as a midsole of said footwear article, and wherein said third material is further defined as an outsole of said footwear article.

10. The footwear article according to claim 1 wherein said thermosetting elastomer that is crosslinked with β-hydroxyester linkages is further defined as being capable of de-crosslinking of said β-hydroxyester linkages via a mechano-chemical process.

11. The footwear article according to claim 1 wherein said first material further comprises a backing layer bonded to said thermosetting elastomer.

12. The footwear article according to claim 11 wherein said back layer is further defined as a fabric.

13. A footwear article comprising:
  a. a first material comprising a thermosetting elastomer that is crosslinked with β-hydroxyester linkages, wherein said first material is defined as being a leather-like material with a glass transition temperature generally below room temperature, wherein said first material is planar having a thickness between about 0.3 mm and 2.5 mm;
  b. a second material comprising said thermosetting elastomer that is crosslinked with β-hydroxyester linkages, wherein said second material is defined as being a foam material with a glass transition temperature not greater than about 25 C and a density less than 0.7 g/cc, and wherein said foam material comprises a midsole of said footwear article; and,
  c. a third material comprising said thermosetting elastomer that is crosslinked with β-hydroxyester linkages, wherein said third material is defined as being a molded elastomer material with a glass transition temperature not greater than about 25 C, wherein said third material is three-dimensional in shape, wherein said first material is bonded to said second material or said third material, wherein said second material is bonded to said first material or said third material, and wherein said molded elastomer material comprises an outsole of said footwear article.

14. The footwear article according to claim 13 further comprising a fourth material, said fourth material comprising said thermosetting elastomer that is crosslinked with β-hydroxyester linkages, wherein said fourth material is defined as being a coating material with a glass transition temperature below room temperature, wherein said fourth material has a thickness from 10 to 100 microns, wherein said fourth material is bonded to said first, said second, or said third material.

15. The footwear article according to claim 14 further comprising a fifth material, said fifth material comprising said thermosetting elastomer that is crosslinked with β-hydroxyester linkages, wherein said fifth material is defined as being an adhesive material with a glass transition temperature below room temperature, wherein said fifth material has a thickness of 1 mm or less, and wherein said fifth material is positioned between and bonded to said first material and said second material, said first material and said third material, said first material and said fourth material, said second material and said third material, said second material and said fourth material, or said third material and said fourth material.

16. The footwear article according to claim 15 further comprising a sixth material, said sixth material comprising said thermosetting elastomer that is crosslinked with β-hydroxyester linkages, wherein said sixth material is defined as being a rigid or semi-rigid material with a glass transition temperature greater than room temperature, wherein said sixth material is substantially non-crystalline in structure, wherein said sixth material is bonded to said first, said second, said third, said fourth, or said fifth material.

17. An article comprising:
  a. a first material comprising a thermosetting elastomer that is crosslinked with β-hydroxyester linkages, wherein said first material is cured with the reaction product between a naturally occurring polyfunctional carboxylic acid and an epoxidized triglyceride, wherein said first material is defined as being a leather-like material with a glass transition temperature generally below room temperature, wherein said first material is planar having a thickness between about 0.3 mm and 2.5 mm;
  b. a second material comprising said thermosetting elastomer that is crosslinked with β-hydroxyester linkages, wherein said second material is defined as being a foam material with a glass transition temperature not greater than about 25 C and a density less than 0.7 g/cc; and,
  c. a third material comprising said thermosetting elastomer that is crosslinked with β-hydroxyester linkages, wherein said third material is defined as being a molded elastomer material with a glass transition temperature not greater than about 25 C, wherein said third material is three-dimensional in shape, wherein said first material is bonded to said second material or said third material, and wherein said second material is bonded to said first material or said third material.

18. The article according to claim 17 further comprising a fourth material, said fourth material comprising said thermosetting elastomer that is crosslinked with β-hydroxyester linkages, wherein said fourth material is defined as being a coating material with a glass transition temperature below room temperature, wherein said fourth material has a thickness from 10 to 100 microns, wherein said fourth material is bonded to said first, said second, or said third material.

19. The article according to claim 18 further comprising a fifth material, said fifth material comprising said thermosetting elastomer that is crosslinked with β-hydroxyester linkages, wherein said fifth material is defined as being an adhesive material with a glass transition temperature below room temperature, wherein said fifth material has a thickness of 1 mm or less, and wherein said fifth material is positioned between and bonded to said first material and said second material, said first material and said third material, said first material and said fourth material, said second material and said third material, said second material and said fourth material, or said third material and said fourth material.

20. The article according to claim 19 further comprising a sixth material, said sixth material comprising said thermosetting elastomer that is crosslinked with β-hydroxyester linkages, wherein said sixth material is defined as being a rigid or semi-rigid material with a glass transition temperature greater than room temperature, wherein said sixth material is substantially non-crystalline in structure, wherein said sixth material is bonded to said first, said second, said third, said fourth, or said fifth material.

* * * * *